(12) United States Patent
Furuichi

(10) Patent No.: US 12,143,827 B2
(45) Date of Patent: Nov. 12, 2024

(54) COMMUNICATION CONTROL APPARATUS, COMMUNICATION APPARATUS, AND PROXY APPARATUS

(71) Applicant: SONY GROUP CORPORATION, Tokyo (JP)

(72) Inventor: Sho Furuichi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 668 days.

(21) Appl. No.: 17/415,486

(22) PCT Filed: Dec. 20, 2019

(86) PCT No.: PCT/JP2019/050184
§ 371 (c)(1),
(2) Date: Jun. 17, 2021

(87) PCT Pub. No.: WO2020/137915
PCT Pub. Date: Jul. 2, 2020

(65) Prior Publication Data
US 2022/0070680 A1 Mar. 3, 2022

(30) Foreign Application Priority Data

Dec. 27, 2018 (JP) ................................. 2018-246309

(51) Int. Cl.
*H04W 16/14* (2009.01)
(52) U.S. Cl.
CPC .................................. *H04W 16/14* (2013.01)

(58) Field of Classification Search
CPC ... H04W 16/14; H04W 52/383; H04W 76/12; H04W 72/048; H04W 4/80; H04W 48/08;
(Continued)

(56) References Cited

U.S. PATENT DOCUMENTS 8,811,213 B1    8/2014  Rai
9,191,963 B2   11/2015  Park et al.
(Continued)

FOREIGN PATENT DOCUMENTS

CN    103428638 A       12/2013
CN    109565338 A   *    4/2019   ............. H04B 17/24
(Continued)

OTHER PUBLICATIONS

Hanyouetal, "Spectrumsharingmethodsforthecoexistenceofmultiple RFsystems:Asurvey", vol. 53,Sep. 13, 2016(Sep. 13, 2016),pp. 53-78. (Year: 2016).*

(Continued)

*Primary Examiner* — Ayaz R Sheikh
*Assistant Examiner* — Louis Samara
(74) *Attorney, Agent, or Firm* — CHIP LAW GROUP

(57) ABSTRACT

A communication control apparatus includes: an acquiring section that acquires information related to usage of one or more frequency resources of a second wireless system, the one or more frequency resources being included in part or all of a frequency band used by a first wireless system, the second wireless system desiring use of the one or more frequency resource; a processing section that performs a (Continued)

process related to the frequency resource on the basis of the information related to the usage of the frequency resource; and a notifying section that reports a result of the process related to the frequency resource.

18 Claims, 20 Drawing Sheets

(58) Field of Classification Search
CPC .............. H04N 21/44227; H04B 17/24; H04L 1/1854; H04L 5/0044
See application file for complete search history.

(56) References Cited

U.S. PATENT DOCUMENTS

| | | | |
|---|---|---|---|
| 10,271,351 B1* | 4/2019 | Wang | H04L 5/0091 |
| 2012/0071189 A1 | 3/2012 | Mody et al. | |
| 2013/0336180 A1 | 12/2013 | Park et al. | |
| 2014/0177449 A1* | 6/2014 | Novak | H04W 4/80 |
| | | | 370/329 |
| 2015/0043491 A1 | 2/2015 | Eng | |
| 2015/0080010 A1 | 3/2015 | Wei et al. | |
| 2015/0087323 A1 | 3/2015 | Srikanteswara | |
| 2015/0365880 A1* | 12/2015 | Malladi | H04W 48/08 |
| | | | 370/312 |
| 2015/0373554 A1* | 12/2015 | Freda | H04W 16/14 |
| | | | 455/450 |
| 2019/0021090 A1* | 1/2019 | Do | H04N 21/44227 |
| 2019/0058999 A1* | 2/2019 | Gunasekara | H04W 36/22 |
| 2019/0165894 A1* | 5/2019 | Choi | H04L 5/0044 |
| 2019/0306912 A1* | 10/2019 | Cheng | H04W 76/27 |
| 2020/0084780 A1* | 3/2020 | Wiatrowski | H04W 16/14 |
| 2021/0144579 A1* | 5/2021 | Ke | H04W 76/12 |
| 2022/0070680 A1* | 3/2022 | Furuichi | H04W 16/14 |
| 2023/0076122 A1* | 3/2023 | Lee | H04W 52/346 |

FOREIGN PATENT DOCUMENTS

| | | | | |
|---|---|---|---|---|
| CN | 106465430 B * | 12/2019 | ........... | H04L 5/0007 |
| EP | 3188524 A | 7/2017 | | |
| JP | 2013-526126 A | 6/2013 | | |
| JP | WO2011096062 A1 * | 6/2013 | | |
| JP | 2016-508694 A | 3/2016 | | |
| JP | WO2014069058 A1 * | 9/2016 | | |
| KR | 10-2013-0140549 A | 12/2013 | | |
| WO | 2011/123501 A1 | 10/2011 | | |
| WO | 2014/015694 A1 | 1/2014 | | |
| WO | 2014/117135 A2 | 7/2014 | | |
| WO | WO-2014174877 A1 * | 10/2014 | .............. | H04J 11/00 |
| WO | WO-2016077701 A1 | 5/2016 | | |
| WO | WO-2019097828 A1 * | 5/2019 | .......... | H04W 72/048 |

OTHER PUBLICATIONS

Pawe(L)Kryszkiewiczetal,"Context-basedspectrumsharingin5Gwirelessnetworksbasedon RadioEnvironmentMaps",Nov. 7, 2018(Nov. 7, 2018),p. 6-16. (Year: 2018).*

International Search Report and Written Opinion of PCT Application No. PCT/JP2019/050184, issued on Feb. 18, 2020, 09 pages of ISRWO.

Wireless Innovation Forum, "CBRS Certified Professional Installer Accreditation Technical Specification", WINNF-TS-0247, Version V1.0.0, Oct. 16, 2017, 18 pages.

Wireless Innovation Forum, "Signaling Protocols and Procedures for Citizens Broadband Radio Service (CBRS): Spectrum Access System (SAS)—Citizens Broadband Radio Service Device (CBSD) Interface Technical Specification", WINNF-TS-0016, Version V1.2.1, Jan. 3, 2018, 60 pages.

ECC Report 186, Technical and operational requirements for the operation of white space devices under geo-location approach, CEPT ECC, Jan. 2013, 181 pages.

White Space Database Provider (WSDB) Contract, 125 pages.

Wireless Innovation Forum, "Signaling Protocols and Procedures for Citizens Broadband Radio Service (CBRS): Spectrum Access System (SAS)—SAS Interface Technical Specification ", WINNF-TS-0096, Version 1.2.0, Oct. 20, 2017, 42 pages.

Wireless Innovation Forum, "Requirements for Commercial Operation in the U.S. 3550-3700 MHZ Citizens Broadband Radio Service Band", WINNF-TS-0112, Version V1.4.1, Jan. 16, 2018, 77 pages.

IEEE Std, "Coexistence Methods for Geo-location Capable Devices Operating under General Authorization", 802.19.1aTM, 2017, 2 pages.

C.F.R, Electronic Code of Federal Regulations, Part 96, Citizens Broadband Radio Service, 32 pages.

Wireless Innovation Forum, "Operations for Citizens Broadband Radio Service (CBRS): Priority Access License (PAL) Database Technical Specification", WINNF-TS-0245, Version V1.0.0, Jul. 26, 2017, 10 pages.

Wireless Innovation Forum, "Test and Certification for Citizens Broadband Radio Service (CBRS); Conformance and Performance Test Technical Specification; SAS as Unit Under Test (UUT)", WINNF-TS-0061, Version V1.2.0, Jun. 6, 2018, 190 pages.

Wireless Innovation Forum, "Spectrum Sharing Committee Policy and Procedure Coordinated Periodic Activities Policy", WINNF-SSC-0008, Version V1.0.0 2018, 2 pages.

Han You et al, "Spectrum sharing methods for the coexistence of multiple RF systems: A survey", vol. 53, Sep. 13, 2016 (Sep. 13, 2016), pp. 53-78.

Pawe(L) Kryszkiewicz et al, "Context-based spectrum sharing in 5G wireless networks based on Radio Environment Maps", Nov. 7, 2018 (Nov. 7, 2018), p. 6-16.

* cited by examiner

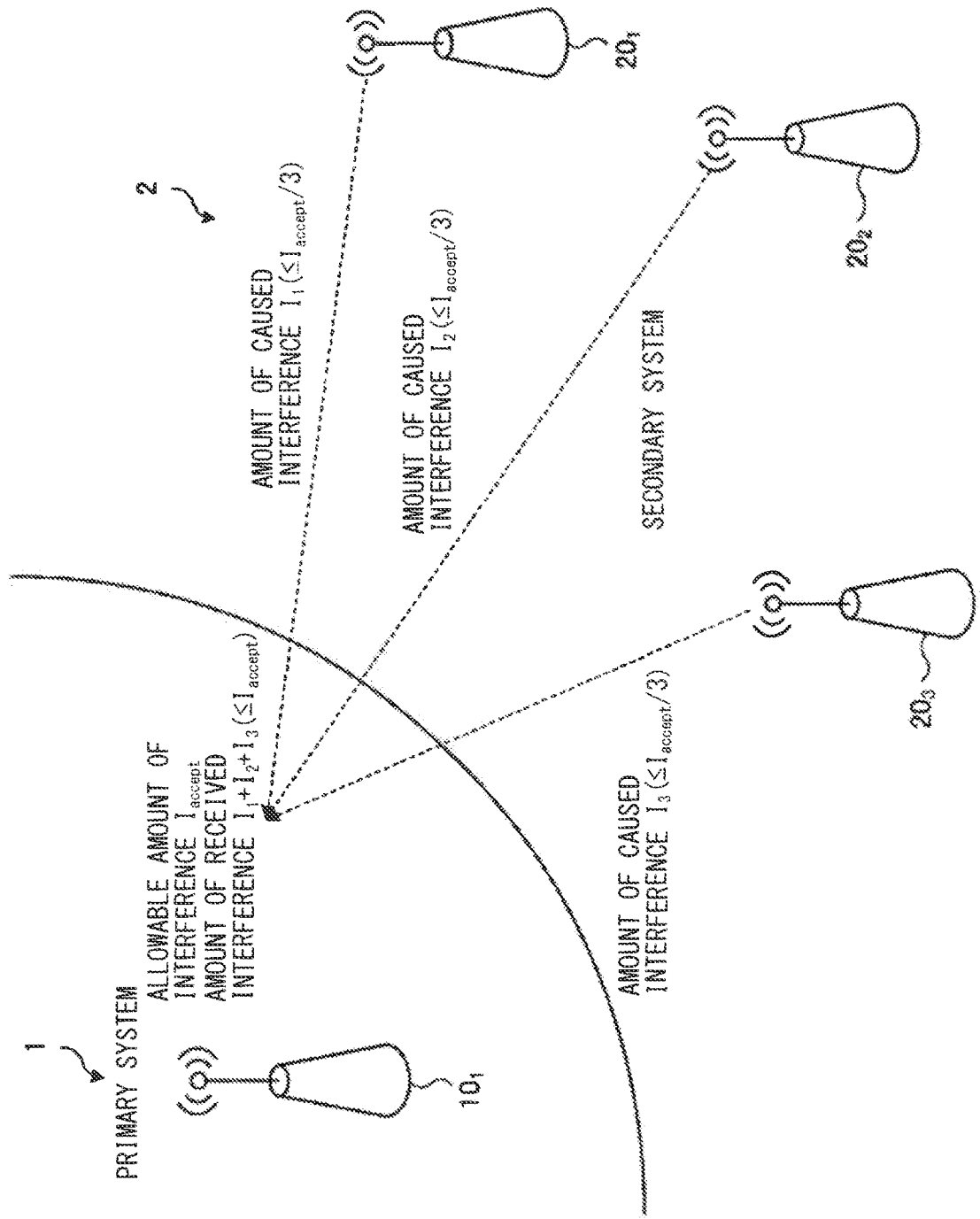

[FIG. 2]
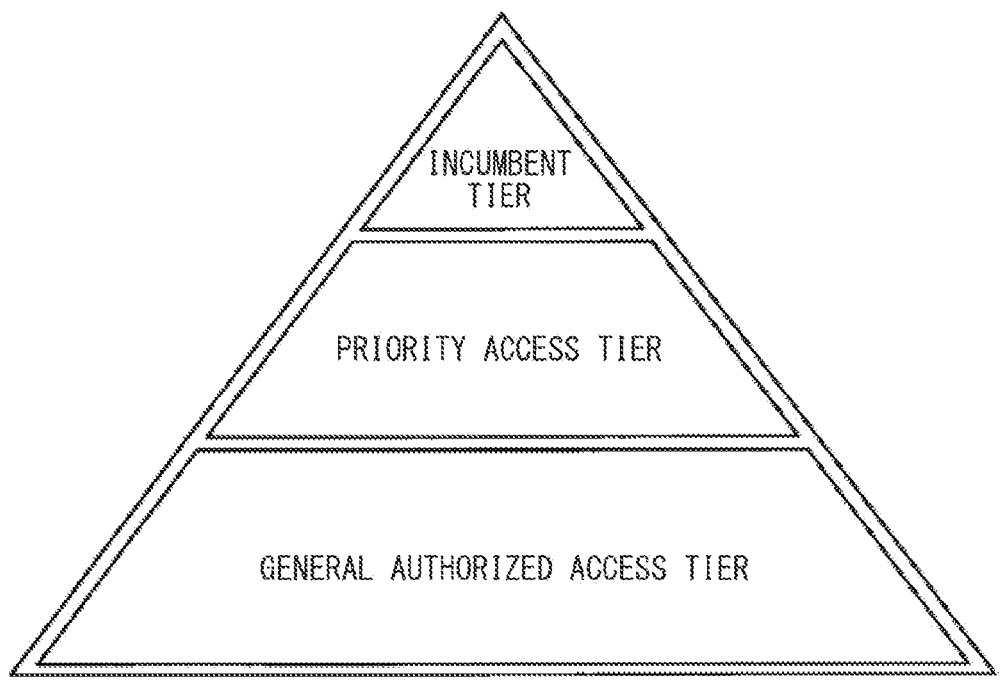
[FIG. 3]
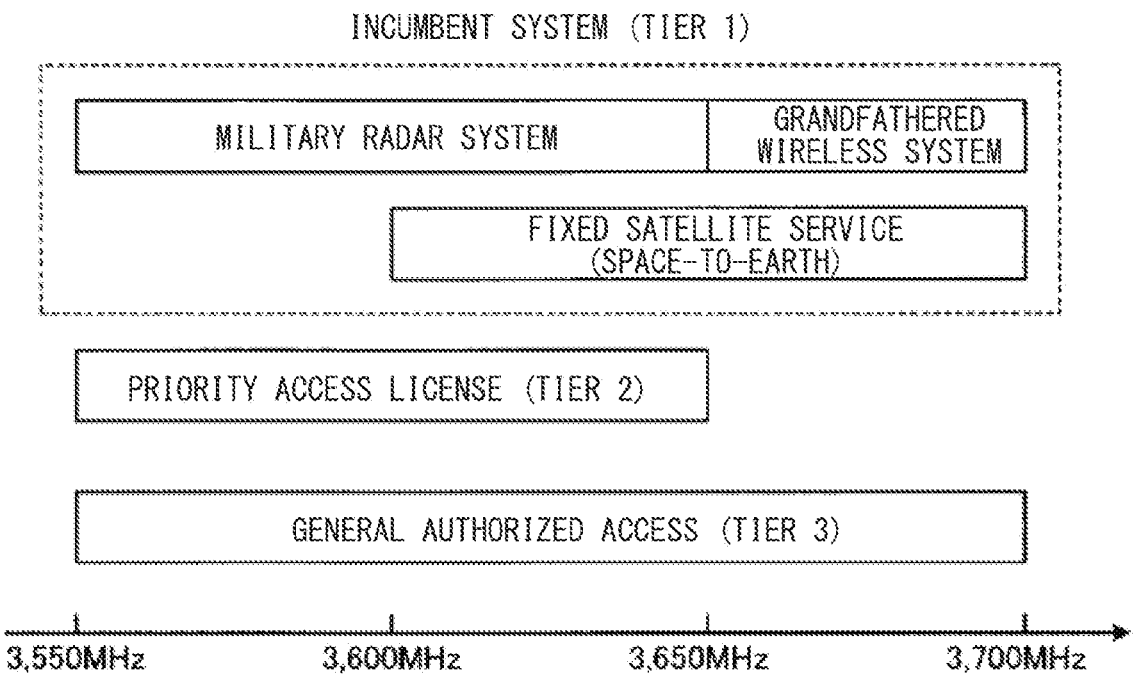

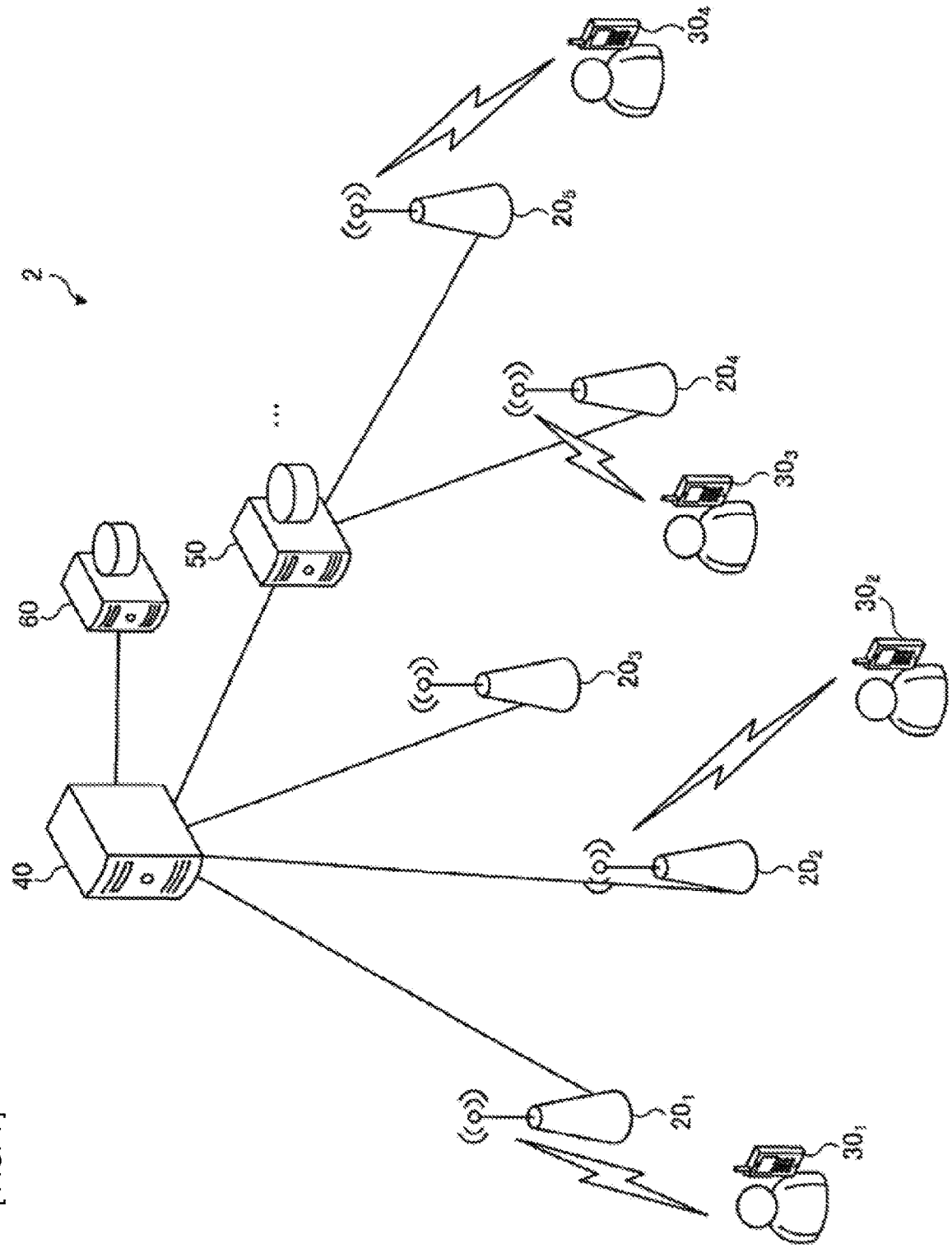
[FIG. 4]

[ FIG. 5 ]
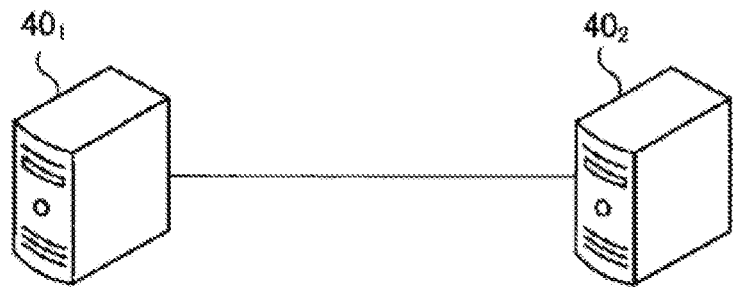
[ FIG. 6 ]
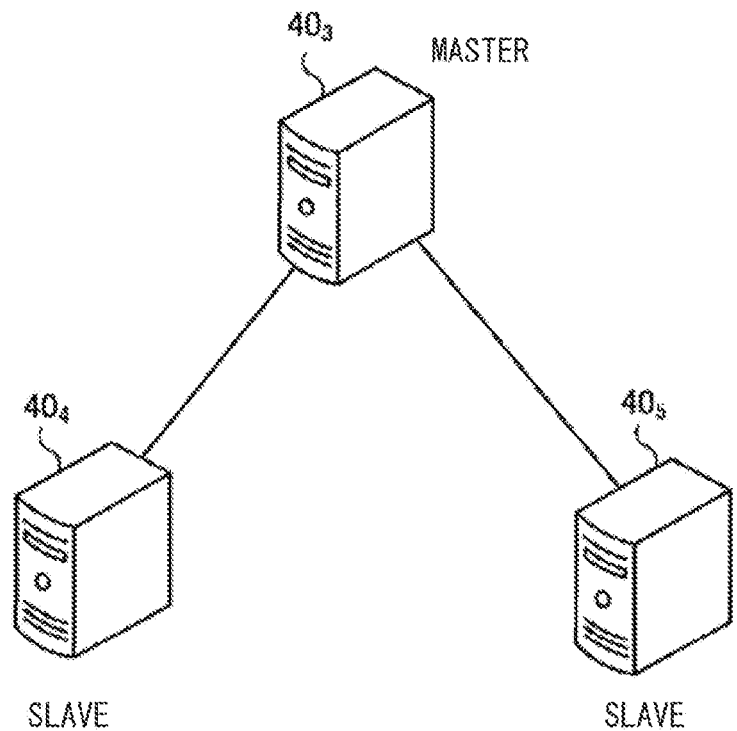

[FIG. 7]
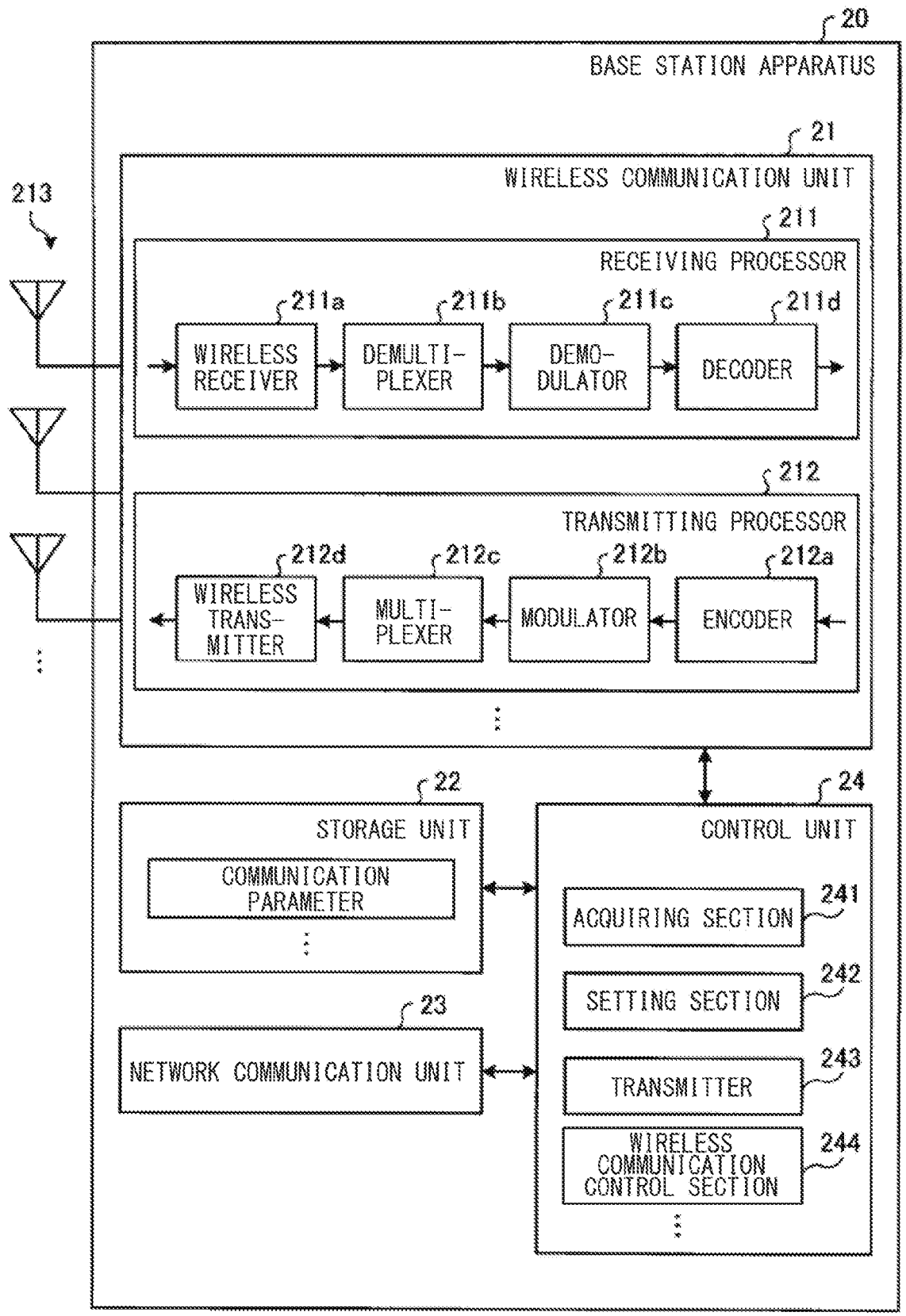

[ FIG. 8 ]
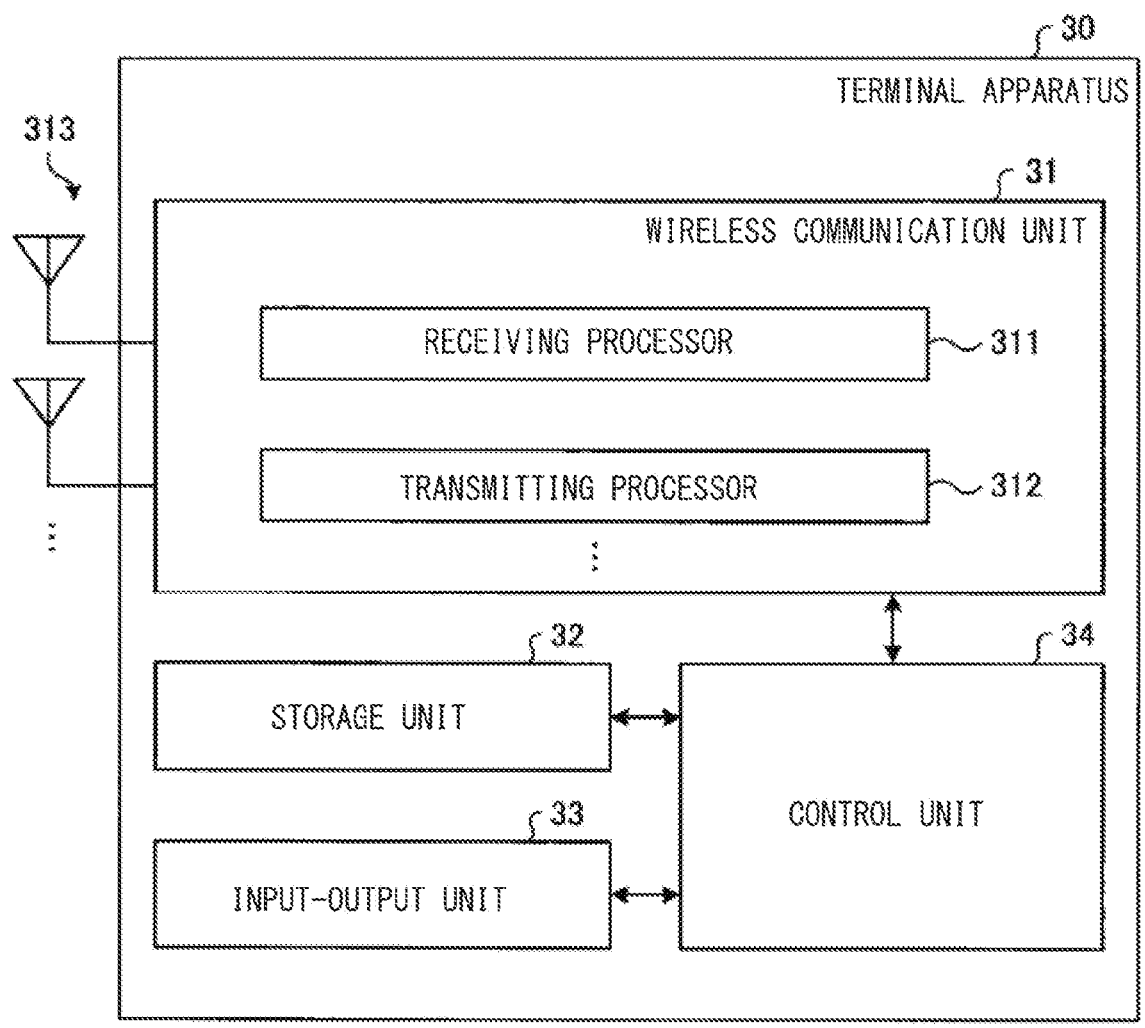

[ FIG. 9 ]
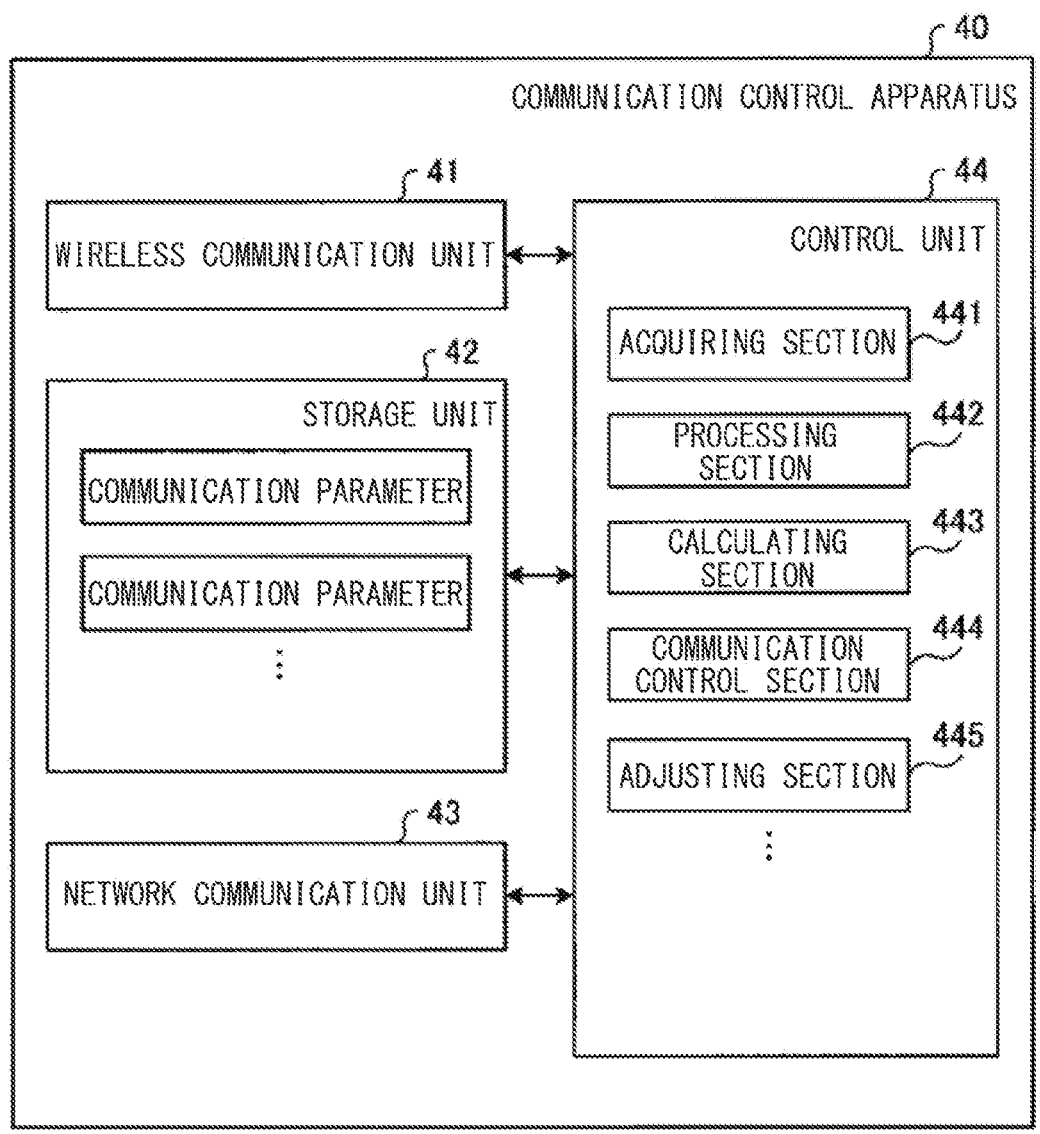

[ FIG. 10 ]
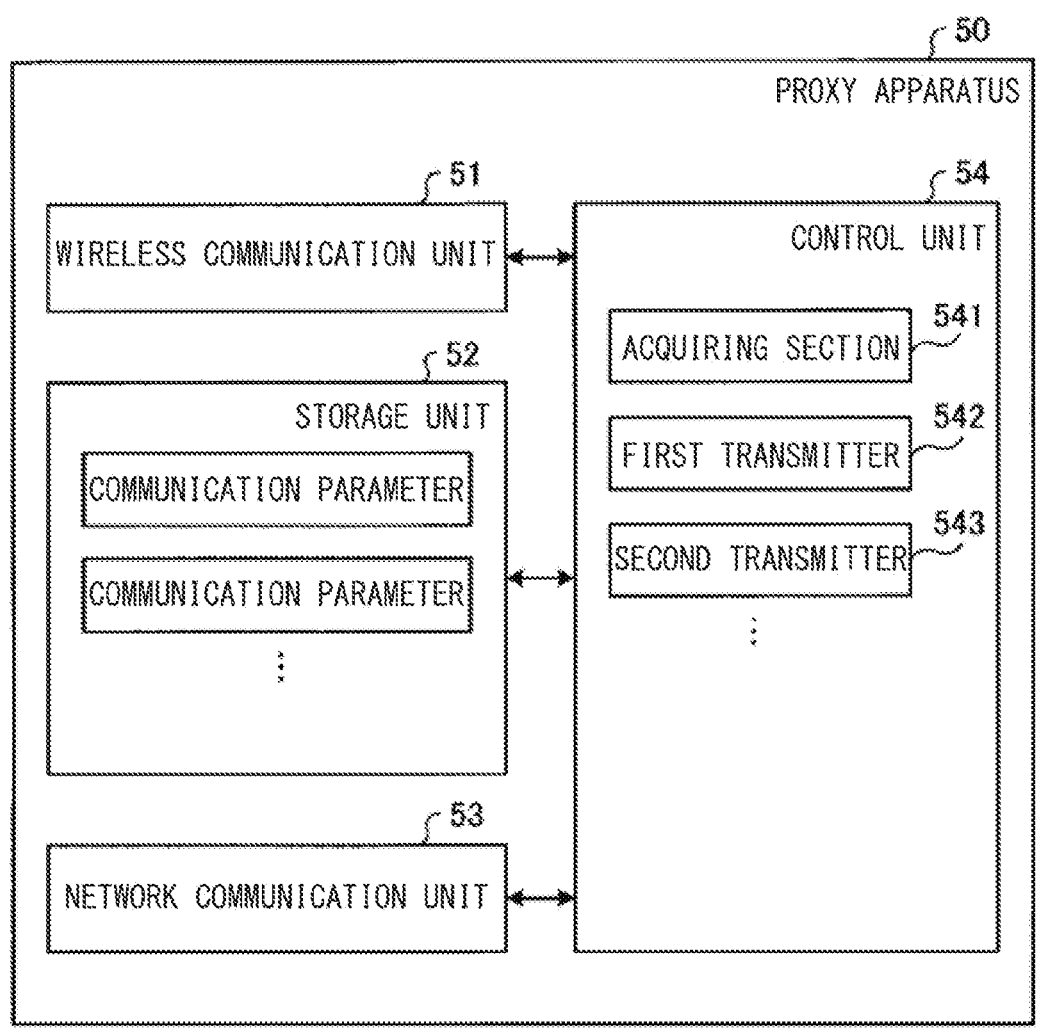

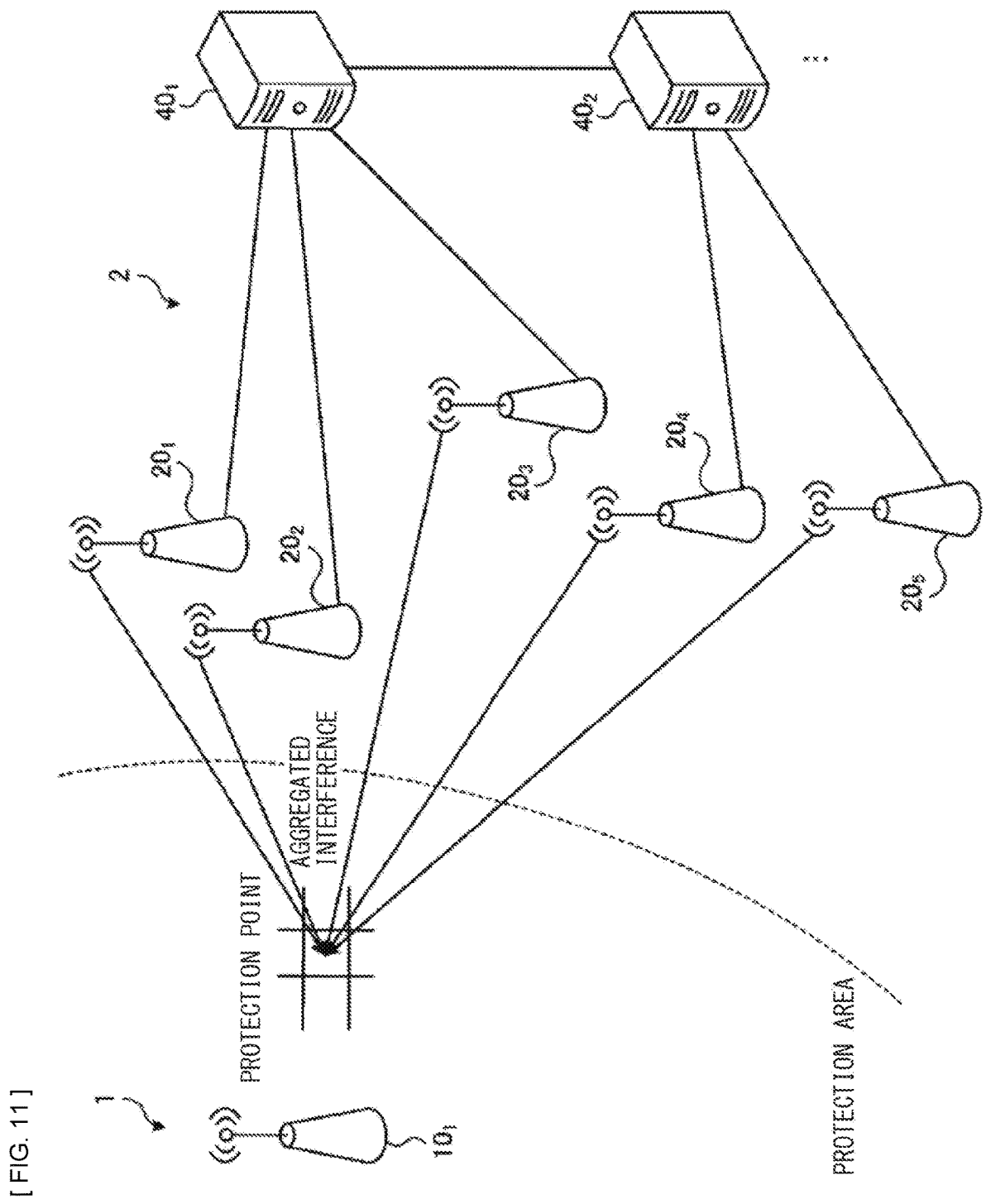
[FIG. 11]

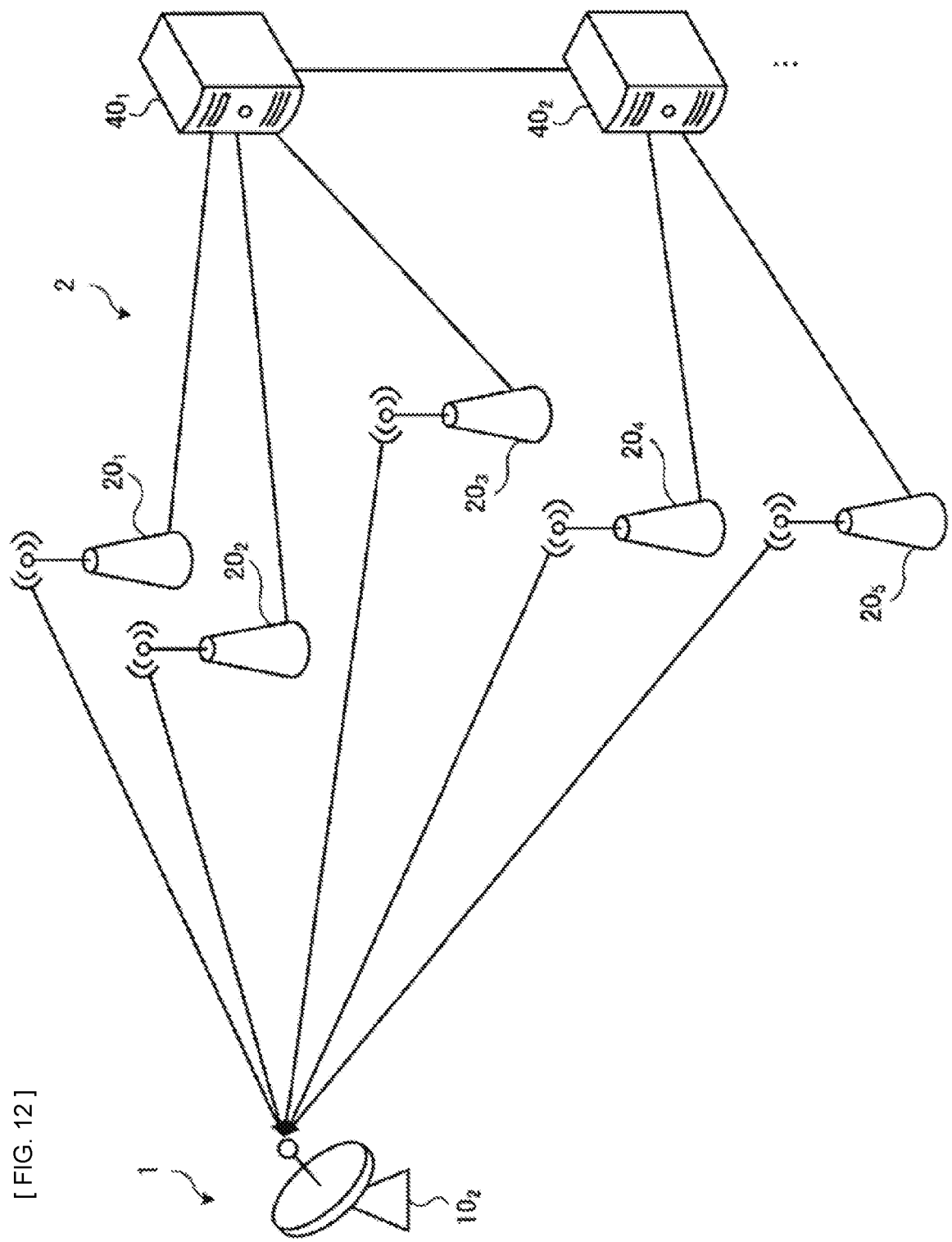
[FIG. 12]

[FIG. 13]
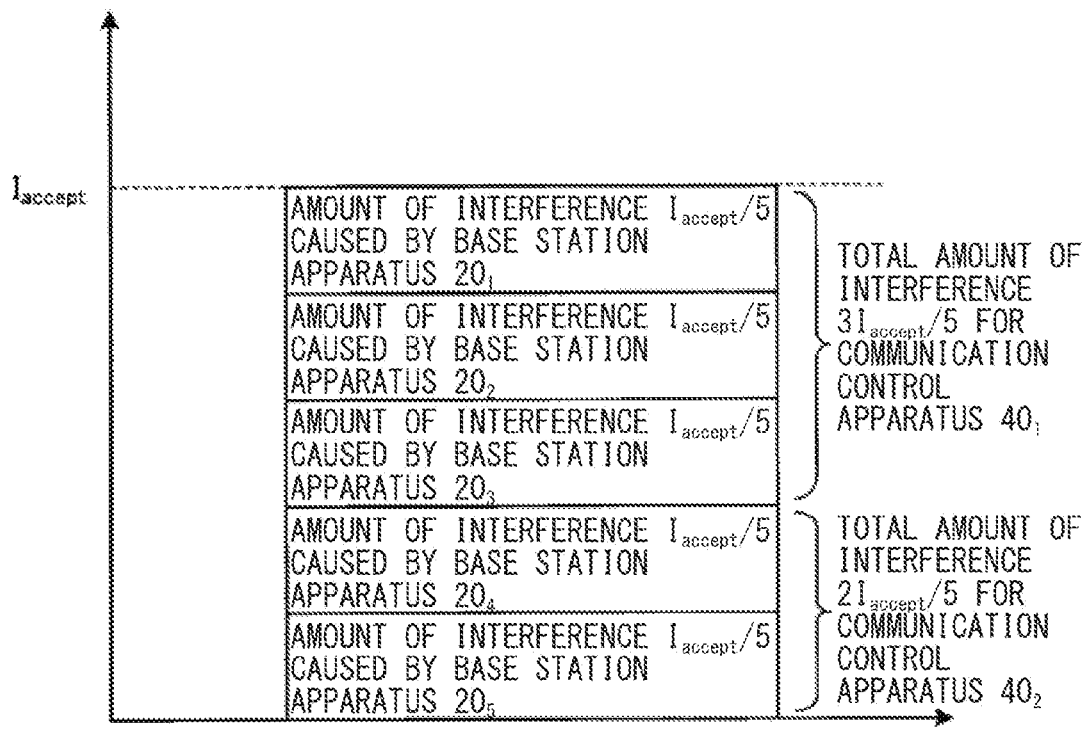
[FIG. 14]
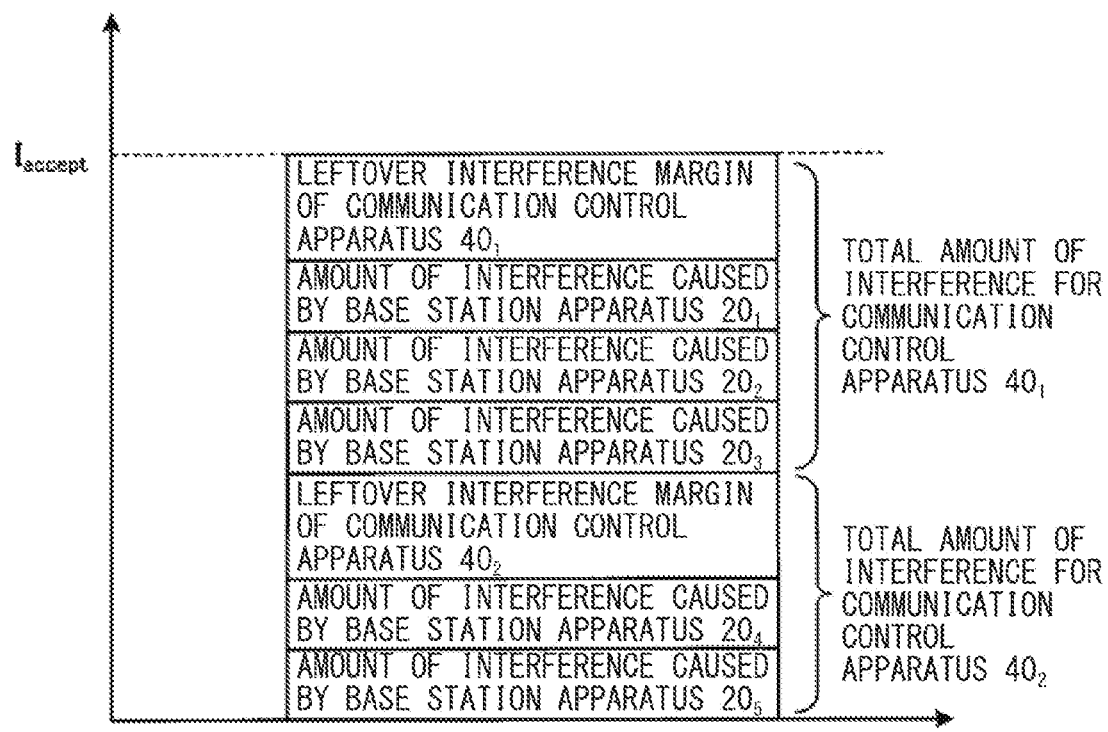

[ FIG. 15 ]
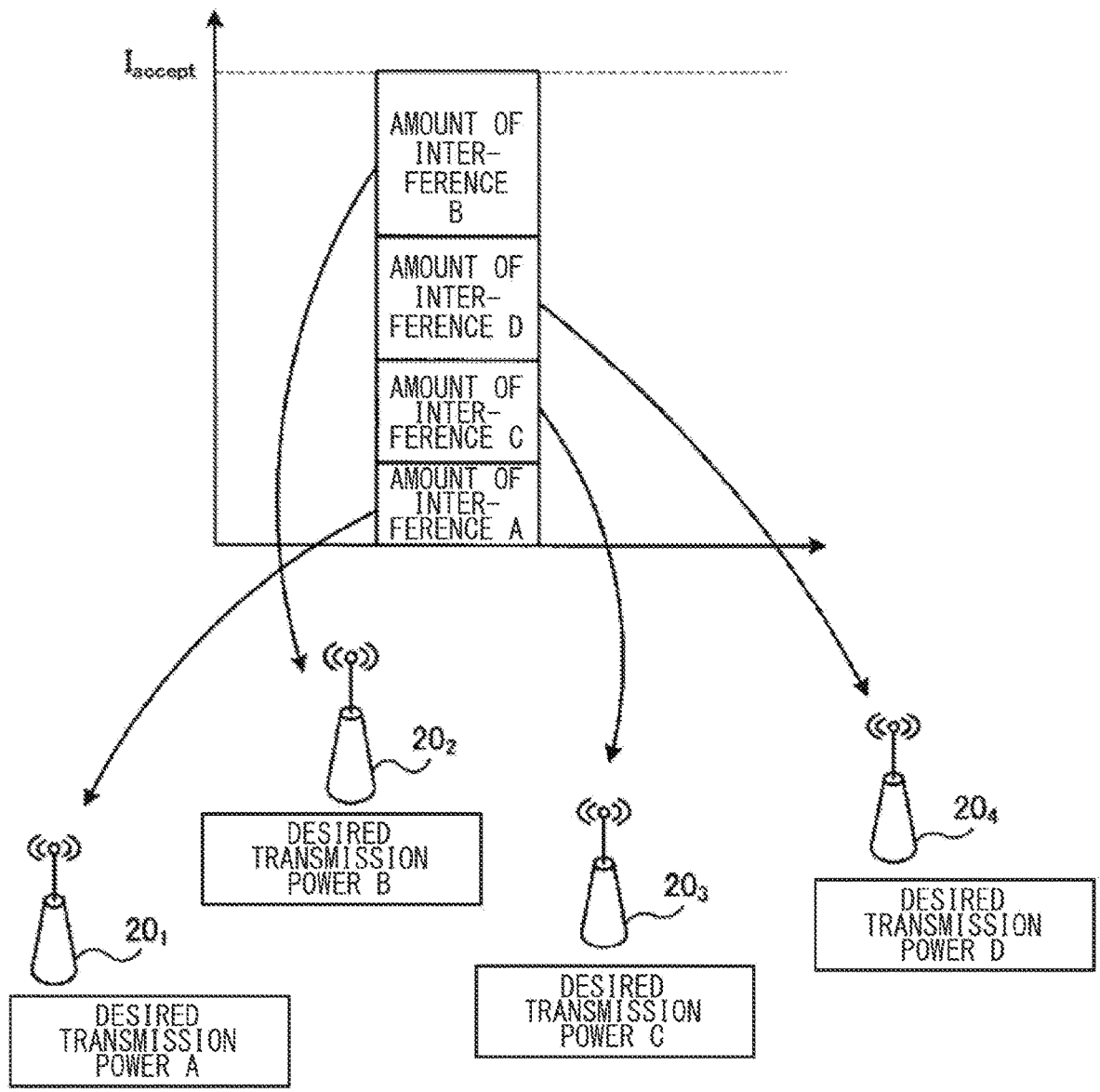

[ FIG. 16 ]
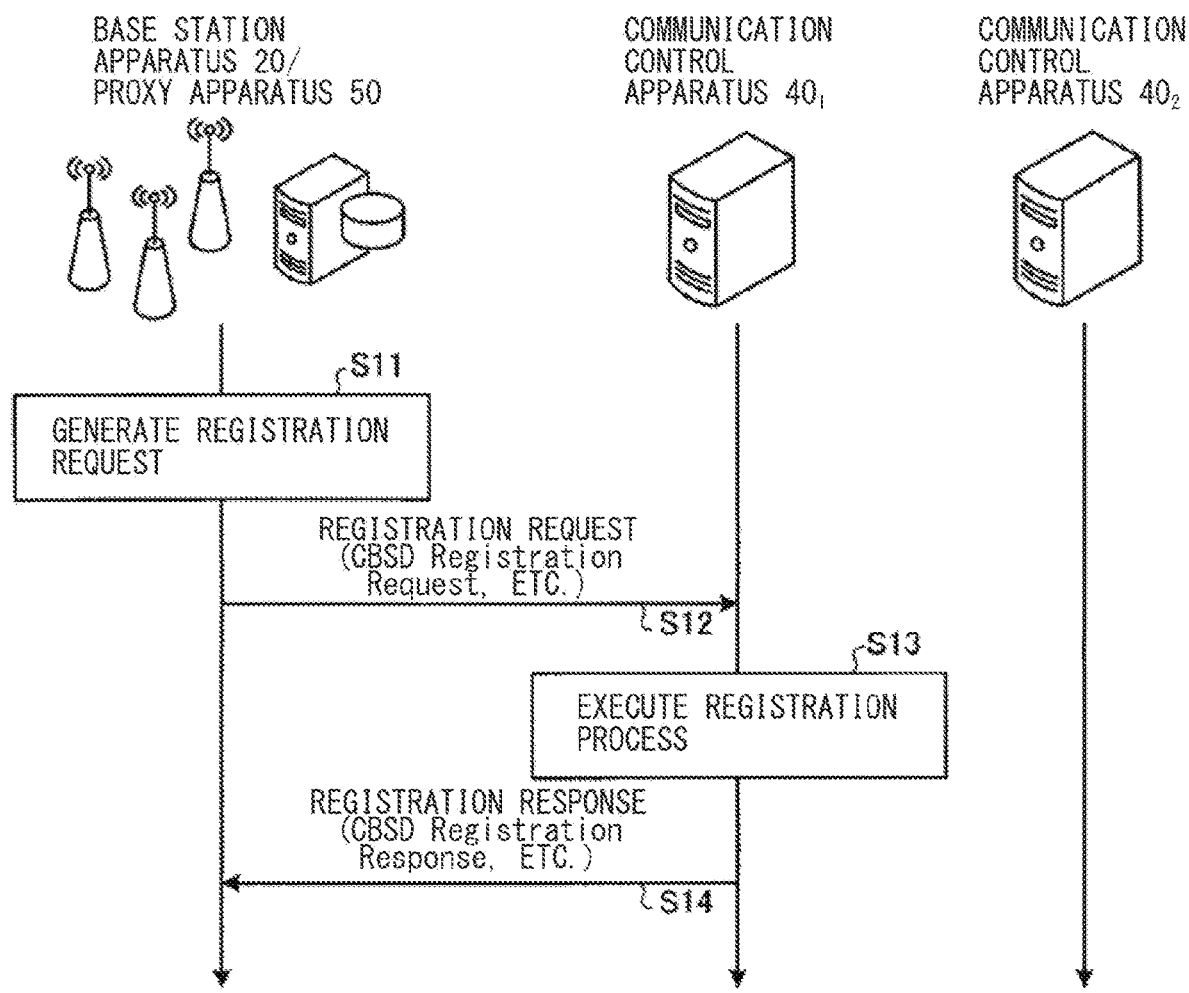

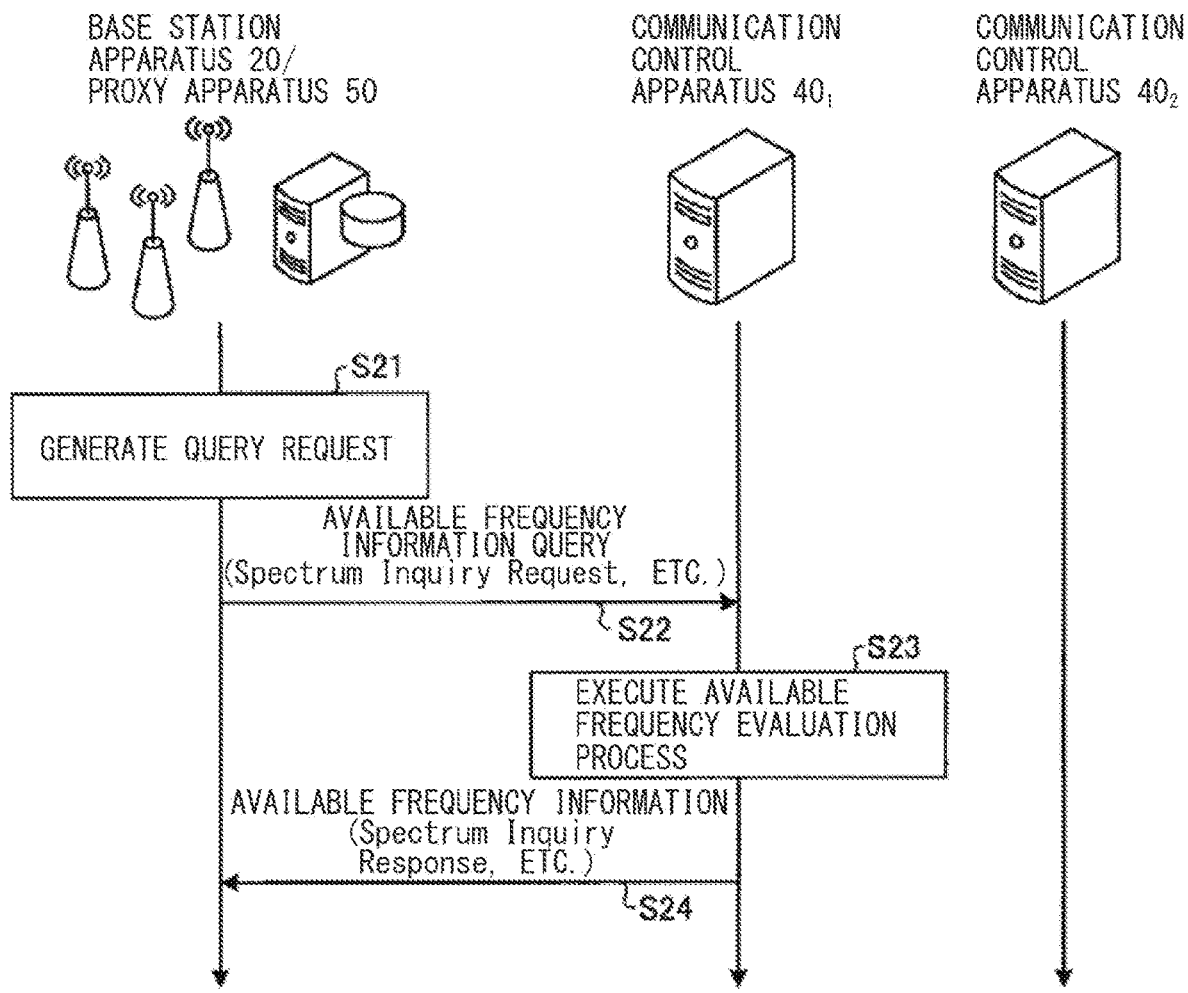
[ FIG. 17 ]

[FIG. 18]
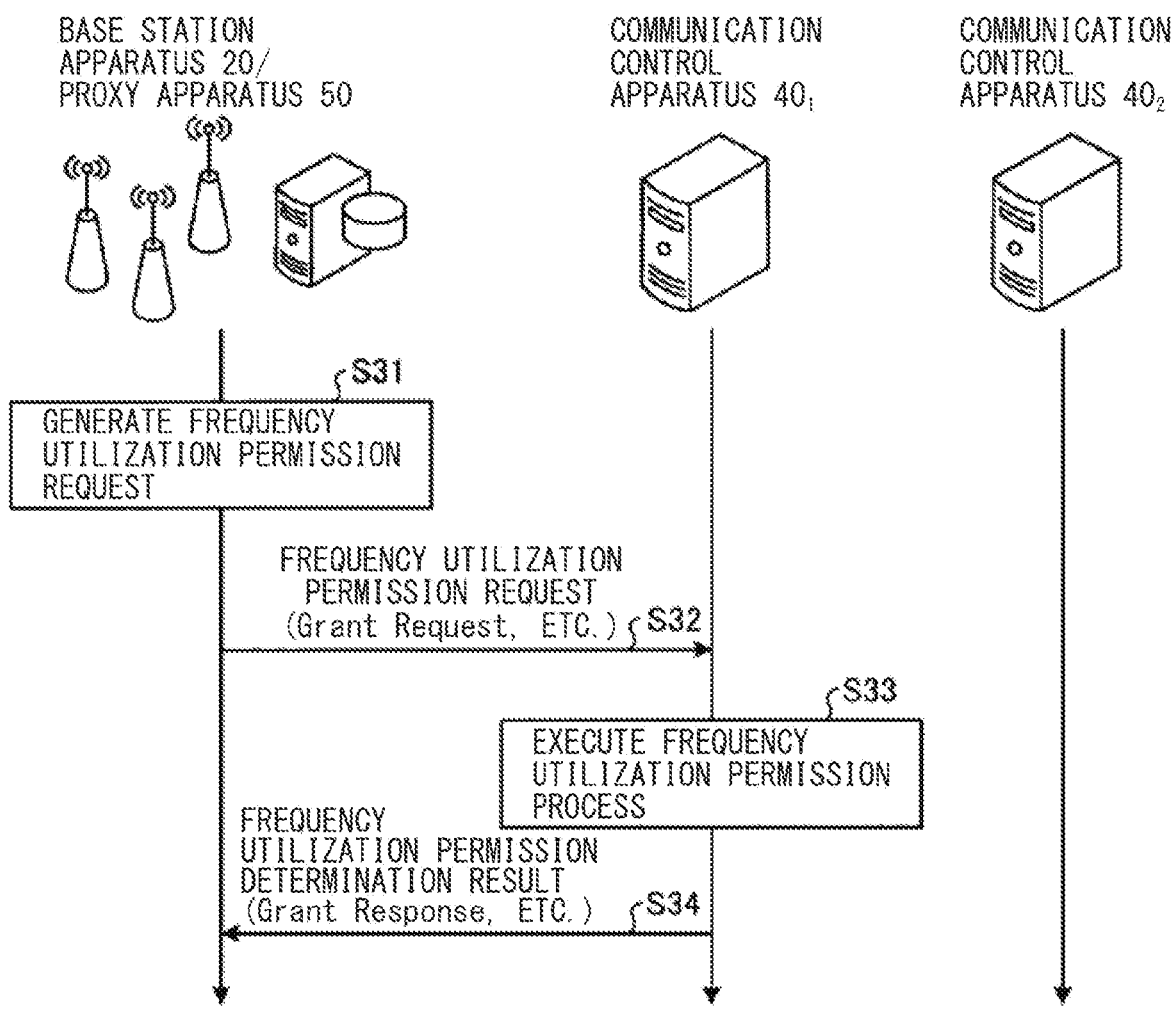

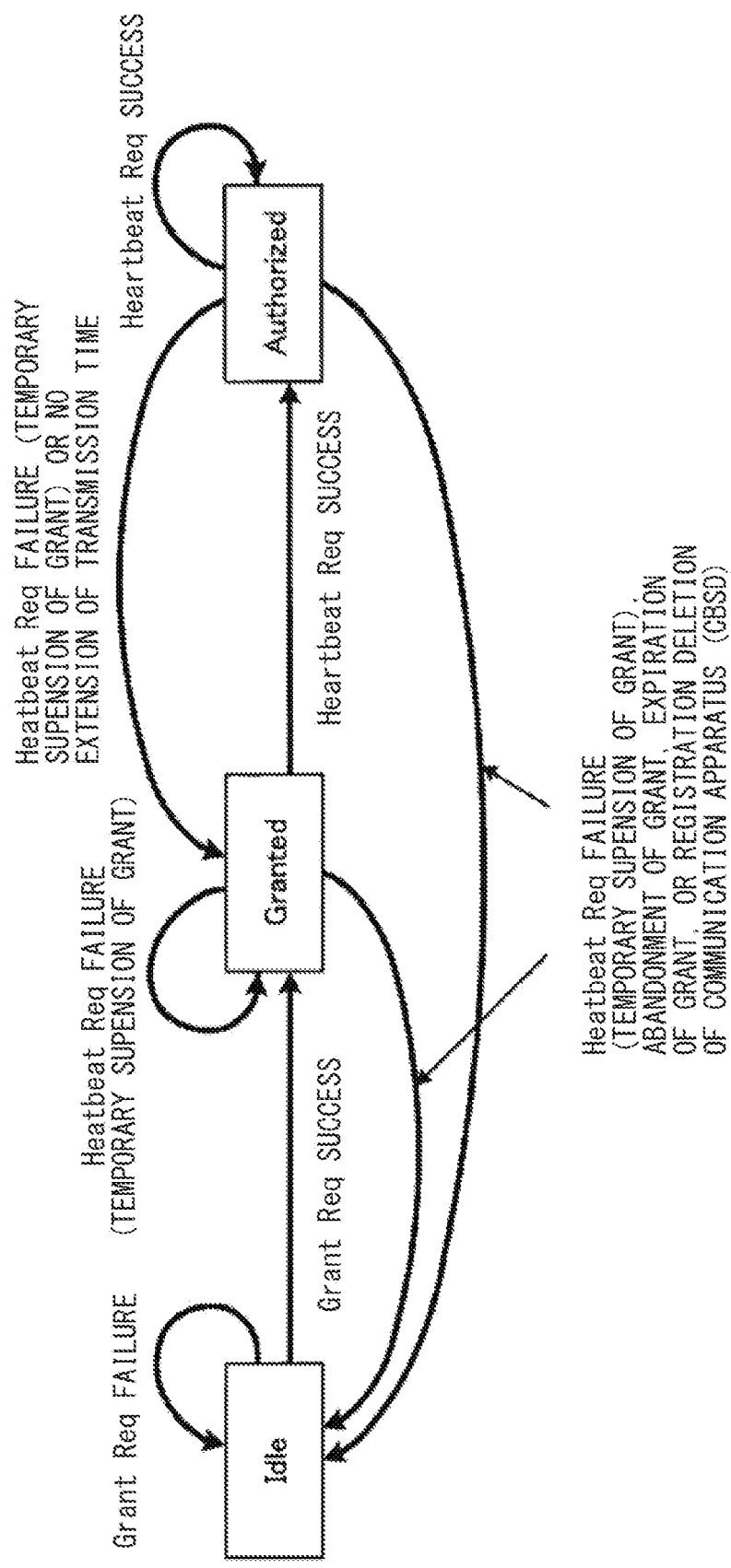
[FIG. 19]

[ FIG. 20 ]
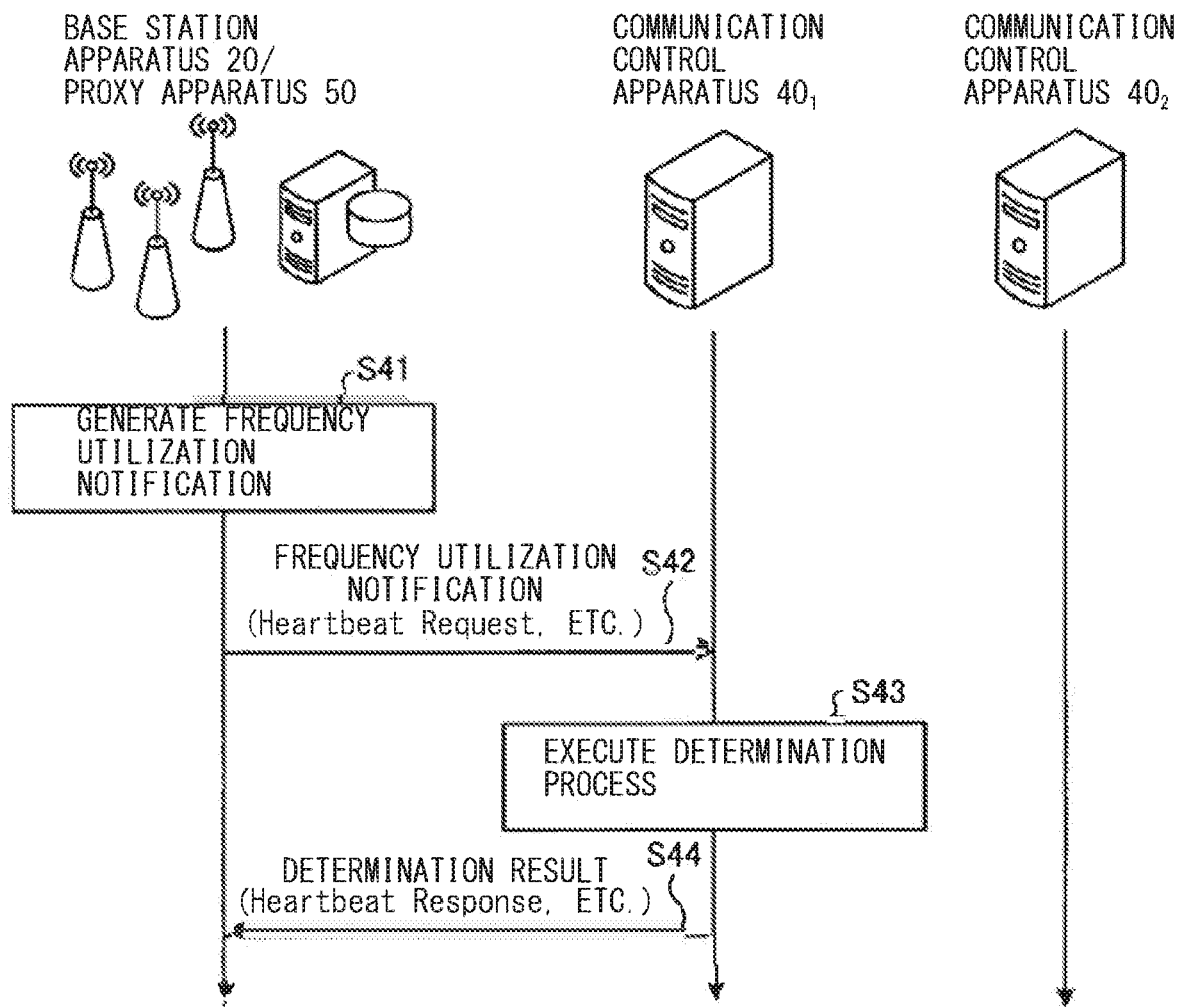

[ FIG. 21 ]
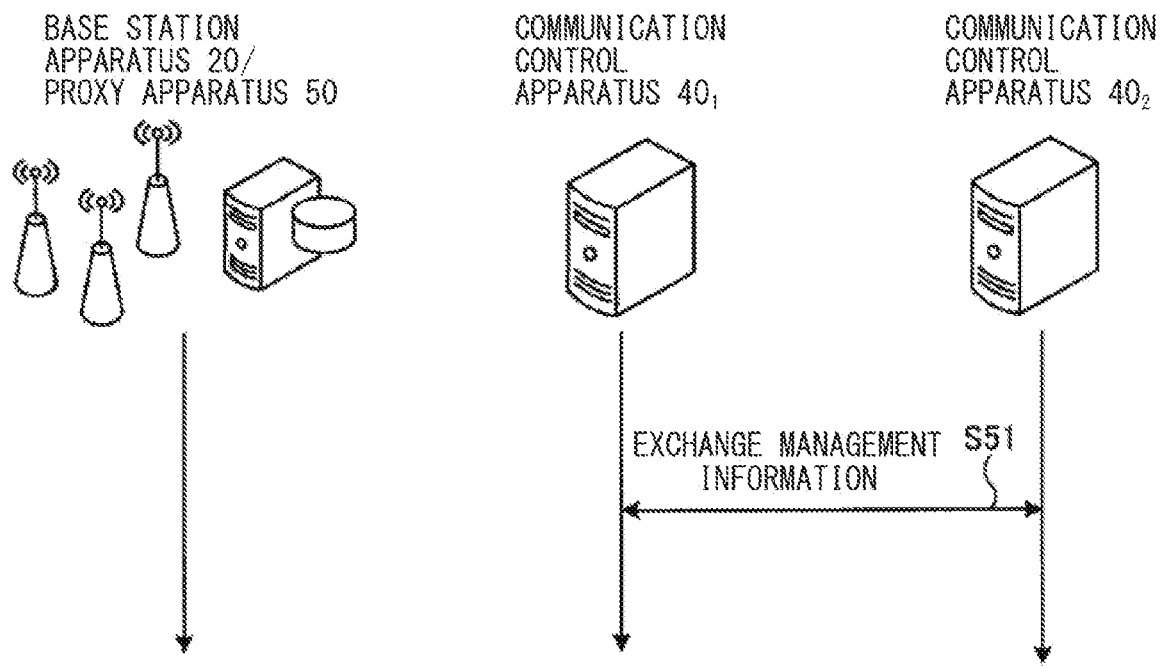

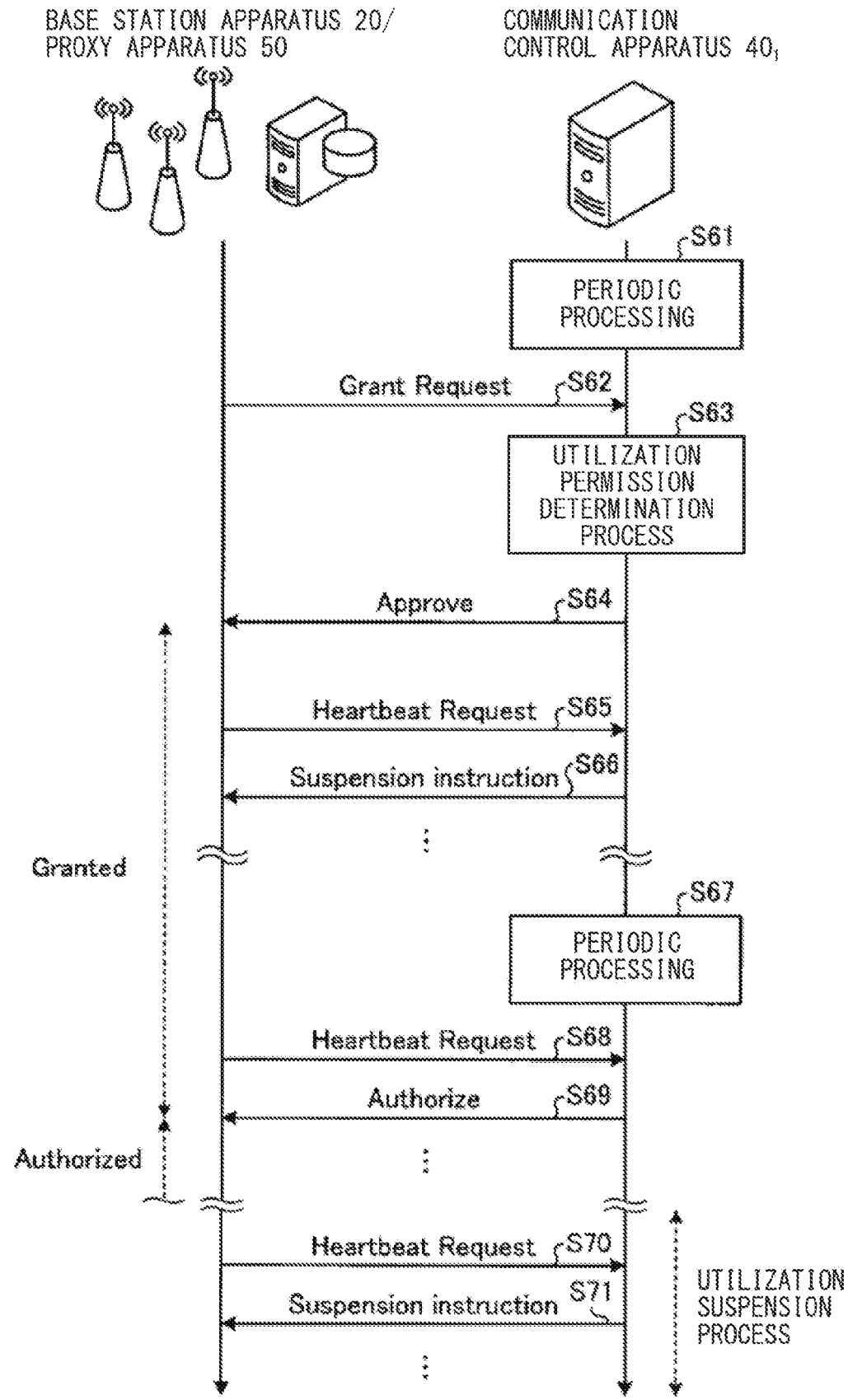
[ FIG. 22 ]

[ FIG. 23 ]
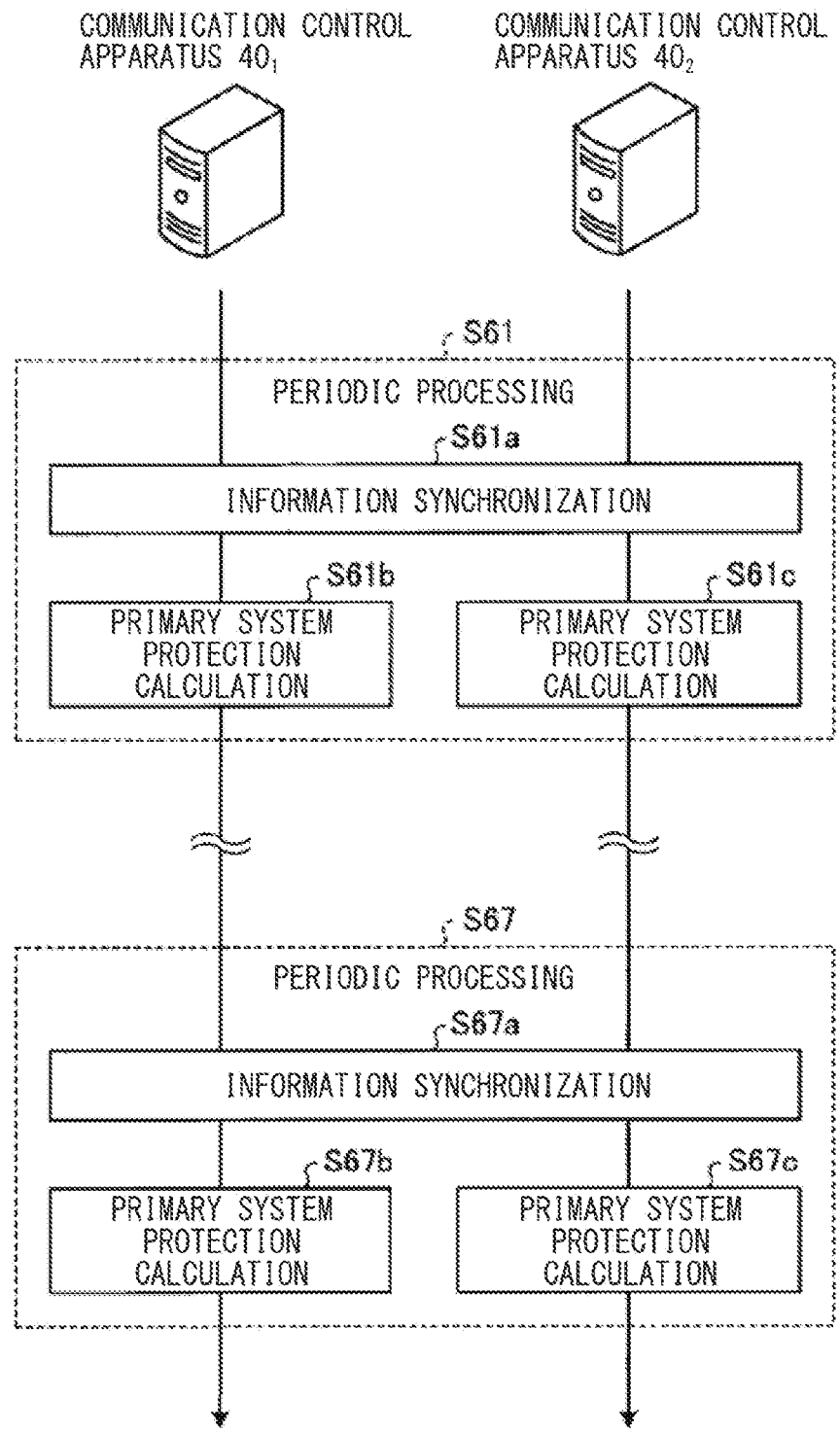

COMMUNICATION CONTROL APPARATUS, COMMUNICATION APPARATUS, AND PROXY APPARATUS

CROSS REFERENCE TO RELATED APPLICATIONS

This application is a U.S. National Phase of International Patent Application No. PCT/JP2019/050184 filed on Dec. 20, 2019, which claims priority benefit of Japanese Patent Application No. JP 2018-246309 filed in the Japan Patent Office on Dec. 27, 2018. Each of the above-referenced applications is hereby incorporated herein by reference in its entirety.

TECHNICAL FIELD

The present disclosure relates to a communication control apparatus, a communication apparatus, and a proxy apparatus.

BACKGROUND ART

An issue of depletion of radio wave resources (radio resources) allocable to wireless systems (wireless apparatuses) has emerged. It is difficult to newly allocate radio wave resources to wireless systems because all radio wave bands are already used by existing wireless systems (wireless apparatuses). Hence, more effective use of radio wave resources by utilization of a cognitive radio technology has begun to attract attention in recent years. The cognitive radio technology uses temporal and spatial free radio waves (White Space) of the existing wireless systems to secure radio wave resources.

CITATION LIST

Non-Patent Literature

NPTL 1: WINNF-TS-0247-V1.0.0 CBRS Certified Professional Installer Accreditation Technical Specification.
NPTL 2: WINNF-TS-0016-V1.2.1 Signaling Protocols and Procedures for Citizens Broadband Radio Service (CBRS): Spectrum Access System (SAS)—Citizens Broadband Radio Service Device (CBSD) Interface Technical Specification
NPTL 3: ECC Report 186, Technical and operational requirements for the operation of white space devices under geo-location approach, CEPT ECC, 2013 January
NPTL 4: White Space Database Provider (WSDB) Contract, available at https://www.ofcom.org.uk/_data/assets/pdf_file/0026/84077/white_space_database_contract_for_operational_use_of_wsds.pdf
NPTL 5: WINNF-TS-0096-V1.2.0 Signaling Protocols and Procedures for Citizens Broadband Radio Service (CBRS): Spectrum Access System (SAS)—SAS Interface Technical Specification
NPTL 6: WINNF-TS-0112-V1.4.1 Requirements for Commercial Operation in the U.S. 3550-3700 MHz Citizens Broadband Radio Service Band
NPTL 7: IEEE Std 802.19.1aTM-2017 "Coexistence Methods for Geo-location Capable Devices Operating under General Authorization"
NPTL 8: 47 C.F.R Part 96 Citizens Broadband Radio Service, https://www.ecfr.gov/cgi-bin/text-idx?node=pt47.5.96#se47.5.96
NPTL 9: WINNF-TS-0245-V1.0.0 Operations for Citizens Broadband Radio Service (CBRS): Priority Access License (PAL) Database Technical Specification
NPTL 10: WINNF-TS-0061-V1.2.0 Test and Certification for Citizens Broadband Radio Service (CBRS); Conformance and Performance Test Technical Specification; SAS as Unit Under Test (UUT)
NPTL 11: WINNF-SSC-0008 Spectrum Sharing Committee Policy and Procedure Coordinated Periodic Activities Policy

SUMMARY OF THE INVENTION

Problems to be Solved by the Invention

However, simply using free radio waves does not necessarily enable effective use of radio wave resources. For example, to achieve effective use of radio wave resources, it is necessary to efficiently distribute free radio waves to wireless systems (wireless apparatuses). However, it is not easy to efficiently distribute free radio waves under variety of radio wave usage.

Hence, the present disclosure proposes a communication control apparatus, a communication apparatus, and a proxy apparatus that enable efficient use of radio wave resources.

Means for Solving the Problems

To solve the above issue, a communication control apparatus according to one embodiment of the present disclosure includes: an acquiring section that acquires information related to usage of one or more frequency resources of a second wireless system, the one or more frequency resources being included in part or all of a frequency band used by a first wireless system, the second wireless system desiring use of the one or more frequency resource; a processing section that performs a process related to the frequency resource on the basis of the information related to the usage of the frequency resource; and a notifying section that reports a result of the process related to the frequency resource.

BRIEF DESCRIPTION OF DRAWINGS

FIG. 1 is an explanatory diagram illustrating a distribution example of an interference margin to communication apparatuses constituting a secondary system.

FIG. 2 is an explanatory diagram illustrating a hierarchical structure in CBRS.

FIG. 3 is an explanatory diagram illustrating bands of the CBRS.

FIG. 4 is a diagram illustrating a configuration example of a communication system according to an embodiment of the present disclosure.

FIG. 5 is a diagram illustrating a model in which communication control apparatuses are disposed in a distributed manner.

FIG. 6 is a diagram illustrating a model in which one communication control apparatus centrally controls a plurality of communication control apparatuses.

FIG. 7 is a diagram illustrating a configuration example of a communication apparatus according to the embodiment of the present disclosure.

FIG. 8 is a diagram illustrating a configuration example of a terminal apparatus according to the embodiment of the present disclosure.

FIG. 9 is a diagram illustrating a configuration example of a communication control apparatus according to the embodiment of the present disclosure.

FIG. 10 is a diagram illustrating a configuration example of a proxy apparatus according to the embodiment of the present disclosure.

FIG. 11 is an explanatory diagram illustrating an example of an interference model assumed in the embodiment of the present disclosure.

FIG. 12 is an explanatory diagram illustrating another example of an interference model assumed in the embodiment of the present disclosure.

FIG. 13 is an explanatory diagram for explaining a primary system protection method of an interference margin simultaneous distribution type.

FIG. 14 is a diagram illustrating how a leftover interference margin occurs.

FIG. 15 is an explanatory diagram for explaining a primary system protection method of an interference margin sequential distribution type.

FIG. 16 is a sequence diagram for explaining a registration procedure.

FIG. 17 is a sequence diagram for explaining an available-frequency information query procedure.

FIG. 18 is a sequence diagram for explaining a frequency utilization permission procedure.

FIG. 19 is a state transition diagram illustrating a permission state of radio wave transmission.

FIG. 20 is a sequence diagram for explaining a frequency utilization notification procedure.

FIG. 21 is a sequence diagram for explaining a management information exchange procedure.

FIG. 22 is a sequence diagram illustrating an example of grant-related operation.

FIG. 23 is a diagram illustrating specific processing contents of periodic processing.

MODES FOR CARRYING OUT THE INVENTION

Hereinafter, embodiments of the present disclosure are described in detail with reference to the accompanying drawings. It is to be noted that, in the following embodiments, repeated description is omitted for the same components by assigning the same reference signs.

Further, in the present specification and drawings, a plurality of components having substantially the same functional configuration are distinguished by adding different numbers to the end of the same reference sign in some cases. For example, a plurality of components having substantially the same functional configuration are distinguished as necessary, like communication control apparatuses $40_1$ and $40_2$. It is to be noted that only the same reference sign is assigned to a plurality of components having substantially the same functional configuration in a case where there is no particular need to distinguish them. For example, in a case where there is no particular need to distinguish the communication control apparatuses $40_1$ and $40_2$, they are simply referred to as communication control apparatuses 40.

Further, the present disclosure will be described in the following order of items.

1. Introduction
1-1. Control of Wireless System for Achievement of Frequency Sharing
1-2. Overview of Present Embodiment
1-3. Terms Related to Frequency and Sharing
2. Configuration of Communication System
2-1. Overall Configuration of Communication System
2-2. Configuration of Base Station Apparatus
2-3. Configuration of Terminal Apparatus
2-4. Configuration of Communication Control Apparatus
2-5. Configuration of Proxy Apparatus
3. Interference Model
4. Primary System Protection Method
4-1. Interference Margin Simultaneous Distribution Type
4-2. Interference Margin Sequential Distribution Type
5. Description of Procedures
5-1. Registration Procedure
5-2. Available-Frequency Information Query Procedure
5-3. Frequency Utilization Permission Procedure
5-4. Frequency Utilization Notification
5-5. Supplement to Procedures
5-6. Procedures Related to Terminal Apparatus
5-7. Procedure Occurring Between Communication Control Apparatuses
6. Grant-related Operation
6-1. Typical Operation Flow
6-2. Addition of Grant Usage Information
6-3. Granting Determination Using Usage Information
6-4. Response Based on Granting Determination Result
6-5. Bonded Grant (Bonded Grant)
6-6. Switching to Another Band Expansion Technology
6-7. Interference Calculation
6-8. Adjustment of Allowable Amount of Interference
7. Modification Examples
7-1. Modification Examples Related to System Configuration
7-2. Other Modification Examples
8. Conclusion

1. INTRODUCTION

In recent years, an issue of depletion of radio wave resources (e.g., frequencies) allocable to wireless systems has emerged. However, it is difficult to newly allocate radio wave resources because all radio wave bands are already used by existing wireless systems. Hence, more effective use of radio wave resources by utilization of a cognitive radio technology has begun to attract attention in recent years.

The cognitive radio technology utilizes temporal and spatial free radio waves (White Space) of the existing wireless systems (e.g., dynamic frequency sharing (DSA: Dynamic Spectrum Access)) to secure radio wave resources. For example, in the United States, legislation and standardization of CBRS (Citizens Broadband Radio Service) utilizing a frequency sharing technology have been accelerating with the aim of opening to the public a Federal use band (3.55-3.70 GHz), which overlaps with frequency bands known worldwide as 3GPP bands 42 and 43.

It is to be noted that the cognitive radio technology contributes not only to the dynamic frequency sharing but also to an improvement in efficiency of frequency utilization by wireless systems. For example, ETSI EN 303 387 and IEEE 802 19.1-2014 specify a coexistence technology between wireless systems that use free radio waves.

1-1. Control of Wireless System for Achievement of Frequency Sharing

In general, in frequency sharing, national and local regulatory authorities (NRA: National Regulatory Authority) make it compulsory to protect a wireless system (primary system) of a primary user (primary user) licensed or authorized for the use of a frequency band. Typically, the NRA provides an allowable interference reference value for the primary system, and demands that interference caused by sharing by a wireless system (secondary system) of a secondary user (secondary user) fall below the allowable interference reference value.

To achieve frequency sharing, for example, a communication control apparatus (e.g., a frequency management database) controls communication of the secondary system so as not to cause fatal interference to the primary system. The communication control apparatus is an apparatus that manages communication, etc. of a communication apparatus. For example, the communication control apparatus is an apparatus (system) for management of radio wave resources (e.g., frequencies), such as a GLDB (Geo-location Database) or a SAS (Spectrum Access System). In the present embodiment, the communication control apparatus corresponds to a communication control apparatus 40 to be described later. The communication control apparatus 40 will be described in detail later.

Here, the primary system refers to, for example, a system (e.g., an existing system) that uses radio waves of a predetermined frequency band preferentially over another system such as the secondary system. Further, the secondary system refers to, for example, a system that makes secondary use (e.g., dynamic frequency sharing) of radio waves of the frequency band used by the primary system. The primary system and the secondary system may each include a plurality of communication apparatuses or one communication apparatus. The communication control apparatus distributes interference tolerance (also referred to as an interference margin) of the primary system to one or more communication apparatuses constituting the secondary system so that aggregated interference (Interference Aggregation) caused to the primary system by the one or more communication apparatuses does not exceed the interference tolerance. In this case, the interference tolerance may be an amount of interference predetermined by an operator of the primary system or a public organization, etc. that manages radio waves. In the following description, the term "interference margin" refers to the interference tolerance. Further, the aggregated interference is sometimes referred to as aggregated interference power.

FIG. 1 is an explanatory diagram illustrating a distribution example of an interference margin to communication apparatuses constituting the secondary system. In the example of FIG. 1, a communication system 1 is the primary system and a communication system 2 is the secondary system. The communication system 1 includes a wireless communication apparatus $10_1$, etc. Further, the communication system 2 includes base station apparatuses $20_1$, $20_2$, $20_3$, etc. It is to be noted that although the communication system 1 is provided with only one wireless communication apparatus 10 in the example of FIG. 1, the communication system 1 may be provided with a plurality of wireless communication apparatuses 10. Further, although the communication system 2 is provided with three base station apparatuses 20 in the example of FIG. 1, the communication system 2 may be provided with less than three or more than three base station apparatuses 20. Further, the wireless communication apparatus provided in the communication system 2 may not necessarily be a base station apparatus. It is to be noted that although only one primary system (the communication system 1 in the example of FIG. 1) and only one secondary system (the communication system 2 in the example of FIG. 1) are illustrated in the example of FIG. 1, the primary system and the secondary system may each be a plurality of systems.

The wireless communication apparatus $10_1$ and the base station apparatuses $20_1$, $20_2$, and $20_3$ are each able to transmit and receive radio waves. An amount of interference allowed by the wireless communication apparatus $10_1$ is $I_{accept}$. Further, amounts of interference caused by the base station apparatuses $20_1$, $20_2$, and $20_3$ to a predetermined protection point of the communication system 1 (primary system) are amounts of caused interference $I_1$, $I_2$, and $I_3$, respectively. Here, the protection point is an interference calculation reference point for protection of the communication system 1.

The communication control apparatus distributes the interference margin $I_{accept}$ to the plurality of base station apparatuses 20 so that the aggregated interference to the predetermined protection point of the communication system 1 (amount of received interference $I_1+I_2+I_3$ illustrated in FIG. 1) does not exceed the interference margin $I_{accept}$. For example, the communication control apparatus distributes the interference margin $I_{accept}$ to the respective base station apparatuses 20 so that the amounts of caused interference $I_1$, $I_2$, and $I_3$ are each $I_{accept}/3$. Alternatively, the communication control apparatus distributes the interference margin $I_{accept}$ to the respective base station apparatuses 20 so that the amounts of caused interference $I_1$, $I_2$, and $I_3$ are each equal to or less than $I_{accept}/3$. Needless to say, a method of distributing the interference margin is not limited to this example.

The communication control apparatus calculates maximum transmission power allowed for each base station apparatus 20 (hereinafter referred to as maximum allowable transmission power) on the basis of the amount of interference distributed (hereinafter referred to as amount of distributed interference). For example, the communication control apparatus calculates the maximum allowable transmission power of each base station apparatus 20 by back-calculating from the amount of distributed interference, on the basis of propagation loss, antenna gain, etc. Then, the communication control apparatus notifies each base station apparatus 20 of information about the calculated maximum allowable transmission power.

1-2. Overview of Present Embodiment

According to NPTL 8 (47 C.F.R Part 96), a CBRS band that a PAL licensee (Priority Access Licensee) is authorized to use by exercise of PAL (Priority Access License) is 3,550 MHz to 3,650 MHz, and it is defined that a 10-MHz channel is allocated to one PAL. A general authorized access tier (General Authorized Access Tier) is able to use radio waves in a band of 3,550 MHz to 3,700 MHz without affecting an incumbent tier (Incumbent Tier) and a priority access tier (Priority Access Tier).

Various wireless systems operate in the CBRS band; however, the CBRS band is assumed to be used mainly by LTE and 5G NR (5G New Radio). Wireless devices corresponding to a base station and an access point are legislatively referred to as CBSDs (Citizens Broadband Radio Service Device). Further, a wireless device corresponding to a user terminal is legislatively referred to as an EUD (End User Device). These CBSDs use radio waves under management of a spectrum access system (SAS: Spectrum Access System) conforming to standards specified by WInnForum (Wireless Innovation Forum). The EUD is able to use radio waves under control of a CBSD having frequency access rights (hereinafter referred to as grant (Grant)) given by the SAS.

NPTL 2 is specifications for the SAS to manage the CBSDs. In the specifications, necessary procedures for giving a grant and controlling radio wave utilization such as a registration procedure (Registration Procedure), a utilization permission procedure (Grant Procedure), a heartbeat procedure (Heartbeat Procedure) are specified.

The grant given to the CBSD is associated with an allowable frequency range (a lower limit and an upper limit) and maximum allowable EIRP (Equivalent Isotropic Radiated Power). The CBSD is able to emit radio waves by complying with these restrictions. Further, the grant is also associated with information indicating which tier of a PAL (Priority Access License) tier and a GAA (General Authorized Access) tier the grant is for (hereinafter respectively referred to as a PAL grant and a GAA grant). The SAS controls radio wave utilization of the CBSD in units of given grants.

Meanwhile, as described above, the main wireless systems are expected to be LTE and 5G NR. Specifications of LTE and 5G NR are defined in 3GPP (Third Generation Partnership Project), and as typical technologies, band extension technologies such as carrier aggregation (CA: Carrier Aggregation) and LAA (Licensed Assisted Access) are known. Accordingly, as a use case of free radio waves, for example, various use cases are assumed, such as "carrier aggregation by a combination of a plurality of PAL grants or a plurality of GAA grants" and "LAA with a combination of a PAL grant+a GAA grant".

In LAA, the PAL grant used for an anchor component carrier (CC: Component Carrier) is of much greater importance. In LAA, the SAS is able to easily know it. That is, the SAS is able to control the PAL grant to somehow maintain radio wave emission.

However, in carrier aggregation, even if a plurality of grants are used in combination, regardless of whether a plurality of granted frequency resources is PAL resources or GAA resources, the SAS is not able to know which grant is used as an anchor component carrier (hereinafter, also referred to as an anchor carrier).

Further, depending on implementation of the CBSD, it is expected that two or more successive grants may be combined to perform channel bonding (Channel Bonding). That is, in a case where the CBSD possesses a plurality of grants, the SAS does not have a way of knowing whether the CBSD is "performing carrier aggregation" or "performing channel bonding". Further, even if the CBSD possesses two or more successive grants, the SAS does not have a way of knowing whether the CBSD is "bonding" or "using, as separate component carriers," the two or more successive grants. That is, the SAS does not have a way of knowing "grant usage" such as how the CBSD is using grants.

The SAS controls use of radio waves without knowing the "grant usage", which may cause disadvantages in terms of network planning (Network planning), deployment (Deployment), operation (Operation), etc. for a CBSD user typified by a mobile network operator (MNO: Mobile Network Operator).

Accordingly, in the present embodiment, a communication control apparatus (e.g., the SAS) acquires information related to usage of a grant for the secondary system, which makes secondary use of a frequency band used by the primary system, to make secondary use of the frequency band. Then, a communication control unit performs a process related to the grant on the basis of the information related to the usage of the grant.

Thus, the communication control apparatus enables efficient management of the grants (e.g., allocation and cancellation of frequency resources to the CBSDs). As a result, efficient use of radio wave resources is achieved.

1-3. Terms Related to Frequency and Sharing

It is to be noted that, in the present embodiment, the primary system (the communication system 1) and the secondary system (the communication system 2) are assumed to be in a dynamically frequency sharing environment. Hereinafter, the present embodiment will be described taking as an example the CBRS legally prepared by the FCC (Federal Communications Commission) of the U.S. It is to be noted that the communication system 1 and the communication system 2 of the present embodiment are not limited to the CBRS.

FIG. 2 is an explanatory diagram illustrating a hierarchical structure in the CBRS. As illustrated in FIG. 2, each of users of a frequency band is classified into one of three groups. This group is called "tier". As the respective three groups, a hierarchical structure including an incumbent tier (Incumbent Tier), a priority access tier (Priority Access Tier), and a general authorized access tier (General Authorized Access Tier) is defined. In this hierarchical structure, the priority access tier (Priority Access Tier) is located higher than the general authorized access tier (General Authorized Access Tier), and the incumbent tier (Incumbent Tier) is located higher than the priority access tier. Taking the CBRS as an example, a system (existing system) located in the incumbent tier serves as the primary system, and a system located in the general authorized access tier and the priority access tier serves as the secondary system.

The incumbent tier (Incumbent Tier) is a group including existing users of the shared frequency band. In the CBRS, the Department of Defense (DOD: Department of Defense), a fixed satellite operator, and a grandfathered wireless broadband licensee (GWBL: Grandfathered Wireless Broadband Licensee) are defined as existing users. The "Incumbent Tier" is not requested to avoid or suppress interference with the "Priority Access Tier" and "the GAA (General Authorized Access) Tier" with lower priority. Further, the "Incumbent Tier" is protected against interference from the "Priority Access Tier" and the "GAA Tier". That is, the user of the "Incumbent Tier" is able to use the frequency band without considering the presence of other groups.

The priority access tier (Priority Access Tier) is a group including users with a license called PAL (Priority Access License). The "Priority Access Tier" is requested to avoid or suppress interference with the "Incumbent Tier" with higher priority than the "Priority Access Tier", but is not requested to avoid or suppress interference with the "GAA Tier" with lower priority. Further, the "Priority Access Tier" is not protected against interference from the "Incumbent Tier" with higher priority, but is protected against interference from the "GAA Tier" with lower priority.

The general authorized access tier (GAA Tier) is a group including all other users that do not belong to the "Incumbent Tier" and the "Priority Access Tier" described above. The "GAA Tier" is requested to avoid or suppress interference with the "Incumbent Tier" and the "Priority Access Tier" with higher priority. Further, the "GAA Tier" is not protected against interference from the "Incumbent Tier" and the "Priority Access Tier" with higher priority. That is, the "GAA Tier" is a "tier" that is legislatively requested of opportunistic (opportunistic) frequency utilization.

It is to be noted that the hierarchical structure is not limited to these definitions. Although the CBRS is generally referred to as a 3Tier structure, it may be a 2Tier structure. Typical examples include 2Tier structures such as LSA (Licensed Shared Access) and TVWS (TV band White Space). The LSA adopts a structure equivalent to combination of the "Incumbent Tier" and the "Priority Access Tier" described above. In addition, the TVWS adopts a structure equivalent to combination of the "Incumbent Tier" and the "GAA Tier" described above. Further, four or more Tiers may be present. Specifically, for example, an intermediate tier corresponding to the "Priority Access Tier" may be further assigned priority, etc. Further, for example, the "GAA Tier" may similarly be assigned priority, etc.

FIG. 3 is an explanatory diagram illustrating bands of the CBRS. Taking the above CBRS as an example, the primary system is a military radar system (Military Radar System), a grandfathered wireless system (Grandfathered Wireless System), or fixed satellite service (space to earth) (Fixed Satellite Service (space-to-earth)). Here, the military radar system is typically a ship-based radar. Further, the secondary system is a wireless network system including a base station and a terminal called a CBSD (Citizens Broadband Radio Service Device) and a EUD (End User Device). Priority is further present for the secondary system, and priority access license (PAL: Priority Access License) enabling licensed use of the shared band and substantially unlicensed general authorized access (GAA: General Authorized Access) are defined. A tier 1 (Tier 1) illustrated in FIG. 3 corresponds to the incumbent tier illustrated in FIG. 2. Further, a tier 2 (Tier 2) illustrated in FIG. 3 corresponds to the priority access tier illustrated in FIG. 2. In addition, a tier 3 (Tier 3) illustrated in FIG. 3 corresponds to the general authorized access tier illustrated in FIG. 2.

It is to be noted that the primary system (the communication system 1) of the present embodiment is not limited to the example illustrated in FIG. 3. Another type of wireless system may be used as the primary system (the communication system 1). For example, another wireless system may be used as the primary system, depending on the country/region/frequency band to which the present embodiment is applied. For example, the primary system may be a television broadcasting system, such as a DVB-T (Digital Video Broadcasting-Terrestrial) system. The primary system may also be a wireless system called a FS (Fixed System). It may also be frequency sharing in another frequency band. For example, typical examples may include LSA and TVWS (TV band White Space). The primary system may also be a cellular communication system such as LTE (Long Term Evolution) or NR (New Radio). The primary system may also be an aeronautical radio system, such as ARNS (Aeronautical Radio Navigation Service). Needless to say, the primary system is not limited to the above wireless system and may be another type of wireless system.

Further, the free radio waves (White Space) used by the communication system 2 is not limited to a frequency band of the Federal use band (3.55-3.70 GHz). The communication system 2 may make secondary use of a frequency band different from the Federal use band (3.55-3.70 GHz). For example, if the primary system (the communication system 1) is a television broadcasting system, the communication system 2 may be a system that makes secondary use of TV white space. Here, the TV white space refers to a frequency band that is not used by the television broadcasting system among frequency channels allocated to the television broadcasting system (primary system). In this case, the TV white space may be a channel that is not used depending on the region.

Further, the relationship between the communication system 1 and the communication system 2 is not limited to a frequency sharing relationship with the communication system 1 as the primary system and the communication system 2 as the secondary system. The relationship between the communication system 1 and the communication system 2 may be a network coexistence (Network Coexistence) relationship between identical or different wireless systems using the same frequency.

In general, in frequency sharing, the existing system using a target band is referred to as the primary system, and the system of the secondary user is referred to as the secondary system. However, in a case of applying the present embodiment to an environment other than a frequency sharing environment, these (the primary system and the secondary system) may be replaced with a system expressed by another term. For example, a macrocell in a HetNet may be used as the primary system, and a small cell or a relay station may be used as the secondary system. Further, a base station may be used as the primary system, and a Relay UE or Vehicle UE present in its coverage and implementing D2D or V2X may be used as the secondary system. The base station is not limited to a fixed type, and may be a portable/mobile type. In such a case, for example, the communication control apparatus provided by the present invention may be provided in a base station, a relay station, a Relay UE, or the like.

It is to be noted that the term "frequency" appearing in the following description may be replaced with another term. For example, the term "frequency" may be replaced with terms such as "resource," "resource block," "resource element," "channel," "component carrier," "carrier," and "subcarrier", and terms having meanings similar to these. It is to be noted that the frequency is one type of radio wave resource. The "radio wave resource" may be replaced with a "frequency resource".

2. CONFIGURATION OF COMMUNICATION SYSTEM

Hereinafter, the communication system 2 according to an embodiment of the present disclosure will be described. The communication system 2 is a wireless communication system that performs wireless communication by making secondary use of a frequency band used by the communication system 1 (first wireless system). For example, the communication system 2 is a wireless communication system that performs dynamic frequency sharing of part or all of a frequency band allocated to the communication system 1. The communication system 2 uses a predetermined wireless access technology (Radio Access Technology) to provide wireless services to a user or an apparatus of the user.

Here, the communication system 2 may be a cellular communication system such as W-CDMA (Wideband Code Division Multiple Access), cdma2000 (Code Division Multiple Access 2000), LTE, or NR. In the following description, the "LTE" is assumed to include LTE-A (LTE-Advanced), LTE-A Pro (LTE-Advanced Pro), and EUTRA (Evolved Universal Terrestrial Radio Access). Further, the "NR" is assumed to include a NRAT (New Radio Access Technology) and FEUTRA (Further EUTRA). It is to be noted that the communication system 2 is not limited to a cellular communication system. For example, the communication system 2 may be another wireless communication system, such as a wireless LAN (Local Area Network) system, a television broadcasting system, an aeronautical radio system, or a space radiocommunication system.

In the present embodiment, the communication system 1 is the primary system and the communication system 2 is the secondary system. As described above, the communication system 1 and the communication system 2 may each be a plurality of systems. It is to be noted that, although the communication system 1 includes one wireless communication apparatus 10 (the wireless communication apparatus $10_1$ illustrated in FIG. 1) in the example of FIG. 1, it may include a plurality of wireless communication apparatuses 10. The wireless communication apparatus 10 may have the same configuration as the base station apparatus 20 or a terminal apparatus 30 to be described later.

2-1. Overall Configuration of Communication System

The communication system 2 typically includes the following entities.
Communication apparatus (e.g., base station apparatus or proxy apparatus)
Terminal apparatus
Communication control apparatus It is to be noted that, in the following description, the entity to be the communication apparatus is assumed to be the base station apparatus 20 and/or a proxy apparatus 50. However, the entity to be the communication apparatus is not limited to the base station apparatus 20 and the proxy apparatus 50, and may be another communication apparatus (e.g., the terminal apparatus 30 and the communication control apparatus 40).

FIG. 4 is a diagram illustrating a configuration example of the communication system 2 according to the embodiment of the present disclosure. The communication system 2 includes the base station apparatus 20, the terminal apparatus 30, the communication control apparatus 40, and the proxy apparatus 50. The communication system 2 provides wireless services to the user or an apparatus of the user by cooperative operation of apparatuses (e.g., a communication apparatus such as a wireless communication apparatus) constituting the communication system 2. The wireless communication apparatus refers to an apparatus with a wireless communication function, and corresponds to the base station apparatus 20 and the terminal apparatus 30 in the example of FIG. 4.

It is to be noted that the communication control apparatus 40 and the proxy apparatus 50 may have a wireless communication function. In this case, the communication control apparatus 40 and the proxy apparatus 50 may also be regarded as wireless communication apparatuses. In the following description, a wireless communication apparatus is sometimes referred to simply as a communication apparatus. It is to be noted that the communication apparatus is not limited to a wireless communication apparatus. For example, an apparatus that does not have a wireless communication function and is able to perform only wired communication may also be regarded as a communication apparatus.

The communication system 2 may include a plurality of base station apparatuses 20, a plurality of terminal apparatuses 30, a plurality of communication control apparatuses 40, and a plurality of proxy apparatuses 50. In the example of FIG. 4, the communication system 1 includes base station apparatuses $20_1$, $20_2$, $20_3$, $20_4$, $20_5$, etc. as the base station apparatus 20. Further, the communication system 2 includes terminal apparatuses $30_1$, $30_2$, $30_3$, $30_4$, etc. as the terminal apparatus 30. The communication system 1 also includes communication control apparatuses $40_1$, $40_2$, etc. as the communication control apparatus 40.

It is to be noted that, in the following description, the wireless communication apparatus is sometimes referred to as a wireless system. For example, the wireless communication apparatus 10 and the base station apparatuses $20_1$ to $20_5$ each are one wireless system. Further, the terminal apparatuses $30_1$ to $30_4$ each are one wireless system. It is to be noted that the communication system 1 is the first wireless system in the following description, but each of one or more wireless communication apparatuses 10 provided in the communication system 1 may be regarded as the first wireless system. Further, each of one or more base station apparatuses 20 provided in the communication system 2 is the second wireless system in the following description, but the communication system 2 itself may be regarded as the second wireless system, or each of one or more terminal apparatuses 30 provided in the communication system 2 may be regarded as the second wireless system. Each communication control apparatus 40 or each proxy apparatus 50 may be regarded as the second wireless system if the communication control apparatus 40 and the proxy apparatus 50 have a wireless communication function.

It is to be noted that the wireless system may be one system including a plurality of communication apparatuses including at least one wireless communication apparatus. For example, a system including one or more base station apparatuses 20 and one or more terminal apparatuses 30 subordinate thereto may be regarded as one wireless system. Further, the communication system 1 or the communication system 2 may each be regarded as one wireless system. In the following description, a communication system including a plurality of communication apparatuses including at least one wireless communication apparatus is sometimes referred to as a wireless communication system or simply a communication system. It is to be noted that one system including a plurality of communication apparatuses including one wireless communication apparatus may be regarded as the first wireless system or the second wireless system.

(Base Station Apparatus)

The base station apparatus 20 (second wireless system) is a wireless communication apparatus that wirelessly communicates with the terminal apparatus 30 or another communication apparatus (another base station apparatus 20 or another proxy apparatus 50). The base station apparatus 20 is a type of communication apparatus. The base station apparatus 20 is, for example, an apparatus corresponding to a wireless base station (Base Station, Node B, eNB, gNB, etc.) or a wireless access point (Access Point). The base station apparatus 20 may be a wireless relay station. The base station apparatus 20 may be a road base station apparatus such as a RSU (Road Side Unit). Further, the base station apparatus 20 may also be an optical feeder called a RRH (Remote Radio Head). In the present embodiment, a base station of the wireless communication system is sometimes referred to as a base station apparatus. It is to be noted that a wireless access technology used by the base station apparatus 20 may be a cellular communication technology or a wireless LAN technology. Needless to say, the wireless access technology used by the base station apparatus 20 is not limited thereto and may be other wireless access technologies.

The base station apparatus 20 may not necessarily be fixed, and may be installed in a moving object like an automobile. In addition, the base station apparatus 20 may not necessarily be present on the ground; objects present in the air or space, such as aircrafts, drones, helicopters, and satellites, or objects present on and in the sea, such as ships and submarines, may be provided with communication apparatus functions. In such a case, the base station apparatus 20 may wirelessly communicate with another fixedly installed communication apparatus.

The coverage size of the base station apparatus 20 may also be a large size as with a macrocell or a small size as with a picocell. Needless to say, the coverage size of the base station apparatus 20 may be an extremely small size as with a femtocell. Further, in a case where the base station apparatus 20 has a beamforming capability, a cell or a service area may be formed for each beam.

The base station apparatus 20 may be used, operated, and/or managed by various entities. For example, a mobile network operator (MNO: Mobile Network Operator), a mobile virtual network operator (MVNO: Mobile Virtual Network Operator), a mobile virtual network enabler (MVNE: Mobile Virtual Network Enabler), a neutral host network (NHN: Neutral Host Network) operator, an enterprise, an educational body (school corporation, local board of education, etc.), a real estate (building, apartment, etc.) administrator, an individual, etc. may be assumed for the base station apparatus 20. Needless to say, a subject responsible for using, operating, and/or managing the base station apparatus 20 is not limited thereto.

The base station apparatus 20 may be installed and/or operated by one operator or may be installed and/or operated by one individual. Needless to say, the subject responsible for installing and operating the base station apparatus 20 is not limited thereto. For example, the base station apparatus 20 may be jointly installed and operated by a plurality of operators or a plurality of individuals. The base station apparatus 20 may also be a shared facility used by a plurality of operators or a plurality of individuals. In this case, installation and/or operation of the facility may be performed by a third party different from the users.

The base station apparatus 20 operated by the operator is typically Internet-connected via a core network. In addition, the base station apparatus 20 is operated and maintained by a function called OA&M (Operation, Administration & Maintenance). It is to be noted that, for example, the communication system 2 may include a network manager that integrates and controls the base station apparatuses 20 in the network.

It is to be noted that the concept of a base station includes access points and wireless relay stations (also called relay apparatuses). Further, the concept of a base station includes not only a structure (Structure) with a function of a base station, but also an apparatus installed in the structure. The structure is, for example, a building (Building) such as an office building, a house, a steel tower, a station facility, an airport facility, a port facility, or a stadium. It is to be noted that the concept of a structure includes not only buildings but also constructions (Non-building structure) such as tunnels, bridges, dams, walls, and steel columns, as well as facilities such as cranes, gates, or wind turbines. Further, the concept of a structure includes not only a structure on the land (a ground in a narrow sense) or underground, but also a structure over water such as piers and mega-floats, and an underwater structure such as oceanographic observation facilities.

The base station may also be a movably configured base station (mobile station). In this case, the base station (mobile station) may be a wireless communication apparatus installed in a mobile body or may be the mobile body itself. Further, the mobile body may be a mobile body (e.g., a vehicle such as an automobile, a bus, a truck, a train, or a linear motor car) that moves over the land (a ground in a narrow sense), or may be a mobile body (e.g., a subway) that moves underground (e.g., in a tunnel). Needless to say, the mobile body may be a mobile terminal such as a smart phone. The mobile body may also be a mobile body moving over water (e.g., a vessel such as a passenger ship, a cargo ship, or a hovercraft), or may be a mobile body moving underwater (e.g., a submersible such as a submersible vessel, a submarine, or an unmanned underwater vehicle). The mobile body may also be a mobile body moving in the atmosphere (e.g., an aircraft such as an airplane, an airship, or a drone), or may be a space mobile body moving outside the atmosphere (e.g., an artificial celestial body such as an artificial satellite, a spacecraft, a space station, or an explorer).

[Terminal Apparatus]

The terminal apparatus 30 is communication equipment having a communication function. The terminal apparatus 30 is typically communication equipment such as a smart phone. The terminal apparatus 30 may be a user terminal such as a cellular phone, a smart device (a smart phone or a tablet), a wearable terminal, a PDA (Personal Digital Assistant), or a personal computer. The terminal apparatus is sometimes referred to as User Equipment, a User Terminal, a User Station, a Mobile Terminal, a Mobile Station, etc.

It is to be noted that the terminal apparatus 30 may not be used by persons. The terminal apparatus 30 may be a sensor installed in a machine or building of a factory, like so-called MTC (Machine Type Communication). The terminal apparatus 30 may also be an M2M (Machine to Machine) device or an IoT (Internet of Things) device. Further, the terminal apparatus 30 may be an apparatus having a relay communication function, as typified by D2D (Device to Device) and V2X (Vehicle to everything). Further, the terminal apparatus 30 may be equipment called CPE (Client Premises Equipment) and used in a wireless backhaul or the like. Further, the terminal apparatus 30 may be a wireless communication apparatus installed in a mobile body or may be the mobile body itself.

In addition, the terminal apparatus 30 may not necessarily be present on the ground, and may be objects present in the air or space, such as aircrafts, drones, helicopters, and satellites, and objects present on and in the sea, such as ships and submarines.

[Communication Control Apparatus]

The communication control apparatus 40 is an apparatus that manages the base station apparatus 20. For example, the communication control apparatus 40 is an apparatus that controls wireless communication of the base station apparatus 20. For example, the communication control apparatus 40 determines communication parameters (also referred to as operation parameters) to be used by the base station apparatus 20, and issues a permission or an instruction to the base station apparatus 20. In this case, the communication control apparatus 40 may be a network manager that integrates and controls the wireless apparatuses in the network. Taking ETSI EN 303 387 and IEEE 802. 19.1-2014 as an example, the communication control apparatus 40 may be a control apparatus such as a Spectrum Manager/Coexistence Manager that performs radio wave interference control between pieces of wireless equipment. Further, for example, a RLSS (Registered Location Secure Server) specified in IEEE 802. 11-2016 may also serve as the communication control apparatus 40. In addition, in a frequency sharing environment, a database (database server, apparatus, or system) such as a GLDB (Geolocation database) or a SAS (Spectrum Access System) may also serve as the communication control apparatus 40. Basically, the control target of the communication control apparatus 40 is the base station apparatus 20, but the communication control apparatus 40 may control the terminal apparatus 30 subordinate thereto.

It is to be noted that a plurality of communication control apparatuses 40 may be present in one communication system 2. FIG. 5 illustrates a model in which the communication control apparatuses 40 are disposed in a distributed manner. In this case, the plurality of communication control apparatuses 40 (in the example of FIG. 5, the communication control apparatus 40$_1$ and the communication control apparatus 40$_2$) exchange information about the base station apparatus 20 managed by each other, and perform necessary frequency allocation and interference control calculation.

The communication control apparatus 40 may also be a master-slave type apparatus. FIG. 6 is a diagram illustrating a model in which one communication control apparatus centrally controls a plurality of communication control apparatuses (so-called master-slave model). In the example of FIG. 6, the master communication control apparatus is a communication control apparatus 40$_3$, and the slave communication control apparatuses are communication control apparatuses 40$_4$ and 40$_5$. In such a system, the master communication control apparatus is able to control a plurality of slave communication control apparatuses and make decisions intensively. In addition, the master communication control apparatus may delegate and abandon the decision-making authority for the slave communication control apparatuses for load distribution (load balancing) or the like.

It is to be noted that the communication control apparatus 40 may, to play its role, acquire necessary information also from entities other than the base station apparatus 20, the terminal apparatus 30, and the proxy apparatus 50. Specifically, the communication control apparatus 40 may acquire information necessary for protection, such as position information of the primary system, from a database (regulatory database) managed and operated by a national or local radio wave administrative agency, for example. Examples of regulatory databases include a ULS (Universal Licensing System) operated by the U.S. Federal Communications Commissions (Federal Communications Commissions). Other examples of information necessary for protection may include, for example, an out-of-band emission limit (OOBE (Out-of-Band Emission) Limit), an adjacent-channel leakage ratio (ACLR: Adjacent Channel Leakage Ratio), adjacent-channel selectivity (Adjacent Channel Selectivity), a fading margin, and/or a protection ratio (PR: Protection Ratio). For these examples, in a case where numerical values are fixedly given by law, it is desirable to use them.

Further, as other examples, it may be assumed that the communication control apparatus 40 acquires radio wave sensing information from a radio wave sensing system that is installed and operated for radio wave detection of the primary system. As a specific example, the communication control apparatus 40 may acquire radio wave detection information of the primary system from a radio wave sensing system such as an environmental sensing function (ESC: Environmental Sensing Capability) in the U.S. CBRS. Further, in a case where a communication apparatus or a terminal has a sensing function, the communication control apparatus 40 may acquire radio wave detection information of the primary system from them.

[Proxy Apparatus]

The proxy apparatus 50 (proxy system) is an apparatus that acts on behalf of (as a representative for) one or more communication apparatuses (e.g., the base station apparatus 20) to communicate with the communication control apparatus 40. The proxy apparatus 50 is also a type of communication apparatus. The proxy apparatus 50 may be a DP (Domain Proxy) specified in NPTL 2 or the like. Here, the DP refers to an entity that communicates with the SAS on behalf of each of a plurality of CBSDs or a network including a plurality of CBSDs. It is to be noted that the proxy apparatus 50 is not limited to the DP specified in NPTL 2, as long as it has a function of acting on behalf of (as a representative for) one or more communication apparatuses to communicate with the communication control apparatus 40. A network manager that integrates and controls the base station apparatuses 20 in the network may be regarded as the proxy apparatus 50.

Interfaces between the entities may be either wired or wireless. For example, as an interface between the communication control apparatus and the communication apparatus, it is possible to use a wireless interface independent of frequency sharing, as well as a wired circuit. In this case, the wireless interface may be, for example, a wireless interface provided by a mobile network operator via a licensed band (Licensed band) or a wireless interface using an existing license-exempt band (License-exempt band) (e.g., a wireless interface using Wi-Fi communication).

The configurations of the apparatuses constituting the communication system 2 will be specifically described below.

2-2. Configuration of Base Station Apparatus

First, the configuration of the base station apparatus 20 will be described. FIG. 7 is a diagram illustrating a configuration example of the base station apparatus 20 according to the embodiment of the present disclosure. The base station apparatus 20 is a wireless communication apparatus (wireless system) that wirelessly communicates with the terminal apparatus 30 under the control of the communication control apparatus 40. For example, the base station apparatus 20 is a base station apparatus (ground station apparatus) located on the ground. In this case, the base station apparatus 20 may be a base station apparatus installed in a structure located on the ground, or may be a base station apparatus installed in a mobile body moving over the ground. More specifically, the base station apparatus 20 may be an antenna installed in a structure, such as a building, and a signal processing apparatus coupled to the antenna. Needless to say, the base station apparatus 20 may be a structure or mobile body itself. The "ground" is a ground in a broad sense that includes not only the land (a ground in a narrow sense) but also underground, over water, and underwater. The base station apparatus 20 is a type of communication apparatus.

It is to be noted that the base station apparatus 20 is not limited to the ground station apparatus. For example, the base station apparatus 20 may be a base station apparatus (non-ground station apparatus) that moves or floats in the air or in space. In this case, the base station apparatus 20 may be an aircraft station apparatus or a satellite station apparatus.

The aircraft station apparatus may be an apparatus mounted on an aircraft or the like, or it may be the aircraft itself. The concept of the aircraft includes not only a heavy aircraft such as airplanes and gliders, but also a light aircraft such as balloons and airships. The concept of the aircraft also includes rotorcrafts such as helicopters and autogyros. It is to be noted that the aircraft station apparatus (or an aircraft on which the aircraft station apparatus is mounted) may be a manned aircraft or an unmanned aircraft such as a drone.

The satellite station apparatus may be an apparatus mounted on a space mobile body such as an artificial satellite, or may be a space mobile body itself. The satellite to be the satellite station apparatus may be any of a low-earth-orbiting (LEO: Low Earth Orbiting) satellite, a medium-earth-orbiting (MEO: Medium Earth Orbiting) satellite, a geostationary-earth-orbiting (GEO: Geostationary Earth Orbiting) satellite, and a highly elliptical orbiting (HEO: Highly Elliptical Orbiting) satellite. Needless to say, the satellite station apparatus may be an apparatus mounted on a low-earth-orbiting satellite, a medium-earth-orbiting satellite, a geostationary satellite, or a highly elliptical orbiting satellite.

The base station apparatus 20 may also be a relay station apparatus. The relay station apparatus is, for example, an aeronautical station or an earth station. The relay station apparatus may be regarded as a type of the relay apparatus described above. The aeronautical station is a wireless station installed on the ground or in a mobile body moving over the ground to communicate with the aircraft station apparatus. In addition, the earth station is a wireless station located on the earth (including in the air) to communicate with the satellite station apparatus. The earth station may be a large earth station, or a small earth station such as a VSAT (Very Small Aperture Terminal). It is to be noted that the earth station may be a VSAT control earth station (also referred to as a master station or a HUB station) or may be a VSAT earth station (also referred to as a slave station). The earth station may also be a wireless station installed in a mobile body moving over the ground. Examples of an earth station to be mounted on a vessel include earth stations on board vessels (ESV: Earth Stations on board Vessels). In addition, the earth station may include an aircraft earth station that is installed in an aircraft (including a helicopter) and communicates with the satellite station. In addition, the earth station may include an aeronautical earth station that is installed in a mobile body moving over the ground and communicates with the aircraft earth station via the satellite station. It is to be noted that the relay station apparatus may be a portable wireless station that communicates with a satellite station or an aircraft station.

The base station apparatus 20 includes a wireless communication unit 21, a storage unit 22, a network communication unit 23, and a control unit 24. It is to be noted that the configuration illustrated in FIG. 7 is a functional configuration, and a hardware configuration may be different from this. Further, the functions of the base station apparatus 20 may be implemented in a distributed manner in a plurality of physically separated apparatuses.

The wireless communication unit 21 is a wireless communication interface that wirelessly communicates with another communication apparatus (e.g., the terminal apparatus 30, the communication control apparatus 40, the proxy apparatus 50, and another base station apparatus 20). The wireless communication unit 21 operates under the control of the control unit 24. The wireless communication unit 21 may support a plurality of wireless access schemes. For example, the wireless communication unit 21 may support both NR and LTE. The wireless communication unit 21 may support other cellular communication schemes such as W-CDMA and cdma2000. Further, the wireless communication unit 21 may support a wireless LAN communication scheme in addition to the cellular communication scheme. Needless to say, the wireless communication unit 21 may only support one wireless access scheme.

The wireless communication unit 21 includes a receiving processor 211, a transmitting processor 212, and an antenna 213. The wireless communication unit 21 may include a plurality of receiving processors 211, a plurality of transmitting processors 212, and a plurality of antennas 213. It is to be noted that, in a case where the wireless communication unit 21 supports a plurality of wireless access schemes, each part of the wireless communication unit 21 may be configured individually for each wireless access scheme. For example, if the base station apparatus 20 supports NR and LTE, the receiving processor 211 and the transmitting processor 212 may be configured individually for the NR and the LTE.

The receiving processor 211 processes uplink signals received via the antenna 213. The receiving processor 211 includes a wireless receiver 211a, a demultiplexer 211b, a demodulator 211c, and a decoder 211d.

The wireless receiver 211a performs, on the uplink signal, down-conversion, removal of unwanted frequency components, control of amplifying levels, quadrature demodulation, conversion to a digital signal, removal of a guard interval, extraction of a frequency domain signal by fast Fourier transform, and the like. For example, assume that the wireless access scheme of the base station apparatus 20 is a cellular communication scheme such as LTE. In this case, the demultiplexer 211b demultiplexes, from the signal outputted from the wireless receiver 211a, uplink channels such as a PUSCH (Physical Uplink Shared Channel) or a PUCCH (Physical Uplink Control Channel) and an uplink reference signal. The demodulator 211c demodulates received signals by using a modulation scheme such as BPSK (Binary Phase Shift Keying) or QPSK (Quadrature Phase shift Keying) for modulation symbols of the uplink channels. The modulation scheme used by the demodulator 211c may be 16QAM (Quadrature Amplitude Modulation), 64 QAM, or 256 QAM. The decoder 211d performs decoding processing on encoded bits of the demodulated uplink channels. The decoded uplink data and uplink control information are outputted to the control unit 24.

The transmitting processor 212 performs a process of transmitting downlink control information and downlink data. The transmitting processor 212 includes an encoder 212a, a modulator 212b, a multiplexer 212c, and a wireless transmitter 212d.

The encoder 212a encodes the downlink control information and the downlink data inputted from the control unit 24 by using an encoding scheme such as block encoding, convolutional encoding, or turbo-encoding. The modulator 212b modulates the encoded bits outputted from the encoder 212a by a predetermined modulation scheme such as BPSK, QPSK, 16 QAM, 64 QAM, or 256 QAM. The multiplexer 212c multiplexes modulation symbols of the respective channels and a downlink reference signal, and disposes the resulting signal in a predetermined resource element. The wireless transmitter 212d performs various signal processing on the signal from the multiplexer 212c. For example, the wireless transmitter 212d performs processing such as conversion to a time domain by a fast Fourier transform, addition of a guard interval, generation of a baseband digital signal, conversion to an analog signal, quadrature modulation, up-conversion, removal of extra frequency components, and power amplification. The signal generated by the transmitting processor 212 is transmitted from the antenna 213.

The storage unit 22 is a data-readable/writable storage apparatus such as a DRAM, an SRAM, a flash memory, or a hard disk. The storage unit 22 functions as a storage means of the base station apparatus 20. The storage unit 22 stores desired transmission power information, operation parameters, possessed resource information, and the like.

The desired transmission power information is information about transmission power that the base station apparatus 20 requests of the communication control apparatus 40 as information about transmission power necessary to transmit radio waves.

The operation parameters are information (e.g., setting information) related to radio wave transmission operation of the base station apparatus 20. For example, the operation parameter is information about a maximum value of transmission power (maximum allowable transmission power) allowed for the base station apparatus 20. Needless to say, the operation parameter is not limited to information about the maximum allowable transmission power.

Further, the possessed resource information is information related to radio resource possession of the base station apparatus 20. For example, the possessed resource information is information about radio resources currently available for the base station apparatus 20. For example, the possessed resource information is information about an amount of the possessed interference margin allocated from the communication control apparatus 40 to the base station apparatus 20. The information about the possessed amount may be information in units of resource blocks to be described later. That is, the possessed resource information may be information related to resource blocks possessed by the base station apparatus 20 (e.g., an amount of the possessed resource blocks).

The network communication unit 23 is a communication interface for communication with another apparatus (e.g., the communication control apparatus 40, the proxy apparatus 50, and another base station apparatus 20). For example, the network communication unit 23 is a LAN (Local Area Network) interface such as a NIC (Network Interface Card). The network communication unit 23 may be a USB interface including a USB (Universal Serial Bus) host controller, a USB port, and the like. Further, the network communication unit 23 may be a wired interface or may be a wireless interface. The network communication unit 23 functions as a network communication means of the base station apparatus 20. The network communication unit 23 communicates with the other apparatus under the control of the control unit 24.

The control unit 24 is a controller (Controller) that controls each part of the base station apparatus 20. The control unit 24 is, for example, implemented by a processor such as a CPU (Central Processing Unit) or an MPU (Micro Processing Unit). For example, the control unit 24 is implemented by the processor executing a variety of programs stored in the storage apparatus inside the base station apparatus 20 by using a RAM (Random Access Memory), etc. as a work area. It is to be noted that the control unit 24 may be implemented by an integrated circuit such as an ASIC (Application Specific Integrated Circuit) or a FPGA (Field Programmable Gate Array). The CPU, the MPU, the ASIC, and the FPGA may all be regarded as controllers.

The control unit 24 includes an acquiring section 241, a setting section 242, a transmitter 243, and a wireless communication control section 244 as illustrated in FIG. 7. The blocks (the acquiring section 241 to the wireless communication control section 244) constituting the control unit 24 are functional blocks that indicate the functions of the control unit 24. These functional blocks may be software blocks or hardware blocks. For example, the functional blocks described above may each be one software module implemented by software (including a microprogram) or may be one circuit block on a semiconductor chip (die). Needless to say, the functional blocks may each be one processor or one integrated circuit. The functional block may be configured by any method. It is to be noted that the control unit 24 may be configured in functional units different from the functional blocks described above.

The blocks (the acquiring section 241 to the wireless communication control section 244) constituting the control unit 24 may operate as follows.

For example, the transmitter 243 makes a request for a grant and transmits information related to usage of the grant to the communication control apparatus 40 including an acquiring section and a processing section. The grant is for a communication apparatus, which uses radio waves of a frequency band used by the first wireless system, to use the radio waves. The acquiring section acquires information related to usage of the grant, and the processing section performs a grant-related process on the basis of the information related to the usage of the grant. Then, the wireless communication control section 244 controls the wireless communication unit 21 on the basis of a grant given by the communication control apparatus 40 on the basis of the request for the grant.

Operations of the blocks (the acquiring section 241 to the wireless communication control section 244) constituting the control unit 24 will be described later.

2-3. Configuration of Terminal Apparatus

Next, the configuration of the terminal apparatus 30 will be described. FIG. 8 is a diagram illustrating a configuration example of the terminal apparatus 30 according to the embodiment of the present disclosure. The terminal apparatus 30 is a communication apparatus that wirelessly communicates with the base station apparatus 20 and/or the communication control apparatus 40. It is to be noted that, in the present embodiment, the concept of a communication apparatus (or wireless communication apparatus) includes not only a base station apparatus and a proxy apparatus, but also a terminal apparatus. The communication apparatus (or wireless communication apparatus) may also be referred to as a wireless system.

The terminal apparatus 30 includes a wireless communication unit 31, a storage unit 32, an input-output unit 33, and a control unit 34. It is to be noted that the configuration illustrated in FIG. 8 is a functional configuration, and a hardware configuration may be different from this. Further, the functions of the terminal apparatus 30 may be implemented in a distributed manner in a plurality of physically separated components.

The wireless communication unit 31 is a wireless communication interface that wirelessly communicates with another communication apparatus (e.g., the base station apparatus 20 and another terminal apparatus 30). The wireless communication unit 31 operates under the control of the control unit 34. The wireless communication unit 31 supports one or more wireless access schemes. For example, the wireless communication unit 31 supports both NR and LTE. The wireless communication unit 31 may support another wireless access scheme, such as W-CDMA or cdma2000.

The wireless communication unit 31 includes a receiving processor 311, a transmitting processor 312, and an antenna 313. The wireless communication unit 31 may include a plurality of receiving processors 311, a plurality of transmitting processors 312, and a plurality of antennas 313. It is to be noted that, in a case where the wireless communication unit 31 supports a plurality of wireless access schemes, each part of the wireless communication unit 31 may be configured individually for each wireless access scheme. For example, the receiving processor 311 and the transmitting processor 312 may be configured individually for the LTE and the NR. The configurations of the receiving processor 311 and the transmitting processor 312 are similar to those of the receiving processor 211 and the transmitting processor 212 of the base station apparatus 20.

The storage unit 32 is a data-readable/writable storage apparatus such as a DRAM, an SRAM, a flash memory, or a hard disk. The storage unit 32 functions as a storage means of the terminal apparatus 30.

The input-output unit 33 is a user interface for exchange of information with a user. For example, the input-output unit 33 is an operation apparatus for the user to perform various operations, such as a keyboard, a mouse, an operation key, or a touch panel. Alternatively, the input-output unit 33 is a display apparatus such as a liquid crystal display (Liquid Crystal Display) or an organic EL display (Organic Electroluminescence Display). The input-output unit 33 may be an acoustic apparatus such as a loudspeaker or a buzzer. Further, the input-output unit 33 may be a lighting apparatus such as an LED (Light Emitting Diode) lamp. The input-output unit 33 functions as an input/output means (input means, output means, operation means, or notification means) of the terminal apparatus 30.

The control unit 34 is a controller that controls each part of the terminal apparatus 30. The control unit 34 is, for example, implemented by a processor such as a CPU or an MPU. For example, the control unit 34 is implemented by the processor executing a variety of programs stored in the storage apparatus inside the terminal apparatus 30 by using a RAM, etc. as a work area. It is to be noted that the control unit 34 may be implemented by an integrated circuit such as an ASIC or a FPGA. The CPU, the MPU, the ASIC, and the FPGA may all be regarded as controllers.

2-4. Configuration of Communication Control Apparatus

The communication control apparatus 40 is an apparatus that controls wireless communication of the base station apparatus 20. The communication control apparatus 40 may control wireless communication of the terminal apparatus 30 directly or via the base station apparatus 20. The communication control apparatus 40 may be a network manager that integrates and controls the wireless apparatuses within the network. For example, the communication control apparatus 40 may be a Spectrum Manager/Coexistence Manager. The communication control apparatus 40 may also be a database server such as a GLDB (Geolocation database) or a SAS (Spectrum Access System).

It is to be noted that, if the communication system 2 is a cellular communication system, the communication control apparatus 40 may be an apparatus constituting a core network. A core network CN is, for example, an EPC (Evolved Packet Core) or a 5GC (5G Core network). If the core network is an EPC, the communication control apparatus 40 may be, for example, an apparatus having a function as an MME (Mobility Management Entity). Further, if the core network is a 5GC, the communication control apparatus 40 may be, for example, an apparatus having a function as an AMF (Access and Mobility Management Function). It is to be noted that, even in a case where the communication system 2 is a cellular communication system, the communication control apparatus 40 may not necessarily be an apparatus that constitutes a core network. For example, the communication control apparatus 40 may be an apparatus having a function as an RNC (Radio Network Controller).

It is to be noted that the communication control apparatus 40 may have a function of a gateway. For example, if the core network is an EPC, the communication control apparatus 40 may be an apparatus having a function as a S-GW (Serving Gateway) or a P-GW (Packet Data Network Gateway). Further, if the core network is a 5GC, the communication control apparatus 40 may be an apparatus having a function as a UPF (User Plane Function). It is to be noted that the communication control apparatus 40 may not necessarily be an apparatus constituting the core network. For example, assume that the core network is a core network of W-CDMA or cdma2000. In this case, the communication control apparatus 40 may be an apparatus that functions as an RNC (Radio Network Controller).

The communication control apparatus 40 may also be a system that controls a plurality of secondary systems. In this case, the communication system 2 may be regarded as a system including a plurality of secondary systems.

FIG. 9 is a diagram illustrating a configuration example of the communication control apparatus 40 according to the embodiment of the present disclosure. The communication control apparatus 40 includes a wireless communication unit 41, a storage unit 42, a network communication unit 43, and a control unit 44. It is to be noted that the configuration illustrated in FIG. 9 is a functional configuration, and a hardware configuration may be different from this. Further, the functions of the communication control apparatus 40 may be implemented in a distributed manner in a plurality of physically separated components. For example, the communication control apparatus 40 may include a plurality of server apparatuses.

The wireless communication unit 41 is a wireless communication interface that wirelessly communicates with another communication apparatus (e.g., the base station apparatus 20, the terminal apparatus 30, the proxy apparatus 50, and another communication control apparatus 40). The wireless communication unit 41 operates under the control of the control unit 44. The wireless communication unit 31 supports one or more wireless access schemes. For example, the wireless communication unit 31 supports both NR and LTE. The wireless communication unit 31 may support another wireless access scheme, such as W-CDMA or cdma2000. The configuration of the wireless communication unit 41 is similar to the configuration of the wireless communication unit 21 of the base station apparatus 20.

The storage unit 42 is a data-readable/writable storage apparatus such as a DRAM, an SRAM, a flash memory, or a hard disk. The storage unit 22 functions as a storage means of the base station apparatus 20. The storage unit 22 stores operation parameters of each of the plurality of base station apparatuses 20 constituting the communication system 2. It is to be noted that the storage unit 22 may store the possessed resource information of each of the plurality of base station apparatuses 20 constituting the communication system 2. As described above, the possessed resource information is information related to the possession of radio resources of the base station apparatus 20. It is to be noted that the communication control apparatus 40 may store information in a file server 60.

The network communication unit 43 is a communication interface for communication with another apparatus (e.g., the base station apparatus 20, the proxy apparatus 50, and another communication control apparatus 40). The network communication unit 43 may be a network interface or an equipment connection interface. For example, the network communication unit 43 may be a LAN (Local Area Network) interface such as a NIC (Network Interface Card). The network communication unit 43 may also be a USB interface including a USB (Universal Serial Bus) host controller, a USB port, and the like. Further, the network communication unit 43 may be a wired interface or a wireless interface. The network communication unit 43 functions as a communication means of the communication control apparatus 40. The network communication unit 43 communicates with the base station apparatus 20, the terminal apparatus 30, and the proxy apparatus 50 under the control of the control unit 44.

The control unit 44 is a controller that controls each part of the communication control apparatus 40. The control unit 44 is, for example, implemented by a processor such as a CPU or an MPU. For example, the control unit 44 is implemented by the processor executing a variety of programs stored in the storage apparatus inside the communication control apparatus 40 by using a RAM, etc. as a work area. It is to be noted that the control unit 44 may be implemented by an integrated circuit such as an ASIC or a FPGA. The CPU, the MPU, the ASIC, and the FPGA may all be regarded as controllers.

The control unit 44 includes an acquiring section 441, a processing section 442, a calculating section 443, and a notifying section 444, and an adjusting section 445 as illustrated in FIG. 9. The blocks (the acquiring section 441 to the adjusting section 445) constituting the control unit 44 are functional blocks that indicate the functions of the control unit 44. These functional blocks may be software blocks or hardware blocks. For example, the functional blocks described above may each be one software module implemented by software (including a microprogram) or may be one circuit block on a semiconductor chip (die). Needless to say, the functional blocks may each be one processor or one integrated circuit. The functional block may be configured by any method. It is to be noted that the control unit 44 may be configured in functional units different from the functional blocks described above.

The blocks (the acquiring section 441 to the adjusting section 445) constituting the control unit 44 may operate as follows.

For example, the acquiring section 441 acquires information related to usage of a grant for the second wireless system, which makes secondary use of a frequency band used by the first wireless system, to make secondary use of the frequency band. Then, the processing section 442 performs a grant-related process on the basis of the information related to usage of the grant.

In this case, the information related to the usage of the grant may include grouping information indicating that the second wireless system uses a plurality of radio wave resources, of which use is permitted by a plurality of grants, in association with each other. Then, the processing section 442 may perform the grant-related process on the basis of the grouping information. In this case, the processing section 442 may perform a process of giving a grant on the basis of the grouping information. Further, the processing section 442 performs a grant suspension process on the basis of the grouping information.

Further, the information related to the usage of the grant may further include technology identification information for identifying band extension technologies to be used upon using a plurality of radio wave resources in association with each other by the second wireless system. Then, the processing section 442 may perform the grant-related process for a plurality of grants on the basis of the technology identification information. In this case, band extension technologies identifiable by the technology identification information may include at least one technology selected from carrier aggregation, LAA (Licensed Assisted Access), channel bonding, or dual connectivity.

Further, the information related to the usage of the grant may include component carrier type information for identifying a component carrier type of each of a plurality of radio wave resources associated with each other by carrier aggregation. Then, the processing section 442 may perform the grant-related process for a plurality of grants on the basis of the component carrier type information. In this case, component carrier types identifiable by the component carrier type information may include at least one of a primary component carrier or a secondary component carrier. In this case, in a case where a grant of one or a predetermined number of radio wave resources among the plurality of radio wave resources associated with each other by carrier aggregation is suspended, the processing section 442 may suspend one or a predetermined grants selected from among grants of radio wave resources of component carrier types other than the primary component carrier or grants of radio wave resources of a component carrier type being the secondary component carrier among the plurality of radio wave resources.

Further, in case where a plurality of radio wave resources is associated with each other by channel bonding, the processing section 442 may perform the grant-related process for one grant as which a plurality of grants related to the plurality of radio wave resources that is regarded. In this case, in a case where use of one or a predetermined number of radio wave resources among a plurality of radio wave resources that has been already granted and is associated with each other by channel bonding has to be suspended, the processing section 442 may divide the one grant into a plurality of grants and suspend one or a predetermined number of grants among the plurality of grants divided. In this case, the notifying section 444 may notify the second wireless system or the proxy system acting on behalf of the second wireless system that the one grant is to be divided into a plurality of grants before suspending the one or predetermined number of grants.

Further, the acquiring section 441 may acquire possessed function information related to functions of band extension technologies of the second wireless system. Then, the processing section 442 may perform the grant-related process on the basis of the possessed function information. In this case, in a case where segmentation of a plurality of radio wave resources that has been already granted by the second wireless system and is associated with each other by channel bonding is expected by suspension of some of the plurality of radio wave resources, the notifying section 444 may notify the second wireless system or the proxy system acting on behalf of the second wireless system of switching to another band extension technology determined on the basis of the possessed function information.

Further, the calculating section 443 may perform calculation related to radio wave interference with the first wireless system on the basis of the grouping information.

Further, the adjusting section 445 may adjust allowable amounts of interference of grants on the basis of the grouping information. In this case, the adjusting section 445 may adjust an allowable amount of interference of each of a plurality of grants associated with each other by the grouping information to the lowest allowable amount of interference among the allowable amounts of interference of the plurality of grants.

Further, the information related to the usage of the grant may include service type information indicating a type of service to be performed by using a radio wave resource of which use is permitted by a grant. Then, the processing section 442 may perform the grant-related process on the basis of the service type information.

Other operations of the blocks (the acquiring section 441 to the adjusting section 445) constituting the control unit 44 will be described later.

2-5. Configuration of Proxy Apparatus

Next, the configuration of the proxy apparatus 50 will be described. FIG. 10 is a diagram illustrating a configuration example of the proxy apparatus 50 according to the embodiment of the present disclosure. The proxy apparatus 50 is a communication apparatus that communicates with the base station apparatus 20 and the communication control apparatus 40. The proxy apparatus 50 is a proxy system that acts on behalf of (as a representative for) one or more base station apparatuses 20 to communicate with the communication control apparatus 40. For example, the proxy apparatus 50 is a domain proxy (DP: Domain Proxy) that acts on behalf of (as a representative for) a plurality of CBSDs.

It is to be noted that the proxy system may include one apparatus, or may include a plurality of apparatuses. The communication between the proxy apparatus 50 and the base station apparatus 20 may be wired communication or wireless communication. Similarly, the communication between the proxy apparatus 50 and the communication control apparatus 40 may be wired communication or wireless communication.

It is to be noted that the communication apparatus on behalf of which the proxy apparatus 50 acts (as a representative) is not limited to the base station apparatus 20 and may be, for example, the terminal apparatus 30. In the following description, one or more communication apparatuses (e.g., one or more base station apparatuses 20) on behalf of which the proxy apparatus 50 acts (as a representative) may be referred to as subordinate communication apparatuses (e.g., subordinate base station apparatuses 20).

The proxy apparatus 50 includes a wireless communication unit 51, a storage unit 52, a network communication unit 53, and a control unit 54. It is to be noted that the configuration illustrated in FIG. 10 is a functional configuration, and a hardware configuration may be different from this. Further, the functions of the proxy apparatus 50 may be implemented in a distributed manner in a plurality of physically separated components.

The wireless communication unit 51 is a wireless communication interface that wirelessly communicates with another communication apparatus (e.g., the base station apparatus 20, the terminal apparatus 30, the communication control apparatus 40, and another proxy apparatus 50). The wireless communication unit 51 operates under the control of the control unit 54. The wireless communication unit 51 supports one or more wireless access schemes. For example, the wireless communication unit 31 supports both NR and LTE. The wireless communication unit 51 may support another wireless access scheme, such as W-CDMA or cdma2000.

The storage unit 52 is a data-readable/writable storage apparatus such as a DRAM, an SRAM, a flash memory, or a hard disk. The storage unit 52 functions as a storage means of the proxy apparatus 50. The storage unit 22 may store the desired transmission power information, the operation parameters, the possessed resource information, and the like of each of the subordinate base station apparatuses 20.

The network communication unit 53 is a communication interface for communication with another apparatus (e.g., the base station apparatus 20, the communication control apparatus 40, and another proxy apparatus 50). For example, the network communication unit 53 is a LAN interface such as a NIC. The network communication unit 53 may be a USB interface including a USB host controller, a USB port, and the like. Further, the network communication unit 53 may be a wired interface or a wireless interface. The network communication unit 53 functions as a network communication means of the proxy apparatus 50. The network communication unit 53 communicates with the other apparatus under the control of the control unit 54.

The control unit 54 is a controller (Controller) that controls each part of the proxy apparatus 50. The control unit 54 is, for example, implemented by a processor such as a CPU (Central Processing Unit) or an MPU (Micro Processing Unit). For example, the control unit 54 is implemented by the processor executing a variety of programs stored in the storage apparatus inside the proxy apparatus 50 by using a RAM (Random Access Memory), etc. as a work area. It is to be noted that the control unit 24 may be implemented by an integrated circuit such as an ASIC (Application Specific Integrated Circuit) or a FPGA (Field Programmable Gate Array). The CPU, the MPU, the ASIC, and the FPGA may all be regarded as controllers.

The control unit 54 includes an acquiring section 541, a first transmitter 542, and a second transmitter 543, as illustrated in FIG. 10. The blocks (the acquiring section 541 to the second transmitter 543) constituting the control unit 54 are functional blocks that indicate the functions of the control unit 54. These functional blocks may be software blocks or hardware blocks. For example, the functional blocks described above may each be one software module implemented by software (including a microprogram) or may be one circuit block on a semiconductor chip (die). Needless to say, the functional blocks may each be one processor or one integrated circuit. The functional block may be configured by any method. It is to be noted that the control unit 24 may be configured in functional units different from the functional blocks described above.

The blocks (the acquiring section 541 to the second transmitter 543) constituting the control unit 44 may operate as follows, for example.

For example, the first transmitter 542 acting on behalf of a subordinate communication apparatus (e.g., the base station apparatus 20) makes a request for a grant and transmits information related to usage of the grant to the communication control apparatus 40 including an acquiring section and a processing section. The grant is for a communication apparatus, which uses radio waves of a frequency band used by the first wireless system, to use the radio waves. The acquiring section acquires information related to usage of the grant, and the processing section performs a grant-related process on the basis of the information related to the usage of the grant. Then, the first transmitter 542 notifies a subordinate communication apparatus (e.g., the base station apparatus 20) of information related to a grant given by the communication control apparatus 40 on the basis of the request for the grant.

It is to be noted that the operations of the blocks (the acquiring section 541 to the second transmitter 543) constituting the control unit 54 may be the same as the operations of the blocks (the acquiring section 241 to the transmitter 243) constituting the control unit 24 of the base station apparatus 20. For example, the acquiring section 541 may be the same as the acquiring section 241, and the first transmitter 542 and the second transmitter 543 may be the same as the transmitter 243. The description of the acquiring section 241 and the transmitter 243 appearing in the following description may be replaced with the acquiring section 541 to the second transmitter 543.

3. INTERFERENCE MODEL

Next, an interference model that is assumed in the present embodiment will be described. FIG. 11 is an explanatory diagram illustrating an example of the interference model assumed in the present embodiment. It is to be noted that the description of the base station apparatus 20 appearing in the following description may be replaced with a word indicating another communication apparatus having a wireless communication function.

The interference model illustrated in FIG. 11 is applied, for example, in a case where the primary system has a service area. In the example of FIG. 11, the communication system 1 (primary system) is a wireless communication system having a service area. This service area serves as, for example, a protection area of the communication system 1. In the protection area, a plurality of interference calculation reference points (hereinafter referred to as protection points) are set. The protection point is set by, for example, the operator of the communication system 1 or a public organization, etc. that manages radio waves (hereinafter referred to as an administrator). For example, the administrator may divide the protection area into grids, and set the center of a predetermined grid as the protection point. The protection point may be determined by any method. The interference margin of each protection point is set by the administrator, etc. FIG. 11 illustrates the interference caused to the protection point by the plurality of base station apparatuses 20 constituting the communication system 2 (secondary system). The communication control apparatus 40 of the communication system 2 controls the transmission power of the plurality of base station apparatuses 20 so that the aggregated interference at each protection point does not exceed the set interference margin.

FIG. 12 is an explanatory diagram illustrating another example of the interference model assumed in the present embodiment. The interference model illustrated in FIG. 12 is applied, for example, in a case where the primary system performs only reception. In the example of FIG. 12, the communication system 1 (primary system) includes a receiving antenna as a wireless communication apparatus 10₂. The wireless communication apparatus 10₂ is, for example, a receiving antenna of a satellite ground station. The communication control apparatus 40 of the communication system 2 regards the position of the receiving antenna as the protection point, and controls the transmission power of the plurality of base station apparatuses 20 so that the aggregated interference at that point does not exceed the interference margin.

4. PRIMARY SYSTEM PROTECTION METHOD

Next, a primary system protection method will be described. As described above, primary system protection methods are classifiable into the following two types, for example.

(1) Interference Margin Simultaneous Distribution Type
(2) Interference Margin Sequential Distribution Type It is to be noted that examples of the primary system protection method of the interference margin simultaneous distribution type include, for example, a technique disclosed in NPTL 3 (e.g., a technique of calculating the maximum allowable EIRP). Further, examples of the primary system protection method of the interference margin sequential distribution type include, for example, a sequential distribution process (IAP: Iterative Allocation Process) disclosed in NPTL 6.

The primary system protection method of the "interference margin simultaneous distribution type" and the primary system protection method of the "interference margin sequential distribution type" are described below. It is to be noted that the description of the base station apparatus 20 appearing in the following description may be replaced with a word indicating another communication apparatus having a wireless communication function.

4-1. Interference Margin Simultaneous Distribution Type

The primary system protection method of the interference margin simultaneous distribution type is described first. FIG. 13 is an explanatory diagram for explaining the primary system protection method of the interference margin simultaneous distribution type. As described above, in the interference margin simultaneous distribution type, the communication control apparatus 40 calculates the maximum allowable transmission power of the secondary system by using a "value uniquely determined by the positional relationship between the protection reference point of the primary system and the secondary system" as a reference value. In the example of FIG. 13, the allowable interference threshold of the primary system is $I_{accept}$. This threshold may be an actual threshold, or a value set by factoring in a certain margin (e.g., protection ratio (Protection Ratio)) from the actual threshold, in consideration of a calculation error and interference fluctuation.

In the primary system protection method of the interference margin simultaneous distribution type, interference control means determining transmission power (EIRP, Conducted Power+Antenna gain, etc.) of the wireless apparatus so as not to exceed the allowable interference threshold. In this case, if a large number of base station apparatuses 20 are present and each of them is made not to exceed the allowable interference threshold, interference power received by the communication system 1 (primary system) can exceed the allowable interference threshold. Hence, the interference margin (allowable amount of interference) is "distributed", on the basis of the number of the base station apparatuses 20 registered in the communication control apparatus 40.

For example, in the example of FIG. 13, the total number of the base station apparatuses 20 is five. Therefore, the allowable amount of interference of $I_{accept}/5$ is distributed individually. The base station apparatus 20 is unable to recognize this amount of distribution by itself. It therefore recognizes the amount of distribution through the communication control apparatus, or acquires transmission power determined on the basis of this amount of distribution. The communication control apparatus is unable to recognize the number of wireless apparatuses managed by another communication control apparatus. Therefore, information is exchanged with each other, which makes it possible to recognize the total number and distribute the allowable amount of interference. For example, the allowable amount of interference of $3I_{accept}/5$ is allocated within the communication control apparatus $40_1$.

It is to be noted that, in this technique, the interference margin not used by the base station apparatus 20 may serve as a leftover interference margin. FIG. 14 is a diagram illustrating how the leftover interference margin occurs. FIG. 14 illustrates the total amount of interference set for each of the two communication control apparatuses 40 (the communication control apparatuses $40_1$ and $40_2$). FIG. 14 also illustrates the amount of interference (amount of caused interference) that the plurality of base station apparatuses 20 (the base station apparatuses $20_1$ to $20_5$) managed by the two communication control apparatuses 40 cause to a predetermined protection point of the communication system 1. An amount of interference that is obtained by subtracting the amounts of interference provided by the base station apparatuses 20 from the total amount of interference for each of the two communication control apparatuses 40 is the leftover interference margin. In the following description, the extra amount of interference is called a leftover interference margin. The leftover interference margin may also be referred to as a leftover amount of interference.

4-2. Interference Margin Sequential Distribution Type

Next, the primary system protection method of the interference margin sequential distribution type will be described. As described above, in the interference margin sequential distribution type, the communication control apparatus 40 calculates the maximum allowable transmission power of the secondary system by using the "desired transmission power of the secondary system" as a reference value. FIG. 15 is an explanatory diagram for explaining the primary system protection method of the interference margin sequential distribution type. In the interference margin sequential distribution type, for example, each of the plurality of base station apparatuses 20 stores the desired transmission power information in the storage unit 22. The desired transmission power information is information about transmission power that the base station apparatus 20 requests of the communication control apparatus 40 as information about transmission power necessary to transmit radio waves. In the example of FIG. 15, the base station apparatuses $20_1$ to $20_4$ hold desired transmission power information A to D, respectively. The communication control apparatus 40 allocates amounts of interference A to D to the base station apparatuses $20_1$ to $20_4$, respectively, on the basis of the desired transmission power information A to D.

5. DESCRIPTION OF PROCEDURES

Next, procedures that may occur between entities in the communication system 2 will be described. It is to be noted that the description of the base station apparatus 20 appearing in the following description may be replaced with a word indicating another communication apparatus having a wireless communication function.

5-1. Registration Procedure (Registration Procedure)

The registration procedure is a procedure of registering device parameters related to the base station apparatus 20 in the communication control apparatus 40. Typically, the registration procedure is started by the base station apparatus 20 or one or more communication systems including a plurality of base station apparatuses 20 notifying the communication control apparatus 40 of a registration request including the device parameters described above. The registration request may be transmitted by a communication system (e.g., a proxy system such as the proxy apparatus 50) acting on behalf of (as a representative for) the one or more base station apparatuses 20.

In the following description, the communication system acting on behalf of (as a representative for) the plurality of base station apparatuses 20 is assumed to be the proxy apparatus 50. However, the word of the proxy apparatus 50 that appears in the following description may be replaced with a word that indicates another communication system acting on behalf of (as a representative for) a communication apparatus, such as a proxy system.
(Details of Desired Parameters)

Device parameters refer to the following information, for example.
  Communication-apparatus-unique information
  Position information
  Antenna information
  Wireless interface information
  Legal information
  Installer information
In implementation, information other than these may be treated as device parameters.

The communication-apparatus-unique information is information allowing identification of the base station apparatus 20, information related to hardware of the base station apparatus 20, etc. For example, a serial number, a product model number, and the like may be included.

The information allowing identification of the base station apparatus 20 refers to communication apparatus user information, a communication apparatus serial number, etc. For example, a user ID, a call sign, and the like may be assumed as the communication apparatus user information. The user ID may be originally generated by a communication apparatus user or may be pre-issued by the communication control apparatus 40.

The information related to the hardware of the base station apparatus 20 may include, for example, transmission power class information, manufacturer information, and the like. As the transmission power class information, for example, FCC C.F.R Part 96 specifies two classes of Category A and Category B, and either information may be included. Further, 3GPP TS 36.104 and TS 38.104 specify some classes of eNodeBs and gNodeBs, and these may also be used.

Information related to software of the base station apparatus 20 may include, for example, version information, a build number, etc. related to an executable program that describes processing necessary for interaction with the communication control apparatus 40. It may also include version information, a build number, etc. of software for operation as the base station apparatus 20.

The position-related information is typically information that allows identification of a geolocation of the base station apparatus 20. For example, it is coordinate information acquired by a positioning function typified by a GPS (Global Positioning System), Beidou, a QZSS (Quasi-Zenith Satellite System), Galileo, or an A-GPS (Assisted Global Positioning System). Typically, information related to a latitude, a longitude, an altitude, and a positioning error may be included. Alternatively, it may be, for example, position information registered in an information management apparatus managed by the NRA (National Regulatory Authority) or its consignment organization. Alternatively, it may be, for example, X-axis, Y-axis, and Z-axis coordinates with a specific geolocation as the origin. Further, an identifier indicating outdoor/indoor may be assigned together with such coordinate information.

Further, the position-related information may be information indicating a region where the base station apparatus 20 is located. For example, information defined by the administration, such as a postcode or an address, may be used. Further, for example, the region may be indicated by a set of three or more geographic coordinates. These pieces of information indicating the region may be provided together with the above coordinate information.

Further, the position-related information may be assigned information indicating the floor of a building in a case where the base station apparatus 20 is located indoors. For example, an identifier, etc. indicating the number of stories or ground/underground may be assigned. Further, for example, information indicating a further closed space located indoors, such as a room number or a room name in the building, may be assigned.

The above positioning function is typically desired to be provided for the base station apparatus 20. However, depending on performance of the positioning function or an installation position, it is not necessarily possible to acquire position information that satisfies demanded accuracy. Therefore, the positioning function may be used by an installer. In such a case, it is desirable that position information measured by the installer be written to the base station apparatus 20.

The antenna information is typically information that indicates performance, a configuration, etc. of an antenna provided in the base station apparatus 20. Typically, it may include, for example, information such as an antenna installation height, a tilt angle (Downtilt), a horizontal orientation (Azimuth), aiming (Boresight), antenna peak gain, or an antenna model.

The antenna information may also include information related to formable beams. For example, information such as a beam width, a beam pattern, or analog/digital beamforming capability may be included.

The antenna information may also include information related to performance and a configuration of MIMO (Multiple Input Multiple Output) communication. For example, it may include information such as the number of antenna elements or the maximum number of spatial streams. It may also include codebook (Codebook) information, weighting matrix information (a unitary matrix, a ZF (Zero-Forcing) matrix, or a MMSE (Minimum Mean Square Error) matrix obtained by SVD (Singular Value Decomposition), EVD (Eigen Value Decomposition), BD (Block Diagonalization), etc.), or the like to be used. In addition, in a case where MLD (Maximum Likelihood Detection) or the like involving nonlinear operation is provided, information indicating it may be included.

The antenna information described above may include a ZoD (Zenith of Direction, Departure). The ZoD is a type of radio wave arrival angle. The ZoD described above may be estimated by another base station apparatus 20 from radio waves emitted from the antenna of the base station apparatus 20. In this case, the base station apparatus 20 may be a terminal apparatus that operates as a base station or an access point, an apparatus that performs D2D communication, a moving relay base station, or the like. The ZoD may be estimated by a radio wave arrival direction estimation technology such as MUSIC (Multiple Signal Classification) or ESPRIT (Estimation of Signal Propagation via Rotation Invariance Techniques). It may be used by the communication control apparatus 40 as measurement information.

The wireless interface information typically refers to information that indicates a wireless interface technology provided for the base station apparatus 20. For example, it includes identifier information indicating a technology used in GSM (registered trademark), CDMA2000, UMTS, E-UTRA, 5G NR (5G New Radio), or further next-generation cellular systems, an LTE-compliant derivation technology such as MulteFire or LTE-U (LTE-Unlicensed), a MAN (Metropolitan Area Network) such as WiMAX or WiMAX2+, or a standard technology such as an IEEE 802.11 wireless LAN. A version number or release number of a technical specification that defines these may also be assigned. It may not necessarily be a standard technology, and information indicating a proprietary wireless technology may be included.

The wireless interface information may also include frequency band information supported by the base station apparatus 20. For example, it may be expressed by one or more of combinations of an upper limit frequency and a lower limit frequency, one or more of combinations of a center frequency and a bandwidth, one or more 3GPP Operating Band numbers, or the like.

As the frequency band information supported by the base station apparatus 20, capability information of carrier aggregation (CA: Carrier Aggregation) or channel bonding (Channel Bonding) may also be included. For example, combinable band information or the like may be included. Further, for carrier aggregation, information related to bands to be used as a primary component carrier (PCC: Primary Component Carrier) and secondary component carriers (SCC: Secondary Component Carrier) may also be included. The number of CCs aggregable at the same time may also be included.

As the frequency band information supported by the base station apparatus 20, information indicating radio wave utilization priority, such as PAL or GAA, may also be included.

The wireless interface information may also include modulating scheme information supported by the base station apparatus 20. For example, typical examples may include information indicating a primary modulation scheme, such as FSK (Frequency Shift Keying), n-value PSK (Phase Shift Keying) (where n is 2, 4, 8, etc.), or n-value QAM (Quadrature Amplitude Modulation) (where n is 4, 16, 64, 256, etc.), and information indicating a secondary modulation scheme, such as OFDM (Orthogonal Frequency Division Multiplexing), DFT-s-OFDM (DFT spread OFDM), or FBMC (Filter Bank Multi Carrier).

The wireless interface information may also include information related to error-correcting codes. For example, capability of Turbo codes, LDPC (Low Density Parity Check) codes, Polar codes, etc. and coding rate information to be applied may be included.

The modulating scheme information and the information related to the error correcting codes may also be expressed, as another form, by MCS (Modulation and Coding Scheme) indexes.

The wireless interface information may also include information that indicates a function unique to each wireless technology supported by the base station apparatus 20. For example, typical examples include TM (Transmission Mode) information specified in LTE. In addition, for a specific function having two or more modes, the mode may be included in the wireless interface information, like the TM described above. Further, in a case where the base station apparatus 20 supports a function that does not have two or more modes but is not necessary in terms of specifications in the technical specifications, information indicating this may also be included.

The wireless interface information may also include wireless access scheme (RAT: Radio Access Technology) information supported by the base station apparatus 20. For example, it may include orthogonal multiple access schemes (OMA: Orthogonal Multiple Access) such as TDMA (Time Division Multiple Access), FDMA (Frequency Division Multiple Access), or OFDMA (Orthogonal Frequency Division Multiple Access), non-orthogonal multiple access schemes (NOMA: Non Orthogonal Multiple Access) such as PDMA (Power Division Multiple Access, typically implemented by combining Superposition Coding (SPC) and Successive Interference Canceller (SIC)), CDMA (Code Division Multiple Access), SCMA (Sparse Code Multiple Access), IDMA (Interleaver Division Multiple Access), or SDMA (Spatial Division Multiple Access), and opportunistic access schemes (Opportunistic Access) such as CSMA/CA (Carrier Sense Multiple Access/Collision Avoidance) or CSMA/CD (Carrier Sense Multiple Access/Collision Detection).

The wireless interface information may also include information related to a duplex-mode supported by the base station apparatus 20. Typical examples may include, for example, FDD (Frequency Division Duplex), TDD (Time Division Duplex), and FD (Full Duplex). In a case where TDD is included as the wireless interface information, TDD Frame Configuration information used/supported by the base station apparatus 20 may be assigned. Further, the information related to the duplex mode may be included for each frequency band indicated by the above frequency band information.

The wireless interface information may also include information related to a transmit diversity technique supported by the base station apparatus 20. For example, space-time coding (STC: Space Time Coding) or the like may be included.

The wireless interface information may also include guard band information. For example, information related to a standardized guard band size may be included. Alternatively, for example, information related to the guard band size desired by the base station apparatus 20 may be included.

The legal information typically refers to regulatory information that the base station apparatus 20 has to comply with and is defined by a national or local radio wave administrative agency or a similar organization, approval information that the base station apparatus 20 has acquired, etc. As the regulatory information described above, typically, for example, upper limit information of out-of-band emission, information related to blocking characteristics of a receiver, and the like may be included. As the approval information described above, typically, for example, type approval (Type Approval) information (FCC ID, technical standards conformity certification, etc.), legal regulation information to be used as a criterion for approval acquisition (e.g., FCC rule number, ETSI Harmonized Standard number, etc.), and the like may be included.

Of the legal information, information related to numerical values may be substituted by information defined in a specification of a wireless interface technology. For example, in place of the upper limit information of out-of-band emission, an adjacent channel leakage ratio (ACLR: Adjacent Channel Leakage Ratio) may be used to derive and use the upper limit of out-of-band emission. Further, the ACLR itself may be used as necessary. Further, adjacent-channel selectivity (ACS: Adjacent Channel Selectivity) may be used in place of the blocking characteristics. They may also be used in conjunction, or an adjacent-channel interference ratio (ACIR: Adjacent Channel Interference Ratio) may be used.

The installer information may include information allowing identification of a person (installer) who has installed the base station apparatus 20, unique information associated with the installer, etc. For example, NPTL 2 discloses, as the information allowing identification of the installer, a CPIR-ID (Certified Professional Installer Registration ID) and a CPI-name. Also disclosed as the unique information associated with the installer are, for example, a contact address (Mailing/Contact address), an e-mail address, a telephone number, a PKI (Public Key Identifier), etc. Without being limited thereto, other information related to the installer may be included, as necessary.

[Supplement to Desired Parameters]

In the registration procedure, in some embodiments, it is assumed to be requested that the device parameters related to not only the base station apparatus 20 but also the terminal apparatus 30 be registered in the communication control apparatus 40. In a such case, the embodiment may be applied by replacing the term "communication apparatus" in the description given above in (Details of Desired Parameters) with the term "terminal apparatus" or a similar term. In addition, "terminal-apparatus"-unique parameters that are not described above in (Details of Desired Parameters) may also be treated as the desired parameters in the registration procedure. Examples include a UE (User Equipment) Category, etc. specified in the 3GPP.

[Details of Registration Process]

FIG. 16 is a sequence diagram for explaining the registration procedure. The base station apparatus 20 or one or more communication systems including a plurality of base station apparatuses 20 generates a registration request message by using the device parameters described above (step S11), and notifies the communication control apparatus 40 (step S12). The message generation and/or notification may be performed by the proxy apparatus 50.

Here, in a case where the installer information is included in the device parameters, this information may be used to process the registration request to prevent tampering, etc. In addition, some or all of information included in the registration request may be encrypted. Specifically, for example, the following processing may be performed: an installer-unique public key is shared in advance between the installer and the communication control apparatus 40, and information is encrypted by the installer using a private key. Targets of the encryption include, for example, security-sensitive information such as position information.

In addition, the position information may be, for example, directly written by the installer into the communication control apparatus 40, as disclosed in NPTL 2.

After receiving the registration request, the communication control apparatus 40 performs the registration process of the base station apparatus 20 (Step S13), and returns a registration response in accordance with the process result (Step S14). If there is no lack of information necessary for registration or abnormality, the communication control apparatus 40 records information in the storage unit 42 and reports normal completion. Otherwise, the communication control apparatus 40 reports a registration failure. In a case where the registration is normally completed, the communication control apparatus 40 may allocate IDs individually to the communication apparatuses, and report the ID information by enclosing it when responding. In a case where a registration failure occurs, typically, the base station apparatus 20 or one or more communication systems including a plurality of base station apparatuses 20, or an operator (e.g., a mobile network operator or an individual) or installer thereof corrects the registration request, for example, and attempts the registration procedure until the registration is normally completed.

It is to be noted that the registration procedure may be executed a plurality of times. Specifically, for example, the registration procedure may be re-executed in a case where the position information is changed beyond a predetermined criterion, due to movement or an improvement in accuracy. The predetermined criterion is typically defined by a legal system. For example, 47 C.F.R Part 15 makes it compulsory for a Mode II personal/portable white space device to re-access a database in a case where the position information changes by 100 meters or more.

5-2. Available-Frequency Information Query Procedure (Available Spectrum Query Procedure)

The available-frequency information query procedure refers to a procedure in which the base station apparatus 20 or the proxy apparatus 50 queries the communication control apparatus 40 about information related to an available frequency. Typically, the procedure is started by the base station apparatus 20 or the proxy apparatus 50 notifying the communication control apparatus 40 of a query request including information that allows identification of the base station apparatus 20 (or the base station apparatus 20 subordinate to the proxy apparatus 50).

(1) Example 1

Here, the available-frequency information typically refers to information indicating a frequency of which secondary use is safely possible without causing fatal interference to the primary system at the position of the base station apparatus 20 (or the base station apparatus 20 subordinate to the proxy apparatus 50). For example, in order to protect the primary system using a frequency channel F1, in a case where the base station apparatus 20 is installed in a secondary use prohibition area such as an Exclusion Zone, the base station apparatus 20 is not notified of the frequency channel F1 as an available channel.

(2) Example 2

Further, for example, in a case where it is determined that fatal interference will be caused to the primary system, even outside the secondary use prohibited area, the frequency channel may not be reported as an available channel.

(3) Example 3

There may also be a frequency channel that is not reported as available as the available-frequency information on the basis of a condition other than primary system protection requirements of Example 2. Specifically, for example, in order to avoid interference that can occur between the base station apparatuses 20 in advance, a frequency channel being used by another base station apparatus 20 present in the neighborhood of the base station apparatus 20 (or the base station apparatus 20 subordinate to the proxy apparatus 50) may not be reported as an available channel.

(4) Example 4

Even in cases corresponding to these cases (Example 2 and Example 3), it is possible to report, as an available channel, the same frequency as the primary system or the neighboring base station apparatus 20. In such a case, maximum allowable transmission power information is typically included in the available-frequency information. The maximum allowable transmission power is typically expressed by equivalent isotropic radiated power (EIRP: Equivalent Isotropic Radiated Power). It is not necessarily limited thereto and may be, for example, provided by combining the antenna gain with the antenna power (Conducted Power). Feeder loss (Feeder Loss) may also be included. In addition, as the antenna gain, allowable peak gain may be set for each spatial direction.

[Details of Desired Parameters]

Assumed as the information allowing identification of the base station apparatus 20 may be, for example, the communication-apparatus-unique information registered at the time of the above registration procedure or the ID information described above in (Details of Registration Process).

The query request may also include query requirement information. The query requirement information may include, for example, information indicating a frequency band of which availability is to be known. Further, for example, transmission power information may be included. The base station apparatus 20 or the proxy apparatus 50 may include the transmission power information in a case where, for example, only frequency information assumed to allow use of the desired transmission power is to be known. The query requirement information may not necessarily be included.

The query request may also include a measurement report. The measurement report contains a result of measurement performed by the base station apparatus 20 and/or the terminal apparatus 30. For example, raw data as well as processed information may be included. For example, standard metrics typified by RSRP (Reference Signal Received Power), a RSSI (Reference Signal Strength Indicator), and RSRQ (Reference Signal Received Quality) may be used.

[Details of Available Frequency Evaluation Process]

FIG. 17 is a sequence diagram for explaining the available-frequency information query procedure. The base station apparatus 20 or the proxy apparatus 50 generates a query request including information allowing identification of the base station apparatus 20 (or the base station apparatus 20 subordinate to the proxy apparatus 50) (step S21), and notifies the communication control apparatus 40 (step S22).

After receiving the query request, the communication control apparatus 40 evaluates the available frequency on the basis of the query requirement information (step S23). For example, as described in Examples 1 to 3 above, it is possible to evaluate the available frequency by considering the presence of the primary system, its secondary use prohibition area, and the neighboring base station apparatus 20.

As described in Example 4 above, the communication control apparatus 40 may derive the maximum allowable transmission power information. Typically, it is calculated by using allowable interference power information in the primary system or its protection region (Protection Zone), the reference position (Reference Point) information for calculation of the interference power level received by the primary system, the registered information of the base station apparatus 20, and a propagation-loss estimation model. Specifically, it is calculated by the following expression, as an example.

$$P_{MaxTx(dBm)} = I_{Th(dBm)} + PL(d)_{(dB)} \quad (1)$$

Here, $P_{MaxTx(dBm)}$ is the maximum allowable transmission power, $I_{Th(dBm)}$ is the allowable interference power, d is a distance between the reference position (Reference Point) and the base station apparatus 20, and $PL(d)_{(dB)}$ is the propagation loss at the distance d. Although this expression does not explicitly indicate the antenna gain in a transmitter/receiver, it may be included depending on how the maximum allowable transmission power is expressed (EIRP, Conducted power, etc.) or a reference point of received power (antenna input point, antenna output point, etc.). A safety margin or the like may also be included to compensate for fluctuations due to fading. Further, feeder loss or the like may be considered as necessary.

Further, the above expression is described on the basis of the assumption that a single base station apparatus 20 is an interference source. For example, in a case where aggregated interference (Aggregated Interference) from a plurality of base station apparatuses 20 are to be considered at the same time, correction values may be factored in. Specifically, for example, the correction value may be determined on the basis of three types of interference margin schemes (Fixed/Predetermined, Flexible, Flexible Minimized) disclosed in NPTL 3.

It is to be noted that, although the above expression is expressed by using logarithms, in implementation, they may be converted to antilogarithms to be used, as a matter of course. Further, all logarithmic parameters described in this specification may be converted to antilogarithms to be used as appropriate.

(1) Technique 1

In addition, as described above in the section of (Details of Desired Parameters), in a case where the transmission power information is included in the query requirement information, it is possible to evaluate the available frequency by a method different from the method described above. Specifically, for example, assuming that the desired transmission power indicated by the transmission power information is used, in a case where the estimated amount of caused interference falls below the allowable interference power in the primary system or its protection region (Protection Zone), the frequency channel is determined as available and reported to the base station apparatus 20 (or the proxy apparatus 50).

(2) Technique 2

Although an example in which a band utilization condition described above is calculated on the basis of the other-system-related information described above has been described, the present disclosure is not limited to such an example. For example, in a case where an area/space in which the base station apparatus 20 is able to use the shared band is predetermined, as with the area of a REM (Radio Environment Map), the available-frequency information may be derived on the basis of only the position-related information and the height-related information described above. Further, for example, also in a case where a look-up table is prepared that associates the position and height with the available-frequency information, the available-frequency information described above may be derived on the basis of only the position-related information and the height-related information described above.

Evaluation of the available frequency may not necessarily be performed after receiving a query request. For example, it may be voluntarily performed by the communication control apparatus 40 after normal completion of the aforementioned registration procedure, without a query request. In such a case, the communication control apparatus 40 may create the REM or look-up table exemplified in Technique 2 or a similar information table.

Either technique may also evaluate radio wave utilization priority such as PAL or GAA. For example, in a case where registered device parameters or query requirements include information related to the radio wave utilization priority, it may be determined and reported whether the frequency is available on the basis of the priority. Further, for example, in a case where information related to the base station apparatus 20 that performs high priority utilization (e.g., PAL) (in NPTL 2, referred to as Cluser List) is registered in advance in the communication control apparatus 40 by the user, as disclosed in NPTL 2, the evaluation may be performed on the basis of the information.

After completion of the evaluation of the available frequency, the communication control apparatus 40 notifies the base station apparatus 20 (or the proxy apparatus 50) of the evaluation result (step S24). The base station apparatus 20 may select desired communication parameters by using the evaluation result received from the communication control apparatus 40.

5-3. Frequency Utilization Permission Procedure (Spectrum Grant Procedure)

The frequency utilization permission procedure is a procedure for the base station apparatus 20 to receive permission for secondary use of a frequency from the communication control apparatus 40. Typically, after the normal completion of the registration procedure, the procedure is started by the base station apparatus 20 or one or more communication systems including a plurality of base station apparatuses 20 notifying the communication control apparatus 40 of a frequency utilization permission request including information that allows identification of the base station apparatus 20. This notification may be provided by the proxy apparatus 50. It is to be noted that "after the normal completion of the registration procedure" also means that the available-frequency information query procedure may not necessarily be performed.

The present invention assumes that at least the following two types of frequency utilization permission request schemes may be used.

Designation scheme

Flexible scheme

The designation scheme is a request scheme in which the base station apparatus 20 designates, as the desired communication parameters, at least the frequency band to be used and the maximum transmission power, and requests the communication control apparatus 40 to permit operation based on the desired communication parameters. Parameters are not necessarily limited to these parameters, and parameters unique to a wireless interface technology (such as a modulation scheme and a duplex mode) may be designated.

Information indicating the radio wave utilization priority, such as PAL or GAA may also be included.

The flexible scheme is a request scheme in which the base station apparatus 20 designates only requirements related to communication parameters, and requests the communication control apparatus 40 to designate the communication parameters that allow secondary use permission while satisfying the requirements. The requirements related to the communication parameters may include the bandwidth or the desired maximum transmission power or desired minimum transmission power. Parameters are not necessarily limited to these parameters, and parameters unique to a wireless interface technology (such as a modulation scheme and a duplex mode) may be designated. Specifically, for example, one or more of the TDD Frame Configuration may be selected and reported in advance.

In either scheme, a measurement report may be included. The measurement report contains a result of measurement performed by the base station apparatus 20 and/or the terminal apparatus 30. For example, raw data as well as processed information may be included. For example, standard metrics typified by RSRP (Reference Signal Received Power), a RSSI (Reference Signal Strength Indicator), and RSRQ (Reference Signal Received Quality) may be used.

[Details of Frequency Utilization Permission Process]

FIG. 18 is a sequence diagram for explaining the frequency utilization permission procedure. The base station apparatus 20 or one or more communication systems including a plurality of base station apparatuses 20 generates a frequency utilization permission request including information that allows identification of the base station apparatus 20 (step S31) and notifies the communication control apparatus 40 (step S32). The request generation and/or notification may be performed by the proxy apparatus 50. The frequency utilization permission request is acquired, for example, by the acquiring section 441 of the communication control apparatus 40.

After acquiring the frequency utilization permission request, the communication control apparatus 40 performs the frequency utilization permission process on the basis of the frequency utilization permission request scheme (step S33). For example, it is possible for the communication control apparatus 40 to perform the frequency utilization permission process by considering the presence of the primary system, its secondary use prohibited area, and the neighboring base station apparatus 20, by using the techniques described in Examples 1 to 3 in <5-2. Available-Frequency Information Query Procedure>.

In a case where the flexible scheme is used, the communication control apparatus 40 may derive the maximum allowable transmission power information by using the technique described in Example 4 of <5-2. Available-Frequency Information Query Procedure>. Typically, the communication control apparatus 40 calculates the maximum allowable transmission power by using the allowable interference power information in the primary system or its protection region (Protection Zone), the reference position (Reference Point) information for calculation of the interference power level received by the primary system, the registered information of the base station apparatus 20, and the propagation-loss estimation model. For example, the communication control apparatus 40 calculates the maximum allowable transmission power by the following expression (2).

$$P_{MaxTx(dBm)} = I_{Th(dBm)} + PL(d)_{(dBm)} \quad (2)$$

Here, $P_{MaxTx(dBm)}$ is the maximum allowable transmission power, $I_{Th(dBm)}$ is the allowable interference power, d is a distance between the reference position (Reference Point) and the base station apparatus 20, and $PL(d)_{(dB)}$ is the propagation loss at the distance d. Although this expression does not explicitly indicate the antenna gain in a transmitter/receiver, the expression may be deformed to be used depending on how the maximum allowable transmission power is expressed (EIRP, Conducted power, etc.) or a reference point of received power (antenna input point, antenna output point, etc.). A safety margin or the like may also be included to compensate for fluctuations due to fading. Further, feeder loss or the like may be considered as necessary.

Further, the above expression is described on the basis of the assumption that a single base station apparatus 20 is an interference source. For example, in a case where aggregated interference (Aggregated Interference) from a plurality of base station apparatuses 20 are to be considered at the same time, correction values may be factored in. Specifically, for example, the correction value may be determined on the basis of three types of schemes (Fixed/Predetermined, Flexible, Flexible Minimized) disclosed in NPTL 3.

Various models may be used as the propagation-loss estimation model. In a case where a model is designated for each application, it is desirable to use the designated model. For example, in NPTL 6, the propagation-loss model such as eHATA (Extended Hata) or an ITM (Irregular Terrain Model) is adopted for each application. As a matter of course, the propagation-loss model may not be limited thereto in implementation of the present invention.

In a case where the model is not designated in a predetermined application, different models may be used as necessary. As a specific example, it is possible to use different models as follows, for example: using an aggressive model, such as the free space loss model, in estimating interference power caused to another base station apparatus 20, and using a conservative model in estimating the coverage of the base station apparatus 20.

In addition, in a case where the designation scheme is used, it is possible to perform the frequency utilization permission process by using the technique described in Technique 1 of <5-2. Available-Frequency Information Query Procedure>. Specifically, for example, assuming that the desired transmission power indicated by the transmission power information is used, in a case where the estimated amount of caused interference falls below the allowable interference power in the primary system or its protection region (Protection Zone), the utilization of the frequency channel is determined as permittable and reported to the base station apparatus 20 (or the proxy apparatus 50).

Either technique may also evaluate radio wave utilization priority such as PAL or GAA. For example, in a case where registered device parameters or query requirements include information related to the radio wave utilization priority, it may be determined and reported whether the frequency is available on the basis of the priority. Further, for example, in a case where information related to the base station apparatus 20 that performs high priority utilization (e.g., PAL) (in NPTL 2, referred to as Cluser List) is registered in advance in the communication control apparatus 40 by the user, as disclosed in NPTL 2, the availability may be evaluated on the basis of the information.

The frequency utilization permission process may not necessarily be performed when a request is received. For example, it may be voluntarily performed by the communication control apparatus 40 after the aforementioned registration procedure is normally completed, without a frequency utilization permission request. Further, for example, the frequency utilization permission determination process may be performed at regular intervals. In such a case, the REM or look-up table exemplified in Technique 2 of <5-2. Available-Frequency Information Query Procedure> or a similar information table may be created.

After completion of the frequency utilization permission process, the communication control apparatus 40 notifies the base station apparatus 20 of the determination result (step S34).

5-4. Frequency Utilization Notification (Spectrum Use Notification/Heartbeat)

The frequency utilization notification is a procedure in which the base station apparatus 20 or the proxy apparatus 50 notifies the communication control apparatus 40 of the frequency utilization based on the communication parameters allowed for use in the above frequency utilization permission procedure. Typically, the procedure is started by the base station apparatus 20 or the proxy apparatus 50 notifying the communication control apparatus 40 of a notification message including information allowing identification of the base station apparatus 20.

It is desirable that this procedure be performed periodically until the frequency utilization is rejected from the communication control apparatus 40. If this procedure is normally completed, the base station apparatus 20 may start or continue radio wave transmission. For example, if the state of a grant (Grant) is Granted, the state of the grant shifts to Authorized due to success of this procedure. Further, if the state of the grant is Authorized, the state of the grant shifts to Granted or Idole due to failure of this procedure.

Here, the grant indicates radio wave transmission authorization that the communication control apparatus 40 (e.g., the SAS) gives to the base station apparatus 20 (e.g., the CBSD). The grant may be replaced with radio wave resource (frequency resource) utilization permission. The grant is described in NPTL 2, for example. In NPTL 2, a signaling protocol between a database (SAS) and a base station (CBSD) is standardized for 3550-3700 MHz frequency sharing in the United States. In this standard, radio wave transmission authorization that the SAS gives to the CBSD is referred to as a "grant (Grant)". Operation parameters authorized by the grant are defined by two factors: maximum allowable EIRP (Equivalent Isotropic Radiated Power) and a frequency channel. That is, in order to perform radio wave transmission using a plurality of frequency channels, it is necessary for the CBSD to acquire a plurality of grants from the SAS.

A state (State) indicating a permission state of radio wave transmission is defined by the grant. FIG. 19 is a state transition diagram illustrating the permission state of radio wave transmission. In FIG. 19, a Granted state indicates a state in which the grant is possessed but radio wave transmission is not permitted, and an Authorized state indicates a state in which radio wave transmission is permitted on the basis of operation parameter values defined by the grant. Transition occurs between these two states depending on a result of a heartbeat procedure (Heartbeat Procedure) specified in the same standard.

In the following description, the frequency utilization notification may be referred to as heartbeat request (Heartbeat Request) or simply as heartbeat (Heartbeat). Further, the heartbeat request transmission interval is sometimes referred to as a heartbeat interval (Heartbeat Interval). It is to be noted that the description of the heartbeat request (Heartbeat Request) or the heartbeat (Heartbeat) appearing in the following description may be replaced as appropriate with another description indicating a "request for starting or continuing radio wave transmission". Similarly, the heartbeat interval may be replaced with another description (e.g., transmission interval) indicating the transmission interval of the frequency utilization notification.

FIG. 20 is a sequence diagram for explaining the frequency utilization notification procedure. The base station apparatus 20 or one or more communication systems including a plurality of base station apparatuses 20 generates a notification message including information that allows identification of the base station apparatus 20 (step S41), and notifies the communication control apparatus 40 (step S42). The message generation and/or notification may be performed by the proxy apparatus 50.

After receiving the frequency utilization notification, the communication control apparatus 40 may determine whether the start/continuation of radio wave transmission is allowed (step S43). Examples of a determination method include checking the frequency utilization information of the primary system. Specifically, it is possible to determine whether to permit or reject start/continuation of radio wave transmission on the basis of a change in the frequency used by the primary system, a change in the frequency utilization situation of the primary system (e.g., ship-based radar) whose radio wave utilization is not stationary, or the like.

Upon completion of the determination process, the communication control apparatus 40 notifies the base station apparatus 20 (or the proxy apparatus 50) of the determination result (step S44).

In this procedure, a command for communication parameter reconfiguration (Reconfiguration) may be issued to the base station apparatus 20 (or the proxy apparatus 50) from the communication control apparatus 40. Typically, it may be performed in a response to the frequency utilization notification. For example, recommended communication parameter information may be provided.

5-5. Supplement to Procedures

Here, the procedures may not necessarily be individually implemented, as described below. For example, two different procedures may be implemented by being substituted by a third procedure with the roles of the two different procedures. Specifically, for example, the registration request and the available-frequency information query request may be reported integrally. Further, for example, the frequency utilization permission procedure and the frequency utilization notification may be performed integrally. Needless to say, it is not limited to these combinations, and may be a combination of three or more. Further, the above procedure may be separated and performed.

Further, in a case where the present embodiment is applied for frequency sharing with an existing system, as the procedures or equivalent procedures, it is desirable to select and use appropriate procedures on the basis of the radio low related to the frequency band in a country or a region where the technology of the present embodiment is implemented. For example, in a case where registration of communication apparatuses is mandated for use of a specific frequency band in a specific country or region, it is desirable to perform the registration procedure described above.

In addition, the expression "acquire information" or a similar expression in this specification does not necessarily mean acquiring the information according to the above procedure. For example, it is described that the position information of the base station apparatus 20 is used in the available frequency evaluation process, but it means that information acquired in the registration procedure may not necessarily be used and, in a case where the available frequency query procedure request includes position information, the position information may be used. In other words, it means that the described parameters may be included in other procedures within the scope described in the present embodiment and within the scope of technical feasibility.

Further, information that may be included in the response from the communication control apparatus 40 to the base station apparatus 20 (or the proxy apparatus 50) described in the above procedure may be reported as a push notification. As a specific example, the available-frequency information, recommended communication parameter information, radio wave transmission continuation rejection notification, etc. may be reported as a push notification.

5-6. Procedures Related to Terminal Apparatus

Basically, it is possible to use the procedures described in <5-1> to <5-4> also for the terminal apparatus 30. However, the terminal apparatus 30 has mobility, unlike the base station apparatus 20. That is, the position information is dynamically updated. Some legal systems may make re-registration in the communication control apparatus 40 compulsory in a case where the position information changes more than a certain amount. Hence, in an operation form (see NPTL 4) defined by the Office of Communications (Ofcom: Office of Communication), the following two types of communication parameters are specified.

Individual parameters (Specific Operational Parameters)
General parameters (Generic Operational Parameters)

The individual parameters (Specific Operational Parameters) are defined in the NPTL as "operation parameters unique to a specific slave-WSD (White Space Device)". In other words, they refer to communication parameters calculated using the device parameters of the slave-WSD corresponding to the terminal apparatus 30. A feature is that they are calculated by a WSDB (White Space Database) by using position information of the slave-WSD.

Due to such a feature, the individual parameters are assumed to be suitable for the terminal apparatus 30 having low mobility or fixedly installed.

The general parameters (Generic Operational Parameters) are defined in the NPTL as "operation parameters available for any slave WSD located within the coverage area of a predetermined master WSD (corresponding to the base station apparatus 20)". A feature is that they are calculated by the WSDB without using position information of the slave-WSD.

Due to such a feature, the general parameters are assumed to be suitable for the terminal apparatus 30 with high mobility.

These pieces of information for the terminal apparatus 30 may be provided by unicast/broadcast from the base station apparatus 20. For example, broadcast signals typified by a CVS (Contact Verification Signal) specified by the FCC rules Part 15 Subpart H may be used. Alternatively, it may be provided by wireless-interface-unique broadcast signals. Specifically, for example, it may be provided by a PBCH (Physical Broadcast Channel), a NR-PBCH, or the like used in LTE or 5G NR.

5-7. Procedure Occurring Between Communication Control Apparatuses

[Information Exchange]

The communication control apparatus 40 is able to exchange the management information with another communication control apparatus 40. FIG. 21 is a sequence diagram for explaining the management information exchange procedure. In the example of FIG. 21, information is exchanged between the communication control apparatus 40$_1$ and the communication control apparatus 40$_2$. Needless to say, the communication control apparatuses that exchange information are not limited to the two: the communication control apparatus 40$_1$ and the communication control apparatus 40$_2$.

It is desired that at least the following information be exchanged in the management information exchange procedure.

Communication apparatus registered information
Communication apparatus communication parameter information
Area information The communication apparatus registered information typically refers to the device parameters of the base station apparatus 20 registered in the communication control apparatus 40 in the above registration procedure. Not all registered information has to be exchanged. For example, information that can fall under personal information may not be exchanged. In addition, in a case of exchanging the communication apparatus registered information, encrypted and ambiguous information may be exchanged. For example, information converted to binary values or information signed using a digital signature mechanism may be exchanged.

The communication apparatus communication parameter information typically refers to information related to communication parameters currently used by the base station apparatus 20. It is desirable to include at least information indicating the used frequency and the transmission power. Other communication parameters may be included.

The area information typically refers to information that indicates a predetermined geographic region. This information may include region information of various attributes in a variety of forms.

For example, protection region information of the base station apparatus 20 to be a high priority secondary system may be included, like a PPA (PAL Protection Area) disclosed in NPTL 5. The area information in this case may be expressed, for example, by a set of three or more geolocation coordinates. Further, for example, in a case where a plurality of communication control apparatuses 40 is able to refer to a common external database, it may be expressed by an ID indicating the information.

Further, for example, information indicating the coverage of the base station apparatus 20 may be included. The area information in this case may also be expressed, for example, by a set of three or more geolocation coordinates. In addition, for example, it may be expressed by information indicating a radial size, assuming a circle with the geographical position of the base station apparatus 20 as the origin. Further, for example, in a case where a plurality of communication control apparatuses 40 is able to refer to a common external database, it may be expressed by an ID indicating the information.

As another form, information related to area-division predefined by the administration, etc. may be included. Specifically, it is possible to indicate a certain region by, for example, indicating the address. Further, for example, a licensed area or the like may be expressed in a similar manner.

As still another form, the area information may not necessarily express a planar area, but may express a three-dimensional space. For example, it may be expressed using a spatial coordinate system. Further, for example, information indicating a predetermined closed space, such as the number of stories, the floor, or a room number of the building, may be used.

These pieces of information may be exchanged by a variety of schemes. Examples are described below.

ID designation scheme
Period designation scheme
Region designation scheme
Dump scheme The ID designation scheme is a scheme that uses an ID assigned in advance for identification of information managed by the communication control apparatus 40, to acquire the information corresponding to the above ID. For example, assume that the communication control apparatus $40_1$ manages the base station apparatus 20 with an ID: AAA. In this case, the communication control apparatus $40_2$ issues an information acquisition request designating the ID: AAA to the communication control apparatus 401. After receiving the request, the communication control apparatus $40_1$ searches for information related to the ID: AAA, and reports the registered information and the communication parameter information of the corresponding base station apparatus 20 in a response.

The period designation scheme designates a specific time period, and information that satisfies predetermined conditions in the time period may be exchanged.

The predetermined conditions include, for example, whether or not information is updated. For example, in a case where a request designates acquisition of communication apparatus information in a specific time period, the registered information of the base station apparatus 20 newly registered during the time period, or the registered information and the communication parameter information of the base station apparatus 20 whose communication parameters have been changed may be reported in a response.

The predetermined conditions include, for example, whether it is recorded in the communication control apparatus 40. For example, in a case where a request designates acquisition of communication apparatus information in a specific time period, the registered information and the communication parameter information of the base station apparatus 20 recorded by the communication control apparatus 40 during the time period may be reported in a response. In addition, latest information during the time period may be reported. Alternatively, an update history may be reported for each information.

The region designation scheme designates a specific region, and information belonging to the region is exchanged. For example, in a case where a request designates acquisition of communication apparatus information in a specific region, the registered information and the communication parameter information of the base station apparatus 20 installed in the region may be reported in a response.

The dump scheme is a scheme that provides all information recorded by the communication control apparatus 40. It is desirable that at least information related to the base station apparatus 20 and area information be provided by the dump scheme. [0254] The descriptions of the information exchange between the communication control apparatuses 40 up to this point are all based on a pull scheme. That is, it is a form in which information corresponding to parameters designated in the request is reported in a response, and may be implemented by a HTTP GET method, as an example. However, it may not be limited to the pull scheme, and information may be actively provided to another communication control apparatus 40 by a push scheme. The push scheme may be implemented, as an example, by a HTTP POST method.

[Command and Request Procedures]

The communication control apparatuses 40 may issue commands and/or requests to each other. Specifically, an example is communication parameter reconfiguration (Reconfiguration) of the base station apparatus 20. For example, the communication control apparatus $40_1$ may request the communication control apparatus $40_2$ to change the communication parameters of the base station apparatus $20_4$ in a case where it is determined that the base station apparatus $20_1$ managed by the communication control apparatus $40_1$ is heavily interfered with by the base station apparatus $20_4$ managed by the communication control apparatus $40_2$.

Another example is area information reconfiguration (Reconfiguration). For example, in a case where there is a deficiency in the calculation of the coverage information and the protection region information related to the base station apparatus $20_4$ managed by the communication control apparatus $40_2$, the communication control apparatus $40_1$ may request the communication control apparatus $40_2$ to reconfigure the area information. Other than this, requests for area information reconfiguration may be made for a variety of reasons.

6. GRANT-RELATED OPERATION

Next, grant-related operation will be described.

6-1. Typical Operation Flow

First, a typical operation flow related to a grant will be described. FIG. 22 is a sequence diagram illustrating an example of the grant-related operation. Specifically, FIG. 22 is a sequence diagram illustrating the operation of the communication system 2 corresponding to the procedures of <5-3. Frequency Utilization Permission Procedure> and <5-4. Frequency Utilization Notification>. It is to be noted that the operation flow illustrated in FIG. 22 is merely an example, and changes variously depending on the state, etc. in which the base station apparatus 20, the communication control apparatus 40, and the proxy apparatus 50 are placed.

First, the communication control apparatus $40_1$ executes periodic processing when periodic processing execution timing arrives (step S61). The periodic processing is processing of executing information synchronization between the communication control apparatuses 40 and calculation related to primary system protection. The periodic processing is, for example, CPAS (Coordinated Periodic Activities among SASs) described in NPTL 10 and NPTL 11. In the following description, the periodic processing is sometimes referred to as periodic protection calculation. For example, the periodic processing execution timing is 24 hours after the execution of the previous periodic processing. Needless to say, the execution interval of the periodic processing is not limited to 24 hours.

FIG. 23 is a diagram illustrating specific processing contents of the periodic processing. In the example of FIG. 23, the communication control apparatus $40_1$ and the communication control apparatus $40_2$ perform the information synchronization and the primary system protection calculation. Needless to say, the communication control apparatuses 40 that perform the periodic processing (information synchronization, etc.) may be more than two.

As illustrated in FIG. 23, each of a plurality of communication control apparatuses 40 executes the periodic processing (step S61). First, each of the plurality of communication control apparatuses 40 synchronizes information with the other communication control apparatus 40 (step S61a). Then, each of the plurality of communication control apparatuses 40 performs the primary system protection calculation (step S61b and step S61c). At this time, the communication control apparatus 40 may calculate estimated amounts of interference that individual communication nodes (e.g., the base station apparatuses 20) can individually cause to the primary system, a leftover interference margin, etc.

Returning to FIG. 22, the base station apparatus 20 or the proxy apparatus 50 transmits a grant request (Grant Request) to the communication control apparatus $40_1$ (step S62). This grant request may be transmitted by the transmitter 243 of the base station apparatus 20 or the first transmitter 542 of the proxy apparatus 50. In the present embodiment, the base station apparatus 20 or the proxy apparatus 50 adds, to the grant request, information related to usage of a frequency resource (radio wave resource) to be allocated as a result of the grant request. For example, the base station apparatus 20 or the proxy apparatus 50 adds, to the grant request, information indicating "grant application, detail". The "grant application, detail" will be described in detail in <6-2. Addition of Grant Usage Information> below. It is to be noted that in the following description, the "information related to usage of a frequency resource" is sometimes referred to as "information related to usage of a grant" or simply as "usage information".

The acquiring section 441 of the communication control apparatus $40_1$ acquires the grant request with the usage information. The processing section 442 of the communication control apparatus $40_1$ performs a frequency resource-related process (that is, a grant-related process) on the basis of the usage information (step S63). For example, the processing section 442 performs a utilization permission determination process for allocating an available frequency to the base station apparatus 20 on the basis of the usage information. This process will be described in detail in <6-3. Granting Determination Using Usage Information> below.

After allocating the frequency, the notifying section 444 of the communication control apparatus $40_1$ transmits a grant response (Grant Response) to the base station apparatus 20 or the proxy apparatus 50. In the example of FIG. 22, the notifying section 444 reports a successful grant request (Approve illustrated in FIG. 22) as the grant response (step S64). The acquiring section 241 of the base station apparatus 20 or the acquiring section 541 of the proxy apparatus 50 acquires the grant response from the communication control apparatus $40_1$. Due to the successful grant request, the state of the grant of the base station apparatus 20 shifts from Idole to Granted as illustrated in FIG. 19. The setting section 242 of the base station apparatus 20 performs setting of each part on the basis of the allocated grant.

Subsequently, the base station apparatus 20 or the proxy apparatus 50 transmits a heartbeat request (Heartbeat Request) to the communication control apparatus $40_1$ (step S65). Then, the acquiring section 441 of the communication control apparatus $40_1$ acquires the transmitted heartbeat request. Then, the communication control apparatus $40_1$ transmits a heartbeat response (Heartbeat Response).

It is to be noted that, in the example of FIG. 22, the grant allocated to the base station apparatus 20 has not yet passed through the periodic processing (e.g., CPAS). Therefore, in the example of FIG. 22, the communication control apparatus $40_1$ is unable to approve the start of radio wave transmission. Hence, the communication control apparatus $40_1$ transmits, as the heartbeat response, a radio wave transmission suspension instruction (Suspension instruction) (step S65).

Subsequently, the base station apparatus 20 or the proxy apparatus 50 continues to transmit the heartbeat request at the heartbeat interval reported by the communication control apparatus $40_1$. In response to this heartbeat request, the communication control apparatus $40_1$ continues to transmit, as the heartbeat response, the radio wave transmission suspension instruction until the next periodic processing is completed.

When the periodic processing execution timing arrives, each of the plurality of communication control apparatuses 40 including the communication control apparatus $40_1$ executes the periodic processing (Step S67). For example, as illustrated in FIG. 23, each of the plurality of communication control apparatuses 40 synchronizes information with the other communication control apparatus 40 (step S67a). Then, each of the plurality of communication control apparatuses 40 performs the primary system protection calculation (step S67b and step S67c).

Subsequently, the base station apparatus 20 or the proxy apparatus 50 transmits a heartbeat request to the communication control apparatus $40_1$ (step S68). Then, the acquiring section 441 of the communication control apparatus $40_1$ acquires the transmitted heartbeat request. Then, the notifying section 444 of the communication control apparatus $40_1$ transmits a heartbeat response. At this time, the grant allocated to the base station apparatus 20 has passed through the periodic processing, and therefore the communication control apparatus $40_1$ is able to approve the start of radio wave transmission for the base station apparatus 20 that has transmitted the heartbeat request. Hence, the communication control apparatus $40_1$ transmits a successful heartbeat response (Authorize illustrated in FIG. 22) as the heartbeat response (step S68). Due to the successful heartbeat request, the state of the grant of the base station apparatus 20 shifts from Granted to Authorized as illustrated in FIG. 19. The wireless communication control section 244 of the base station apparatus 20 performs wireless communication by controlling the wireless communication unit 21 on the basis of the allocated grant.

As described above, transition of the state of the grant (a state indicating a permission state of radio wave transmission) occurs by a result of the heartbeat procedure. Various objectives are defined for the heartbeat procedure, one of which is issuing a radio wave suspension instruction to the base station apparatus 20 when an existing system in the same band (e.g., a ship-based radar) is using radio waves. It is compulsory for the communication control apparatus 40 to suspend radio waves of all base station apparatuses 20 that can cause interference within a predetermined time (e.g., 300 seconds) in a case where it is determined that the existing system such as the communication system 1 is using radio waves. In this case, issuing a push notification of the suspension instruction is assumed to be complicated in implementation. Therefore, the communication control apparatus 40 is allowed to issue a radio wave suspension instruction by using a heartbeat response. In the following description, a process to be executed by the communication control apparatus 40 for causing the base station apparatus 20 to suspend frequency resource utilization refers to a "frequency resource utilization suspension process" or a "grant suspension process".

For example, the base station apparatus 20 or the proxy apparatus 50 transmits the heartbeat request to the communication control apparatus $40_1$ (step S70). Then, the communication control apparatus $40_1$ acquires the transmitted heartbeat request. Then, the communication control apparatus $40_1$ determines whether or not the primary system such as the communication system 1 is using radio waves. In a case where it is determined that the primary system is using radio waves related to a predetermined frequency resource, the communication control apparatus $40_1$ transmits a radio wave transmission suspension instruction (Suspension instruction) as the heartbeat response (step S71). The base station apparatus 20 suspends transmission of the radio waves related to the predetermined frequency resource. Thus, the state of the grant of the base station apparatus 20 shifts from Authorized to Idole (or Granted), as illustrated in FIG. 19. Alternatively, the state of the grant of the base station apparatus 20 shifts from Granted to Idole, as illustrated in FIG. 19.

It is to be noted that this "frequency resource utilization suspension process" may be performed by the processing section 442 of the communication control apparatus $40_1$.

6-2. Addition of Grant Usage Information

As described above, in the present embodiment, the usage information is added to the grant request for execution of the frequency utilization permission procedure. For example, the base station apparatus 20 or the proxy apparatus 50 adds the usage information to the grant request, and transmits the grant request with the usage information to the communication control apparatus 40. Then, the communication control apparatus 40 performs the grant-related process (e.g., a frequency resource utilization permission process) related to the grant request on the basis of the usage information added to the grant request.

The usage information is information indicating not a tier (Tier) such as "PAL/GAA" but "grant application, detail (Detail)" such as carrier aggregation, LAA, and channel bonding. The "grant application, detail" is, for example, "information indicating application of a grant" (hereinafter referred to as application information) and/or detailed information related to grant utilization (hereinafter referred to as detailed information).

[Application Information]

For example, the following (A) is assumed as the application information.

(A) Band extension technology identification information (Band Extension Technology Identification Information)

In the present embodiment, one or more base station apparatuses 20 are able to associate a plurality of grants (that is, a plurality of frequency resources granted by the communication control apparatus 40) with each other by a predetermined band extension technology and use the plurality of grants. Enabling to know the band extension technology for associating the grants with each other makes it possible for the communication control apparatus 40 to perform, for example, a grant process considering characteristics of the band extension technology such as allocating a plurality of successive grants to a band extension technology needing successive frequency regions (e.g., channel bonding).

Accordingly, the base station apparatus 20 or the proxy apparatus 50 notifies the communication control apparatus 40 of the band extension technology for associating a plurality of grants (a plurality of frequency resources) with each other by using (A) Band extension technology identification information (first identification information).

For example, the following (A1) to (A4) are assumed as the band extension technology settable to the "band extension technology identification information".

Band extension technology completed in a single second wireless system (A1) Carrier aggregation (A2) LAA (Licensed Assisted Access)

(A3) Channel bonding

Band extension technology implemented in coordination with a plurality of second wireless systems (A4) Dual connectivity (Dual Connectivity)

In a case where (A1) Carrier aggregation is set to the "band extension technology identification information", the identification information indicates that one base station apparatus 20 associates a plurality of frequency resources to be granted with each other by carrier aggregation and uses the plurality of frequency resources.

In a case where (A2) LAA is set to the "band extension technology identification information", the identification information indicates that one base station apparatus 20 associates a plurality of frequency resources to be granted with each other by LAA and uses the plurality of frequency resources.

In a case where (A3) Channel bonding is set to the "band extension technology identification information", the identification information indicates that one base station apparatus 20 associates a plurality of successive frequency resources to be granted with each other by channel bonding and uses the plurality of frequency resources (as one unit).

In a case where (A4) Dual connectivity is set to the "band extension technology identification information", the identification information indicates that one base station apparatus 20, together with one or more other base station apparatuses 20, associates a plurality of frequency resources to be granted with each other by dual connectivity and uses the plurality of frequency resources.

As a matter of course, band extension technologies identifiable by the band extension technology identification information are not limited to the above technologies. These technologies using a plurality of grants in association with each other may be collectively referred to as grant aggregation (Grant Aggregation), grant bonding (Grant Bonding), or the like.

It is to be noted that in a case where a band extension technology using a plurality of grants in association with each other is set to the "band extension technology identification information", the base station apparatus 20 or the proxy apparatus 50 may use "grouping information" to be described later to notify the communication control apparatus 40 of which other grant (frequency resource) a requested grant (frequency resource) is associated with. Further, in a case where the band extension technology using a plurality of grants in association with each other is set to the "band extension technology identification information", the base station apparatus 20 or the proxy apparatus 50 may use the "grouping information" to be described later to report what type of component carrier a requested grant (frequency resource) is to be used as.

It is to be noted that in LAA, a component carrier in a licensed band and a component carrier in an unlicensed band are associated with each other, and LAA may be regarded as carrier aggregation in a broad sense. However, in the following description, (A1) Carrier aggregation and (A2) LAA are regarded as different band extension technologies. That is, carrier aggregation to be described below is carrier aggregation (carrier aggregation in a narrow sense) in which a plurality of component carriers in a licensed band or an unlicensed band is associated with each other. As a matter of course, (A1) Carrier aggregation may be regarded as carrier aggregation in a broad sense including LAA, etc.

[Detailed Information]

For example, the following (B) to (D) are assumed as detailed information.

(B) Component carrier type information
(C) Service type information
(D) Grouping information (Component Carrier Type Information)

In some band extension technologies, a plurality of component carriers associated with each other has different roles. Enabling to know different roles of the component carriers makes it possible for the communication control apparatus 40 to perform, for example, a grant process considering different roles such as suspending grants from a component carrier with lower priority in a case where it is necessary to suspend grants.

Accordingly, the base station apparatus 20 or the proxy apparatus 50 uses (B) Component carrier type information (second identification information) to notify the communication control apparatus 40 of what type of component carrier a grant (frequency resource) is to be used as.

It is to be noted that in the present embodiment, the "component carrier" may be a component carrier in LTE in or a component carrier in NR. As a matter of course, the "component carrier" may be a component carrier in another wireless access technology such as a wireless LAN.

For example, the following (B1) to (B3) are assumed as a component carrier type settable to the "component carrier type information".

(B1) Primary component carrier
(B2) Secondary component carrier
(B3) Standalone (Standalone)

Here, (B1) and (B2) are effective in a case of a band extension technology in which a plurality of frequency resources (component carriers) associated with each other has different roles. For example, (B1) and (B2) are effective in a case where a plurality of frequency resources (component carriers) associated with each other has different priorities (high and low priorities). Specifically, (B1) and (B2) are effective in a case where carrier aggregation or LAA is set as the band extension technology.

In a case where (B1) Primary component carrier is set to the "component carrier type information", the component carrier type information indicates that the base station apparatus 20 uses a grant (frequency resource) related to the grant request as the primary component carrier.

Here, the primary component carrier is, for example, a component carrier with highest priority among a plurality of component carriers. For example, the primary component carrier is an anchor carrier in carrier aggregation or LAA. The anchor carrier is not limited to an anchor carrier in LTE, and may be, for example, an anchor carrier in NR. The primary component carrier may be replaced with a primary carrier, a master carrier, or the like.

In a case where (B2) Secondary component carrier is set to the "component carrier type information", the component carrier type information indicates that the base station apparatus 20 uses a grant (frequency resource) related to the grant request as the secondary component carrier.

Here, the secondary component carrier is, for example, a component carrier other than the primary component carrier among the plurality of component carriers. The secondary component carrier may be replaced with a secondary carrier, a slave carrier, or the like.

In a case where (B3) Standalone is set to the "component carrier type information", the component carrier type information indicates that the base station apparatus 20 uses a grant (frequency resource) related to the grant request alone without being associated with another grant (frequency resource).

It is to be noted that component carrier types settable to the "component carrier type information" may include component carrier types other than (B1) to (B3).

For example, the component carrier types settable to the "component carrier type information" may include a component carrier type indicating that a grant related to the component carrier type is associated with another grant without priority. For example, component carrier types settable to the "component carrier type information" may include a "bonding carrier type" indicating that a grant related to the component carrier type is bonded to another grant by channel bonding.

The component carrier types settable to the "component carrier type information" may include a "dual connectivity carrier type" indicating that a grant related to the component carrier type is associated with a grant of another base station apparatus 20 by dual connectivity.

As a matter of course, the component carrier types settable to the "component carrier type information" may include a component carrier type indicating that a grant related to the component carrier type is simply associated with another grant irrespective of presence or absence of priority.

(Service Type Information)

Frequency resources are assumed to be used for various services with different characteristics such as a service demanding high throughput communication, a service demanding communication with low delay, and a service demanding communication with high reliability. Enabling to know the type of service makes it possible for the communication control apparatus 40 to perform, for example, a grant process considering characteristics of the service such as allocating, to the service demanding communication with high reliability, not a frequency resource of a general authorized access tier (GAA Tier) but a frequency resource of a priority access tier (Priority Access Tier) that is not easily suspended.

Accordingly, the base station apparatus 20 or the proxy apparatus 50 uses (C) Service type information to notify the communication control apparatus 40 of what type of service a grant (frequency resource) is to be used for.

For example, the following (C1) to (C4) are assumed as component carrier types settable to the "service type information".

(C1) MBB (Mobile Broadband)
(C2) MTC (Machine Type Communication)
(C3) MCC (Mission Critical Communication)
(C4) FWA (Fixed Wireless Access)

It is to be noted that (C1) to (C4) described above are merely examples. Service types settable to the "service type information" may include service types other than (C1) to (C4). For example, the service types settable to the "service type information" may include a service type indicating eMBB (enhanced Mobile Broadband), URLLC (Ultra-Reliable and Low Latency Communications), and mMTC (massive Machine Type Communication) that are newly specified in 5G.

In addition, the service types settable to the "service type information" may include a service type demanding ultra-high speed communication, a service type demanding communication with low delay, a service type demanding communication with high reliability, a service type demanding communication by multiple simultaneous connections, and a service type indicating a combination thereof.

It is to be noted that in 5G, a communication service corresponding to various communication characteristics is provided. Accordingly, in 5G, a concept called network slicing is introduced. That is, in 5G, it is assumed that characteristics of the service are different for each network slice. Accordingly, identification information settable to the "service type information" may be, for example, network slice identification information, for example, a slice ID (Slice ID). The communication control apparatus 40 is able to identify the service type even if the "service type information" is the "network slice identification information".

(Grouping Information)

As described above, in the present embodiment, one or more base station apparatuses 20 are able to use a plurality of grants associated with each other by a predetermined band extension technology. Enabling to know which grant a grant is associated with makes it possible for the communication control apparatus 40 to perform a grant process considering a relationship between grants such as managing a plurality of grants in association with each other.

Accordingly, the base station apparatus 20 or the proxy apparatus 50 uses (D) Grouping information to notify the communication control apparatus 40 of which grant a grant is associated (grouped) with.

For example, the following (D1) and (D2) are assumed as identification information settable to the "grouping information".

(D1) Grant ID (Grant ID)
(D2) Request Index (Request Index)

The grant ID in (D1) is identification information about another grant associated with a grant related to a request. The grant ID in (D1) may be used in a case where another grant has been already provided with a grant ID. For example, the grant ID in (D1) may be used in combination with a grant having already been provided with a grant ID when the base station apparatus 20 uses a predetermined band extension technology (e.g., carrier aggregation, LAA, channel bonding, etc.). Further, the grant ID in (D1) may be used also in a case where the base station apparatus 20 or the proxy apparatus 50 makes a request for a grant to be used for the secondary component carrier. Further, the grant ID in (D1) may be used also in a case where the base station apparatus 20 or the proxy apparatus 50 makes a request for a grant for channel bonding.

The request index in (D2) is identification information used instead of a grant ID in a case where another grant associated with a grant related to a request has not yet provided with a grant ID. The request index in (D2) may be used in a case where another grant has not yet provided with a grant ID. For example, the request index in (D2) may be used in a case where the base station apparatus 20 or the proxy apparatus 50 makes requests for a plurality of grants simultaneously and two or more grants of the plurality of grants are to be used in combination.

It is to be noted that at least presence of another grant not provided with a grant ID (Grant ID) is assumed upon making a grant request. However, according to a message format specified in NPTL 2, it is possible to store a plurality of requests in one message in the form of an array. It is possible to use an index number (Index Number) in the array instead of the grant ID.

6-3. Granting Determination Using Usage Information

Next, a granting determination process using usage information will be described. This granting determination process is a process corresponding to the frequency utilization permission process (step S33) described in <5-3. Frequency Utilization Permission Procedure> or the utilization permission determination process (step S63) described in <6-1. Typical Operation Flow>.

As described above, information about "grant application, detail" is added to a grant request to be transmitted from the base station apparatus 20 or the proxy apparatus 50. Hereinafter, description is given of a process in a case where (A1) Carrier aggregation or (A2) LAA is set to the "grant application, detail" as band extension technology identification information, a process in a case where (A3) Channel bonding is set to the "grant application, detail" as band extension technology identification information, and a process in a case where (A4) Dual connectivity is set to the "grant application, detail" as band extension technology identification information.

(Carrier Aggregation or LAA)

A granting determination process in a case where (A1) Carrier aggregation or (A2) LAA is set to the "grant application, detail" as band extension technology identification information will be described first.

First, the communication control apparatus 40 acquires a grant request with the "grant application, detail" from the base station apparatus 20 or the proxy apparatus 50 acting on behalf of one or more base station apparatuses 20.

In a case where (A) Band extension technology identification information is (A1) Carrier aggregation or (A2) LAA, the communication control apparatus 40 checks (B) Component carrier type information.

In a case where the component carrier type is (B3) Standalone, the communication control apparatus 40 may reject the grant request.

In a case where the component carrier type is (B2) Secondary component carrier, the communication control apparatus 40 checks (D) Grouping information. In a case where the grouping information does not include identification information about a grant to be associated, the communication control apparatus 40 may reject the grant request. In this case, it is desirable that the communication control apparatus 40 generate a message or an error code indicating a reason for the rejection, store the generated error code in a storage apparatus (e.g., the storage unit 42), and transmit the generated error code to an apparatus that has transmitted the grant request.

It is to be noted that in a case where the grouping information includes identification information about a grant to be associated but the grant indicated by the identification information is not registered as the primary component carrier, the communication control apparatus 40 may reject the grant request. Alternatively, the communication control apparatus 40 may rewrite information about the grant indicated by the identification information as the primary component carrier. It is to be noted that in a case where (C) Service type information is a service type demanding high reliability such as (C3) MCC and the grant type (Grant type)

is GAA, it is not possible to assure interference-free; therefore, the communication control apparatus 40 may reject the grant request.

In a case where the component carrier type is (B1) Primary component carrier, the communication control apparatus 40 checks the grant type (Grant type). In a case where the grant type (Grant type) is GAA and (A) Band extension technology identification information is (A2) LAA, the communication control apparatus 40 may reject the grant request.

The communication control apparatus 40 may perform a determination process other than these within a technically possible range.

In a case where there is no issue in these determination processes, the communication control apparatus 40 performs the frequency utilization permission process described in <5-3>. Thus, the granting determination process is completed.

(Channel Bonding)

Next, a granting determination process in a case where (A3) Channel bonding is set to the "grant application, detail" as band extension technology identification information will be described.

First, the communication control apparatus 40 acquires a grant request with the "grant application, detail" from the base station apparatus 20 or the proxy apparatus 50 acting on behalf of one or more base station apparatuses 20.

In a case where (A) Band extension technology identification information is (A3) Channel bonding, the communication control apparatus 40 checks (D) Grouping information. In a case where grouping information does not include identification information about a grant to be associated, the communication control apparatus 40 may reject the grant request. In this case, it is desirable that the communication control apparatus 40 generate a message or an error code indicating a reason for the rejection, store the generated error code in a storage apparatus (e.g., the storage unit 42), and transmit the error code to an apparatus that has transmitted the grant request.

It is to be noted that in a case where the grouping information includes identification information about a grant to be associated but an allowable frequency range of a grant indicated by the identification information and a frequency range indicated by a fixed type (Fixed type) grant request are not successive, the communication control apparatus 40 may reject the grant request. Further, in a case where the grouping information includes the identification information about the grant to be associated but the allowable frequency range of a grant indicated by the identification information and a desired frequency range indicated by a flexible type (Flexible type) grant request are not successive, the communication control apparatus 40 may reject the grant request.

In a case where the grant request is of the flexible type (Flexible type) and the desired frequency range includes an allowable frequency range of the grant to be associated, the communication control apparatus 40 sets an allowable frequency range of a grant to be given, to be adjacent to the allowable frequency range of the grant to be associated.

The communication control apparatus 40 may perform a determination process other than these within a technically possible range.

In a case where there is no issue in these determination processes, the communication control apparatus 40 performs the frequency utilization permission process described in <5-3>. Thus, the granting determination process is completed.

(Dual Connectivity)

Next, a granting determination process in a case where (A4) Dual connectivity is set to the "grant application, detail" as the band extension technology identification information will be described.

First, the communication control apparatus 40 acquires a grant request with the "grant application, detail" from the base station apparatus 20 or the proxy apparatus acting on behalf of one or more base station apparatuses 20.

In a case where (A) Band extension technology identification information is (A4) Dual connectivity, the communication control apparatus 40 checks (D) Grouping information. In a case where grouping information does include identification information about a grant to be associated, the communication control apparatus 40 may reject the grant request. In a case where the grouping information includes identification information about a grant to be associated but a possessor of a grant indicated by the identification information is the same as a possessor of a grant related to the grant request, the communication control apparatus 40 may reject the grant request. In this case, it is desirable that the communication control apparatus 40 generate a message or an error code indicating a reason for the rejection, store the generated error code in a storage apparatus (e.g., the storage unit 42), and transmit the error code to an apparatus that has transmitted the grant request.

The communication control apparatus 40 may perform a determination process other than these within a technically possible range.

In a case where there is no issue in these determination processes, the communication control apparatus 40 performs the frequency utilization permission process described in <5-3>. Thus, the granting determination process is completed.

In this case, for sharing of grouping information, presence of an entity that manages a plurality of base station apparatuses 20, such as a network management apparatus or a domain proxy (e.g., the proxy apparatus 50) is desirable. Alternatively, it is desirable to provide an interface that enables direct signaling between the base station apparatuses 20, such as an X2 interface.

6-4. Response Based on Granting Determination Result

The communication control apparatus 40 generates a grant response on the basis of a result of the granting determination process. Then, the communication control apparatus 40 provides a notification to a request source (the base station apparatus 20 or the proxy apparatus 50) of the grant request.

It is to be noted that in a case where the result of the granting determination process is rejection determination, the communication control apparatus 40 may generate recommended-parameter information (such as a frequency range and maximum EIRP) that is operation parameters recommended for the request source. Then, when transmitting a grant response, the communication control apparatus 40 may transmit the generated recommended-parameter information together with or included in the grant response to the request source.

Thus, even in a case where the grant request is rejected, the request source is able to know usable operation parameters (such as a frequency range in which a possibility of a successful grant request is high).

6-5. Bonded Grant (Bonded Grant)

The process using the "grant application, detail" described above is applicable as follows.

For example, in a case where channel bonding is performed by using a plurality of grants, the communication control apparatus 40 may treat a plurality of grants as one grant (hereinafter referred to as a bonding grant (Bonded Grant)) for simplification of management. In this case, the communication control apparatus 40 may issue a grant ID for the bonded grant. The communication control apparatus 40 may notify the base station apparatus 20 or the proxy apparatus 50 of the grant ID of the bonded grant in the grant response. Generally, the base station apparatus 20 or the proxy apparatus 50 has to perform heartbeat of a plurality of grants, but heartbeat may be performed by using the grant ID of the bonded grant. This makes grant management easy for the communication control apparatus 40, the base station apparatus 20, and the proxy apparatus 50.

In a case where frequency utilization by an existing system such as a radar (e.g., the communication system 1) is detected, if the grant is a normal grant, the communication control apparatus 40 has to suspend utilization of a grant having an overlapping frequency range irrespective of whether the frequency range partially or entirely overlaps with a frequency used by the existing system. However, in a case where such overlapping occurs in a portion of an allowable frequency range associated with the bonded grant, the communication control apparatus 40 may divide the bonded grant into a plurality of original grants. Then, a utilization suspension process may be performed on a grant in an overlapping portion among the plurality of grants.

The communication control apparatus 40 may notify, in a heartbeat response, the base station apparatus 20 or the proxy apparatus 50 that division is to be performed. In this case, a response code (Response Code) indicating that the bonded grant is to be divided into a plurality of grants may be defined. Then, the communication control apparatus 40 may use the response code to notify the base station apparatus 20 or the proxy apparatus 50. Alternatively, the communication control apparatus 40 may cause a heartbeat response to be included in a text message indicating that the bonded grant is to be divided into a plurality of grants. The base station apparatus 20 is able to smoothly execute a process for dividing the bonded grant.

6-6. Switching to Another Band Expansion Technology

The process using the "grant application, detail" described above is also applicable to a process of switching to another band extension technology.

As described above, in a case where the bonded grant is divided into a plurality of original grants and the utilization suspension process is performed on a grant in an overlapping portion as described above, the communication control apparatus 40 may perform a process for "shift from channel bonding to Intra-band Non Contiguous CA". Here, it is carrier aggregation using non-successive component carriers in an "Intra-band Non Contiguous CA" band.

For example, assume that in a case where bonding is performed using three successive grants, the utilization suspension process has to be executed only on a middle grant among the three grants. In such a case, executing Intra-band Non Contiguous CA by using two grans at both ends of which utilization is not suspended makes it possible for the base station apparatus 20 to continue transmission of radio waves.

Accordingly, in such a case, the communication control apparatus 40 performs a process for causing the base station apparatus 20 to perform "shift from channel bonding to Intra-band Non Contiguous CA". In doing this, if possible, it is desirable that grouping information in the grant request include capability information (Capability Information) indicating presence or absence of a function of switching between channel bonding and Intra-band Non Contiguous CA.

As a matter of course, even in a case other than when radar detection is performed, switching to another band extension technology may be performed. In such a case, it is desirable that notification is provided from the base station apparatus 20 to the communication control apparatus 40 by the heartbeat request.

As a matter of course, switching of the band extension technology is not limited to "shift from channel bonding to Intra-band Non Contiguous CA". Switching of the band extension technology makes it possible to continue radio wave transmission using an available frequency resource, thereby achieving effective use of radio waves.

6-7. Interference Calculation

The process using the "grant application, detail" described above is also applicable to Network Coexistence.

Generally, interference calculation is performed in units of grants. Accordingly, even if channel bonding, carrier aggregation, or LAA is performed, in accordance with an existing scheme, grants may not be given in a combination desired by the user of the base station apparatus 20 in some cases.

Accordingly, the calculating section 443 of the communication control apparatus 40 uses information set to the "grant application, detail" to determine whether or not a combination of grants is a combination to be subjected to interference calculation. Then, the calculating section 443 performs interference calculation on the basis of a determination result.

This allows for highly accurate interference calculation, thereby achieving effective use of radio waves.

6-8. Adjustment of Allowable Amount of Interference

The process using the "grant application, detail" described above is also applicable to determination of Maximum EIRP based on Aggregate Interference.

As described above, interference calculation is performed in units of grants. In a case where interference is caused with an existing system, an maximum allowable amount of interference (e.g., maximum allowable EIRP) is adjusted on the basis of the calculation. However, in this case, there is a possibility that unbalance in the maximum allowable amount of interference (e.g., maximum allowable EIRP) occurs between a plurality of grants used in channel bonding, carrier aggregation, or LAA.

Accordingly, in a case where unbalance in the maximum allowable amount of interference occurs between a plurality of grants used in channel bonding, carrier aggregation, or LAA as a result of primary system protection calculation (e.g., calculation of Incumbent Protection of CPAS or the like), the adjusting section 445 of the communication control apparatus 40 may adjust the allowable amounts of interference of respective grants to be equal to each other. Specifically, the adjusting section 445 of the communication control apparatus 40 may adjust the allowable amount of interference of each of a plurality of grants to be used in association with each other to a minimum amount of interference (e.g., EIRP) among the maximum allowable amounts of interference (e.g., maximum allowable EIRP) of the plurality of grants.

Thus, the allowable amount of interference is not wasted, thereby achieving effective use of radio waves.

7. MODIFICATION EXAMPLES

The embodiments described above illustrate examples, and various changes and applications are possible.

7-1. Modification Examples Related to System Configuration

The communication control apparatus 40 of the present embodiment is not limited to the apparatus described in the above embodiment. For example, the communication control apparatus 40 may be an apparatus having a function other than controlling the base station apparatus 20 that makes secondary use of the frequency band where frequency sharing is performed. For example, the function of the communication control apparatus 40 of the present embodiment may be provided for a network manager. In this case, the network manager may be, for example, a C-BBU (Centralized Base Band Unit) of a network configuration called a C-RAN (Centralized Radio Access Network) or an apparatus including the same. The function of the network manager may also be provided for a base station (including an access point). These apparatuses (e.g., network managers) may also be regarded as communication control apparatuses.

It is to be noted that in the above embodiment, the communication system 1 is the first wireless system, and the base station apparatus 20 is the second wireless system. However, the first wireless system and the second wireless system are not limited to this example. For example, the first wireless system may be a communication apparatus (e.g., the wireless communication apparatus 10), or the second wireless system may be a communication system (the communication system 2). It is to be noted that the wireless system appearing in the present embodiment is not limited to a system including a plurality of apparatuses, and may be replaced with an "apparatus", a "terminal", or the like as appropriate.

Further, in the above-described embodiment, the communication control apparatus 40 is assumed to be an apparatus belonging to the communication system 2, but it may not necessarily be an apparatus belonging to the communication system 2. The communication control apparatus 40 may be an apparatus outside the communication system 2. The communication control apparatus 40 may indirectly control the base station apparatus 20 via an apparatus constituting the communication system 2, without directly controlling the base station apparatus 20. Further, a plurality of secondary systems (communication systems 2) may be present. In this case, the communication control apparatus 40 may manage the plurality of secondary systems. In this case, each secondary system may be regarded as the second wireless system.

It is to be noted that, generally in frequency sharing, the existing system using the target band is referred to as a primary system, and the secondary user is referred to as a secondary system, but the primary system and the secondary system may be replaced with other terms. A macrocell in a HetNET (Heterogeneous Network) may be used as the primary system, and a small cell or a relay station may be used as the secondary system. In addition, a base station may be used as the primary system, and a Relay UE or Vehicle UE present in its coverage and implementing D2D or V2X (Vehicle-to-Everything) may be used as the secondary system. The base station is not limited to a fixed type, and may be a portable/mobile type.

In addition, the interfaces between entities may be either wired or wireless. For example, the interface between the entities (a communication apparatus, a communication control apparatus, or a terminal apparatus) appearing in the present embodiment may be a wireless interface independent of frequency sharing. Examples of the wireless interface independent of frequency sharing include a wireless interface provided by a mobile network operator via a Licensed band, and wireless LAN communication using an existing unlicensed band.

7-2. Other Modification Examples

A control apparatus that controls the wireless communication apparatus 10, the base station apparatus 20, the terminal apparatus 30, the communication control apparatus 40, or the proxy apparatus 50 of the present embodiment may be implemented by a dedicated computer system or may be implemented by a general-purpose computer system.

For example, a program for execution of the above-described operations is stored in a computer-readable recording medium such as an optical disk, a semiconductor memory, a magnetic tape, or a flexible disk, and distributed. Then, for example, the control apparatus is configured by installing the program in a computer and executing the above-described process. In this case, the control apparatus may be an apparatus (e.g., a personal computer) outside the wireless communication apparatus 10, the base station apparatus 20, the terminal apparatus 30, the communication control apparatus 40, or the proxy apparatus 50. The control apparatus may also be an apparatus (e.g., the control unit 24, the control unit 34, the control unit 44, or the control unit 54) inside the wireless communication apparatus 10, the base station apparatus 20, the terminal apparatus 30, the communication control apparatus 40, or the proxy apparatus 50.

In addition, the above-described communication program may be stored in a disk apparatus provided in a server apparatus on a network such as the Internet to be able to be downloaded to a computer, for example. Further, the above-described functions may be implemented by collaboration between an operating system (Operating System) and application software. In this case, a portion other than the OS may be stored in a medium and distributed, or a portion other than the OS may be stored in a server apparatus to be able to be downloaded to a computer, for example.

Further, among the processes described in the above embodiment, all or part of the process described as being performed automatically may also be manually performed, or all or part of the process described as being performed manually may also be performed automatically by a known method. In addition to this, the processing steps, specific names, and information including various data and parameters illustrated in the above specification and in the drawings may be freely changed, unless otherwise noted. For example, various information illustrated in the drawings is not limited to the illustrated information.

Further, the illustrated components of each apparatus are functional concepts and do not necessarily have to be physically configured as illustrated. That is, a specific form of the distribution and integration of each apparatus is not limited to the illustrated one, and all or part thereof may be functionally or physically distributed and integrated in any unit depending on various loads, use situations, etc.

Further, it is possible to appropriately combine the above-described embodiments within a scope that does not cause contradiction in the processing contents. Further, it is possible to appropriately change the order of the steps illustrated in the sequence diagrams or flow charts of the present embodiment.

8. CONCLUSION

As described above, according to one embodiment of the present disclosure, the communication control apparatus 40 acquires information related to usage of a grant for the base station apparatus 20, which uses radio waves of a frequency band used by the communication system 1, to use the radio waves. Then, the communication control apparatus 40 performs a process related to the grant on the basis of the information related to the usage of the grant.

This makes it possible to execute efficient management of grants (allocation or suspension of a frequency resource to the base station apparatus 20). As a result, efficient use of radio wave resources is achieved.

Although the embodiments of the present disclosure have been described above, the technical scope of the present disclosure is not limited to the above-described embodiments as they are, and various modifications may be made without departing from the scope of the present disclosure. Further, the components may be appropriately combined over different embodiments and modification examples.

In addition, the effects in the embodiments described herein are merely illustrative and not limitative, and other effects may be achieved.

It is to be noted that the present technology may also have the following configurations.

(1)

A communication control apparatus including:
an acquiring section that acquires information related to usage of one or more frequency resources of a second wireless system, the one or more frequency resources being included in part or all of a frequency band used by a first wireless system, the second wireless system desiring use of the one or more frequency resource;
a processing section that performs a process related to the frequency resource on the basis of the information related to the usage of the frequency resource; and
a notifying section that reports a result of the process related to the frequency resource.

(2)

The communication control apparatus according to (1), in which
the information related to the usage of the frequency resource includes groping information indicating that the second wireless system uses a plurality of frequency resources in association with each other, and
the processing section performs a process related to the frequency resource on the basis of the grouping information.

(3)

The communication control apparatus according to (2), in which the processing section performs a frequency resource utilization permission determination process on the basis of the grouping information.

(4)

The communication control apparatus according to (2) or (3), in which the processing section performs a frequency resource utilization suspension process on the basis of the grouping information.

(5)

The communication control apparatus according to any one of (2) to (4), in which the information related to the usage of the frequency resource further include first identification information for identifying a band extension technology for the second wireless system to use the plurality of frequency resources in association with each other, and
the processing section performs a process related to the frequency resource for the plurality of frequency resources on the basis of the first identification information.

(6)

The communication control apparatus according to (5), in which the band extension technology identifiable by the first identification information includes at least one or more technologies of carrier aggregation, LAA (Licensed Assisted Access), channel bonding, or dual connectivity.

(7)

The communication control apparatus according to any one of (2) to (6), in which the information related to the usage of the frequency resource includes second identification information for identifying a component carrier type of each of the plurality of frequency resources, and
the processing section performs a process related to the frequency resource for the plurality of frequency resources on the basis of the second identification information.

(8)

The communication control apparatus according to (7), in which the component carrier type identifiable by the second identification information includes at least one or more of a primary component carrier, a secondary component carrier, or standalone.

(9)

The communication control apparatus according to (8), in which
in a case where use of one or a predetermined number of frequency resources among the plurality of frequency resources associated with each other by carrier aggregation or LAA (Licensed Assisted Access) is suspended, the processing section suspends one or a predetermined number of frequency resources of which the component carrier type is the secondary component carrier among the plurality of frequency resources, and
the notifying section reports suspension of use of the one or predetermined number of frequency resources.

(10)

The communication control apparatus according to any one of (2) to (9), in which in a case where the plurality of frequency resources are associated with each other by channel bonding, the processing section treats the plurality of frequency resources as one frequency resource, and performs a process related to the frequency resource.

(11)

The communication control apparatus according to (10), in which in a case where use of one or a predetermined number of frequency resources among the plurality of frequency resources included in the one frequency resource is suspended, the processing section divides the one frequency resource into the plurality of frequency resources and suspends use of one or a predetermined frequency resources among the plurality of frequency resources divided.

(12)

The communication control apparatus according to (11), in which the notifying section notifies the second wireless system or a proxy system acting on behalf of the second wireless system that the one frequency resource is to be divided into the plurality of frequency resources.

(13)

The communication control apparatus according to any one of (2) to (12), in which
the acquiring section acquires possessed function information related to a function of a band extension technology of the second wireless system, and
the processing section performs a process related to the frequency resource on the basis of the possessed function information.

(14)

The communication control apparatus according to (13), including a notifying section that notifies the second wireless system or a proxy apparatus acting on behalf of the second wireless system to perform switching to another band extension technology determined on the basis of the possessed function information in a case where division of the one frequency resource is assumed by suspension of use of some of the plurality of frequency resources included in the one frequency resource.

(15)

The communication control apparatus according to any one of (2) to (14), including a calculating section that performs calculation related to interference with the second wireless system on the basis of the grouping information.

(16)

The communication control apparatus according to (2), including an adjusting section that adjust maximum allowable transmission power of each of the plurality of frequency resources on the basis of the grouping information.

(17)

The communication control apparatus according to (16), in which the adjusting section performs adjustment to lowest maximum allowable transmission power among maximum allowable transmission power of the plurality of frequency resources.

(18)

The communication control apparatus according to any one of (1) to (17), in which
the information related to the usage of the frequency resource includes service type information indicating a type of service to be performed using the frequency resource, and
the processing section performs a process related to the frequency resource on the basis of the service type information.

(19)

A communication control method including:
acquiring information related to usage of one or more frequency resources of a second wireless system, the one or more frequency resources being included in part or all of a frequency band used by a first wireless system, the second wireless system desiring use of the one or more frequency resource;
performing a process related to the frequency resource on the basis of the information related to the usage of the frequency resource; and
reporting a result of the process related to the frequency resource.

(20)

A communication program that causes a computer to function as:
an acquiring section that acquires information related to usage of one or more frequency resources of a second wireless system, the one or more frequency resources being included in part or all of a frequency band used by a first wireless system, the second wireless system desiring use of the one or more frequency resource;
a processing section that performs a process related to the frequency resource on the basis of the information related to the usage of the frequency resource; and
a notifying section that reports a result of the process related to the frequency resource.

(21)

A communication apparatus using one or more frequency resources included in part or all of a frequency band used by a first wireless system, the communication apparatus including:
a transmitter that transmits information related to usage of a frequency resource;
an acquiring section that acquires a result of a process related to a frequency resource performed on the basis of the information related to the usage of the frequency resource; and
a wireless communication control section for performing wireless communication on the basis of the result of the process related to the frequency resource acquired by the acquiring section.

(22)

A communication method to be executed by a communication apparatus using one or more frequency resources included in part or all of a frequency band used by a first wireless system, the communication method including:
transmitting information related to usage of a frequency resource;
acquiring a result of a process related to a frequency resource performed on the basis of the information related to the usage of the frequency resource; and
performing wireless communication on the basis of the result of the process related to the frequency resource acquired by the acquiring section.

(23)

A communication program that causes a computer, which controls a communication apparatus using one or more frequency resources included in part or all of a frequency band used by a first wireless system, to function as:
a transmitter that transmits information related to usage of a frequency resource;
an acquiring section that acquires a result of a process related to a frequency resource performed on the basis of the information related to the usage of the frequency resource; and
a wireless communication control section for performing wireless communication on the basis of the result of the process related to the frequency resource acquired by the acquiring section.

(24)

A proxy apparatus including:
a first transmitter that acts on behalf of one or more communication apparatuses to transmit information related to usage of a frequency resource, the one or more communication apparatuses that use one or more frequency resources included in part or all of a frequency band used by a first wireless system;

an acquiring section that acts on behalf of the one or more communication apparatuses to acquire a result of a process related to a frequency resource performed on the basis of the information about the usage of the frequency resource; and a second transmitter that transmits the result of the process related to the frequency resource to the one or more communication apparatuses or a wireless communication control section for performing wireless communication by the one or more communication apparatuses.

(25)

A communication method including:

acting on behalf of one or more communication apparatuses to transmit information related to usage of a frequency resource, the one or more communication apparatuses that use one or more frequency resources included in part or all of a frequency band used by a first wireless system;

acting on behalf of the one or more communication apparatuses to acquire a result of a process related to a frequency resource performed on the basis of the information about the usage of the frequency resource; and transmitting the result of the process related to the frequency resource to the one or more communication apparatus or a wireless communication control section for performing wireless communication by the one or more communication apparatuses.

(26)

A communication program that causes a computer to function as:

a first transmitter that acts on behalf of one or more communication apparatuses to transmit information related to usage of a frequency resource, the one or more communication apparatuses that use one or more frequency resources included in part or all of a frequency band used by a first wireless system;

an acquiring section that acts on behalf of the one or more communication apparatuses to acquire a result of a process related to a frequency resource performed on the basis of the information about the usage of the frequency resource; and a second transmitter that transmits the result of the process related to the frequency resource to the one or more communication apparatuses or a wireless communication control section for performing wireless communication by the one or more communication apparatuses.

REFERENCE SIGNS LIST 1, 2: communication system
10: wireless communication apparatus
20: base station apparatus
30: terminal apparatus
40: communication control apparatus
50: proxy apparatus
21, 31, 41, 51: wireless communication unit
22, 32, 42, 52: storage unit
23, 43, 53: network communication unit
33: input-output unit
24, 34, 44, 54: control unit
211, 311: receiving processor
212, 312: transmitting processor
241, 441, 541: acquiring section
242: setting section
243: transmitter
244: wireless communication control section
442: processing section
443: calculating section
444: notifying section
445: adjusting section
542: first transmitter
543: second transmitter

The invention claimed is:

1. A communication control apparatus, comprising:

an acquiring section configured to acquire information related to usage of one or more frequency resources of a second wireless system, wherein
the one or more frequency resources are included in at least a part of a frequency band used by a first wireless system,
the second wireless system uses the one or more frequency resources;

a processing section configured to perform a first process related to the one or more frequency resources based on the information related to the usage of the one or more frequency resources; and a notifying section configured to report result of the first process related to the one or more frequency resources, wherein
the information related to the usage of the one or more frequency resources include grouping information which indicates association between the one or more frequency resources used by the second wireless system,
the processing section is further configured to perform a second process related to the one or more frequency resources based on the grouping information, and
the information related to the usage of the one or more frequency resources further includes first identification information that identifies a first band extension technology for the second wireless system to use, based on the association, the one or more frequency resources, and
the processing section is configured to perform a third process related to a frequency resource of the one or more frequency resources based on the first identification information.

2. The communication control apparatus according to claim 1, wherein the processing section is further configured to perform a frequency resource utilization permission determination process based on the grouping information.

3. The communication control apparatus according to claim 1, wherein the processing section is further configured to perform a frequency resource utilization suspension process based on the grouping information.

4. The communication control apparatus according to claim 1, wherein the first band extension technology identifiable by the first identification information includes at least one or more technologies of carrier aggregation, LAA (Licensed Assisted Access), channel bonding, or dual connectivity.

5. The communication control apparatus according to claim 1, wherein
the information related to the usage of the one or more frequency resources includes second identification information that identifies a component carrier type of each of the one or more frequency resources, and the processing section is further configured to perform a fourth process related to the frequency resource of the one or more frequency resources based on the second identification information.

6. The communication control apparatus according to claim 5, wherein the component carrier type identifiable by the second identification information includes at least one or more of a primary component carrier, a secondary component carrier, or standalone.

7. The communication control apparatus according to claim 6, wherein
in a case where use of a specific number of frequency resources, among the one or more frequency resources, having the association by carrier aggregation or LAA (Licensed Assisted Access) is suspended, the processing section is further configured to suspend the specific number of frequency resources of which the component carrier type is the secondary component carrier among the one or more frequency resources, and
the notifying section is configured to report suspension of use of the specific number of frequency resources.

8. The communication control apparatus according to claim 1, wherein in a case where the one or more frequency resources are associated by channel bonding, the processing section is further configured to:
treat the one or more frequency resources as one frequency resource, and
perform a fifth process related to the one frequency resource.

9. The communication control apparatus according to claim 8, wherein in a case where use of a specific number of frequency resources among the one or more frequency resources included in the one frequency resource is suspended, the processing section is further configured to:
divide the one frequency resource into a plurality of frequency resources; and
suspend use of determined frequency resources among the plurality of frequency resources.

10. The communication control apparatus according to claim 9, wherein the notifying section is further configured to notify, the second wireless system or a proxy system that acts on behalf of the second wireless system, that the one frequency resource is divided into the plurality of frequency resources.

11. The communication control apparatus according to claim 1, wherein
the acquiring section is further configured to acquire possessed function information related to a function of the first band extension technology of the second wireless system, and
the processing section is further configured to perform a sixth process related to the frequency resource based on the possessed function information.

12. The communication control apparatus according to claim 11, wherein the notifying section is further configured to notify, the second wireless system or a proxy apparatus acting on behalf of the second wireless system, to switch to a second band extension technology determined based on the possessed function information.

13. The communication control apparatus according to claim 1, further comprising a calculating section configured to perform calculation related to interference with the second wireless system based on the grouping information.

14. The communication control apparatus according to claim 1, further comprising an adjusting section is configured to adjust maximum allowable transmission power of each of the one or more frequency resources based on the grouping information.

15. The communication control apparatus according to claim 14, wherein the adjusting section is further configured to perform adjustment to lowest maximum allowable transmission power among maximum allowable transmission power of the one or more frequency resources.

16. The communication control apparatus according to claim 1, wherein
the information related to the usage of a specific frequency resource, of the one or more frequency resources, includes service type information indicating a type of service to be performed using the specific frequency resource, and
the processing section is further configured to perform a seventh process related to the specific frequency resource based on the service type information.

17. A communication apparatus using one or more frequency resources included in at least a part of a frequency band used by a first wireless system, the communication apparatus comprising:
a transmitter configured to transmit information related to usage of the one or more frequency resources;
an acquiring section configured to acquire a result of a first process related to the one or more frequency resources performed based on the information related to the usage of the one or more frequency resources of a second wireless system; and
a wireless communication control section is configured to perform wireless communication based on the result of the first process related to the one or more frequency resources acquired by the acquiring section, wherein
the information related to the usage of the one or more frequency resources include grouping information which indicates association between the one or more frequency resources used by the second wireless system, and
the information related to the usage of the one or more frequency resources further includes first identification information that identifies a band extension technology for the second wireless system to use, based on the association, the one or more frequency resources.

18. A proxy apparatus, comprising:
a first transmitter configured to, on behalf of one or more communication apparatuses, transmit information related to usage of one or more frequency resources, wherein
the one or more communication apparatuses uses one or more frequency resources included in at least a part of a frequency band used by a first wireless system;
an acquiring section configured to, on behalf of the one or more communication apparatuses, acquire a result of a first process related to the one or more frequency resources performed based on the information about the usage of the one or more frequency resources; and
a second transmitter configured to transmit the result of the first process related to the one or more frequency resources to the one or more communication apparatuses or a wireless communication control section for performing wireless communication by the one or more communication apparatuses, wherein the information related to the usage of the one or more frequency resources include grouping information which indicates association between the one or more frequency resources used by a second wireless system, and the information related to the usage of the one or more frequency resources further includes first identification information that identifies a band extension technology for the second wireless system to use, based on the association, the one or more frequency resources.

* * * * *